(12) United States Patent
Kretzschmar et al.

(10) Patent No.: US 12,517,112 B2
(45) Date of Patent: Jan. 6, 2026

(54) IMMUNE CELL ORGANOID CO-CULTURES

(71) Applicants: Koninklijke Nederlandse Akademie van Wetenschappen, Utrecht (NL); HUB Organoids IP B.V., Utrecht (NL)

(72) Inventors: Kai Kretzschmar, Utrecht (NL); Jotam Elazar Bar-Ephraim, Utrecht (NL); Johannes Carolus Clevers, Utrecht (NL); Sylvia Fernandez-Boj, Utrecht (NL); Robert Gerhardus Jacob Vries, Utrecht (NL)

(73) Assignees: Koninklijke Nederlandse Akademie van Wetenschappen, Utrecht (NL); HUB Organoids IP B.V., Utrecht (NL)

( * ) Notice: Subject to any disclaimer, the term of this patent is extended or adjusted under 35 U.S.C. 154(b) by 698 days.

(21) Appl. No.: 16/954,506

(22) PCT Filed: Dec. 21, 2018

(86) PCT No.: PCT/EP2018/086716
§ 371 (c)(1),
(2) Date: Jun. 16, 2020

(87) PCT Pub. No.: WO2019/122388
PCT Pub. Date: Jun. 27, 2019

(65) Prior Publication Data
US 2021/0208131 A1 Jul. 8, 2021

(30) Foreign Application Priority Data
Dec. 21, 2017 (GB) ...................... 1721615

(51) Int. Cl.
G01N 33/50 (2006.01)
A61K 40/11 (2025.01)
A61K 40/32 (2025.01)
A61K 40/42 (2025.01)
A61K 40/46 (2025.01)
C12N 5/078 (2010.01)
C12N 5/09 (2010.01)

(52) U.S. Cl.
CPC .......... *G01N 33/5011* (2013.01); *A61K 40/11* (2025.01); *A61K 40/32* (2025.01); *A61K 40/4243* (2025.01); *A61K 40/46* (2025.01); *C12N 5/0634* (2013.01); *C12N 5/0693* (2013.01); *G01N 33/5082* (2013.01); *A61K 2239/50* (2023.05); *C12N 2501/2302* (2013.01); *C12N 2501/2307* (2013.01); *C12N 2501/2315* (2013.01); *C12N 2502/11* (2013.01); *C12N 2502/30* (2013.01); *C12N 2503/02* (2013.01); *C12N 2503/04* (2013.01)

(58) Field of Classification Search
CPC .......... G01N 33/5011; G01N 33/5082; C12N 5/0634; C12N 5/0693; C12N 2502/11; C12N 2502/30; C12N 2503/02; C12N 2503/04
See application file for complete search history.

(56) References Cited

U.S. PATENT DOCUMENTS

| | | | |
|---|---|---|---|
| 5,464,758 A | 11/1995 | Gossen et al. | |
| 5,981,483 A | 11/1999 | Dennis et al. | |
| 6,165,782 A | 12/2000 | Naldini et al. | |
| 6,207,455 B1 | 3/2001 | Chang | |
| 6,218,181 B1 | 4/2001 | Verma et al. | |
| 6,277,633 B1 | 8/2001 | Olsen | |
| 6,323,031 B1 | 11/2001 | Cichutek | |
| 6,432,705 B1 | 8/2002 | Yee et al. | |
| 6,743,626 B2 | 6/2004 | Baum et al. | |
| 7,056,685 B1 | 6/2006 | Chen et al. | |
| 7,411,052 B2 | 8/2008 | Tang | |
| 7,439,927 B2 | 10/2008 | Lenart et al. | |
| 7,541,431 B2 | 6/2009 | Yoon | |
| 8,642,339 B2 | 2/2014 | Sato et al. | |
| 8,685,726 B2 | 4/2014 | Schulz et al. | |
| 8,906,631 B2 | 12/2014 | Clevers et al. | |
| 9,752,124 B2 | 9/2017 | Sato et al. | |
| 9,765,301 B2 | 9/2017 | Ortega et al. | |
| 9,833,496 B2 | 12/2017 | Clevers et al. | |
| 10,006,904 B2 | 6/2018 | Beekman et al. | |
| 10,597,633 B2 | 3/2020 | Huch Ortega et al. | |
| 10,940,180 B2 | 3/2021 | Clevers et al. | |
| 10,947,510 B2 | 3/2021 | Sato et al. | |
| 10,961,511 B2 | 3/2021 | Sachs et al. | |
| 11,034,935 B2 | 6/2021 | Huch Ortega et al. | |
| 11,035,852 B2 | 6/2021 | Beekman et al. | |
| 11,130,943 B2 | 9/2021 | Sachs et al. | |

(Continued)

FOREIGN PATENT DOCUMENTS

| | | |
|---|---|---|
| CN | 1596303 A | 3/2005 |
| CN | 101240262 A | 8/2008 |

(Continued)

OTHER PUBLICATIONS

Gao et al. 3D spheroid/organoid models of lung cancer to study lung cancer pathogenesis and testing of new therapeutics. Journal of Thoracic Oncology, vol. 12, No. 85 (2017) S1544. (Year: 2017).*
Besser et al., (2009) Modifying interleukin-2 concentrations during culture improves function of T cells for adoptive immunotherapy. Cytotherapy, 11(2), 206-217 (Year: 2009).*
Neal et al., (2018) Organoid modeling of the tumor immune microenvironment. Cell, 175: 1972-1988 (Year: 2018).*
Dwyer et al., (2016) A three-dimensional co-culture system to investigate macrophage-dependent tumor cell invasion. J. Biol. Methods, 3(3): e49. (Year: 2016).*
Nozaki et al. Co-culture with intestinal epithelial organoids allows efficient expansion and motility analysis of intraepithelial lymphocytes. J. Gastroenterol., 51, 206-213 (Year: 2016).*

(Continued)

*Primary Examiner* — Kara D Johnson
(74) *Attorney, Agent, or Firm* — Wolf, Greenfield & Sacks, P.C.

(57) ABSTRACT

The present invention provides co-cultures of organoids and immune cells, and methods of using these to identify agents for treating diseases.

21 Claims, 20 Drawing Sheets

Specification includes a Sequence Listing.

(56) References Cited

U.S. PATENT DOCUMENTS

| | | |
|---|---|---|
| 11,591,572 B2 | 2/2023 | Clevers et al. |
| 11,725,184 B2 | 8/2023 | Ortega et al. |
| 11,988,661 B2 | 5/2024 | Beekman et al. |
| 2003/0003088 A1 | 1/2003 | Tsao et al. |
| 2003/0032034 A1 | 2/2003 | Tang |
| 2003/0129751 A1 | 7/2003 | Grikscheit et al. |
| 2003/0138948 A1 | 7/2003 | Fisk et al. |
| 2003/0138951 A1 | 7/2003 | Yin |
| 2004/0175367 A1 | 9/2004 | Herlyn et al. |
| 2004/0191902 A1 | 9/2004 | Hambor et al. |
| 2004/0229355 A1 | 11/2004 | Chen et al. |
| 2004/0259177 A1 | 12/2004 | Lowery et al. |
| 2005/0054829 A1 | 3/2005 | Wiley et al. |
| 2005/0058687 A1 | 3/2005 | Guarino et al. |
| 2005/0265980 A1 | 12/2005 | Chen et al. |
| 2006/0110369 A1 | 5/2006 | Funatsu et al. |
| 2006/0172304 A1 | 8/2006 | Fuchs et al. |
| 2006/0182724 A1 | 8/2006 | Riordan |
| 2007/0010008 A1 | 1/2007 | Tseng et al. |
| 2007/0020637 A1 | 1/2007 | Isogai et al. |
| 2007/0036769 A9 | 2/2007 | Li et al. |
| 2007/0059829 A1 | 3/2007 | Yoon |
| 2007/0122903 A1 | 5/2007 | Rezania et al. |
| 2007/0128719 A1 | 6/2007 | Tseng et al. |
| 2007/0244061 A1 | 10/2007 | Niehrs et al. |
| 2007/0254359 A1 | 11/2007 | Rezania et al. |
| 2008/0112890 A1 | 5/2008 | Lelkes et al. |
| 2008/0113433 A1 | 5/2008 | Robins et al. |
| 2008/0166327 A1 | 7/2008 | Asahara et al. |
| 2008/0182328 A1 | 7/2008 | Snyder et al. |
| 2008/0233088 A1 | 9/2008 | Guha et al. |
| 2008/0242594 A1 | 10/2008 | Mckay et al. |
| 2009/0275067 A1 | 11/2009 | Taniguchi et al. |
| 2009/0311748 A1 | 12/2009 | Isogai et al. |
| 2009/0325289 A1 | 12/2009 | Hatzfeld |
| 2010/0047853 A1 | 2/2010 | Kuo et al. |
| 2010/0071078 A1 | 3/2010 | Niehrs |
| 2010/0112691 A1 | 5/2010 | Green et al. |
| 2010/0137210 A1 | 6/2010 | Funk et al. |
| 2010/0166713 A1 | 7/2010 | Dalton et al. |
| 2010/0247648 A1 | 9/2010 | Grubb et al. |
| 2010/0275280 A1 | 10/2010 | Clevers et al. |
| 2010/0278800 A1 | 11/2010 | Boyle et al. |
| 2011/0002897 A1 | 1/2011 | Snyder et al. |
| 2011/0008893 A1 | 1/2011 | Sugimura et al. |
| 2011/0191868 A1 | 8/2011 | Gupta |
| 2012/0028355 A1 | 2/2012 | Sato et al. |
| 2012/0196312 A1 | 8/2012 | Sato et al. |
| 2012/0207744 A1 | 8/2012 | Mendlein et al. |
| 2013/0005737 A1 | 1/2013 | Prabhu et al. |
| 2013/0052729 A1 | 2/2013 | Pourquie et al. |
| 2013/0089562 A1 | 4/2013 | French et al. |
| 2013/0189327 A1 | 7/2013 | Ortega et al. |
| 2013/0280809 A1 | 10/2013 | Efe et al. |
| 2014/0044713 A1 | 2/2014 | De Lau et al. |
| 2014/0243227 A1 | 8/2014 | Clevers et al. |
| 2014/0256037 A1 | 9/2014 | Sato et al. |
| 2014/0302491 A1 | 10/2014 | Nadauld et al. |
| 2015/0011420 A1 | 1/2015 | Beekman et al. |
| 2015/0140013 A1 | 5/2015 | Ramaswamy |
| 2015/0231201 A1 | 8/2015 | Clevers et al. |
| 2015/0276719 A2 | 10/2015 | Beekman et al. |
| 2016/0002595 A1 | 1/2016 | Keller et al. |
| 2017/0151308 A9 | 6/2017 | Clevers et al. |
| 2017/0191030 A1 | 7/2017 | Huch Ortega et al. |
| 2017/0275592 A1 | 9/2017 | Sachs et al. |
| 2017/0342385 A1 | 11/2017 | Sachs et al. |
| 2018/0025400 A1 | 1/2018 | Eshun |
| 2018/0066233 A1 | 3/2018 | Huch Ortega et al. |
| 2018/0072995 A1 | 3/2018 | Sato et al. |
| 2018/0187191 A1 | 7/2018 | Zeng |
| 2018/0221441 A1 | 8/2018 | Clevers et al. |
| 2018/0258400 A1 | 9/2018 | Ng et al. |
| 2019/0031992 A1 | 1/2019 | Kerns et al. |
| 2019/0100728 A1 | 4/2019 | Sato et al. |
| 2019/0383799 A1 | 12/2019 | Beekman et al. |
| 2019/0390171 A1 | 12/2019 | Sato et al. |
| 2020/0172861 A1 | 6/2020 | Ortega et al. |
| 2020/0318063 A1 | 10/2020 | Huch Ortega et al. |
| 2020/0377860 A1 | 12/2020 | Freedman et al. |
| 2021/0040454 A1 | 2/2021 | Clevers et al. |
| 2021/0047618 A1 | 2/2021 | Clevers et al. |
| 2021/0228682 A1 | 7/2021 | Clevers et al. |
| 2021/0254017 A1 | 8/2021 | Sachs et al. |
| 2021/0317416 A1 | 10/2021 | Huch Ortega et al. |
| 2021/0333266 A1 | 10/2021 | Beekman et al. |
| 2022/0017860 A1 | 1/2022 | Clevers et al. |
| 2022/0135952 A1 | 5/2022 | Sachs et al. |
| 2022/0340879 A1 | 10/2022 | De Lau et al. |
| 2023/0272347 A1 | 8/2023 | Clevers et al. |
| 2024/0076624 A1 | 3/2024 | Beumer et al. |
| 2024/0240155 A1 | 7/2024 | Pourfarzad et al. |

FOREIGN PATENT DOCUMENTS

| | | |
|---|---|---|
| CN | 101420964 A | 4/2009 |
| CN | 102439135 A | 5/2012 |
| CN | 103180436 A | 6/2013 |
| CN | 103237888 A | 8/2013 |
| CN | 104508121 A | 4/2015 |
| EA | 7611 B1 | 12/2006 |
| EP | 0953633 A1 | 11/1999 |
| EP | 1347046 A1 | 9/2003 |
| EP | 1440981 A2 | 7/2004 |
| EP | 1792979 A1 | 6/2007 |
| EP | 2138571 A1 | 12/2009 |
| EP | 2157192 A1 | 2/2010 |
| EP | 1673475 B1 | 4/2010 |
| EP | 2228443 A1 | 9/2010 |
| EP | 2412800 A1 | 2/2012 |
| EP | 2420566 A1 | 2/2012 |
| EP | 1427747 B1 | 4/2012 |
| EP | 1727560 B1 | 9/2012 |
| EP | 2772534 A1 | 11/2015 |
| EP | 3143126 A1 | 11/2015 |
| EP | 3318627 A1 | 5/2018 |
| EP | 3441458 A1 | 2/2019 |
| EP | 3505620 B1 | 7/2023 |
| JP | 2002-247978 A | 9/2002 |
| JP | 2006-325444 A | 12/2006 |
| JP | 2007-504823 A | 3/2007 |
| JP | 2007-116926 A | 5/2007 |
| JP | 2008-061569 A | 3/2008 |
| JP | 2009-520474 A | 5/2009 |
| JP | 2012-000097 A | 1/2012 |
| JP | 2016-51695410999 A | 4/2016 |
| RU | 2323252 C1 | 4/2008 |
| RU | 2465323 C2 | 10/2012 |
| WO | WO 97/34999 A1 | 9/1997 |
| WO | WO 01/23528 A1 | 4/2001 |
| WO | WO 01/077169 A2 | 10/2001 |
| WO | WO 02/18544 A2 | 3/2002 |
| WO | WO 03/029405 A2 | 4/2003 |
| WO | WO 03/029437 A2 | 4/2003 |
| WO | WO 03/040346 A2 | 5/2003 |
| WO | WO 03/050249 A2 | 6/2003 |
| WO | WO 03/054152 A2 | 7/2003 |
| WO | WO 03/055911 A2 | 7/2003 |
| WO | WO 2004/050827 A2 | 6/2004 |
| WO | WO 2004/076642 A2 | 9/2004 |
| WO | WO 2004/087896 A2 | 10/2004 |
| WO | WO 2005/034625 A1 | 4/2005 |
| WO | WO 2005/040391 A1 | 5/2005 |
| WO | WO 2005/040418 A2 | 5/2005 |
| WO | WO 2005/072419 A2 | 8/2005 |
| WO | WO 2005/110009 A2 | 11/2005 |
| WO | WO 2005/117994 A2 | 12/2005 |
| WO | WO 2005/120547 A1 | 12/2005 |
| WO | WO 2006/104536 A2 | 10/2006 |
| WO | WO 2007/013666 A2 | 2/2007 |
| WO | WO 2007/030290 A2 | 3/2007 |
| WO | WO 2007/050043 A2 | 5/2007 |
| WO | WO 2007/071339 A1 | 6/2007 |
| WO | WO 2007/100357 A2 | 9/2007 |

(56) References Cited

FOREIGN PATENT DOCUMENTS

| | | |
|---|---|---|
| WO | WO 2007/127454 A2 | 11/2007 |
| WO | WO 2007/127927 A2 | 11/2007 |
| WO | WO 2007/141657 A2 | 12/2007 |
| WO | WO 2007/149182 A2 | 12/2007 |
| WO | WO 2008/020942 A2 | 2/2008 |
| WO | WO 2008/046649 A1 | 4/2008 |
| WO | WO 2008/075796 A1 | 6/2008 |
| WO | WO 2008/088524 A2 | 7/2008 |
| WO | WO 2008/094597 A2 | 8/2008 |
| WO | WO 2008/101215 A1 | 8/2008 |
| WO | WO 2008/120218 A2 | 10/2008 |
| WO | WO 2008/155120 A2 | 12/2008 |
| WO | WO 2009/005809 A2 | 1/2009 |
| WO | WO 2009/007852 A2 | 1/2009 |
| WO | WO 2009/012428 A2 | 1/2009 |
| WO | WO 2009/022907 A2 | 2/2009 |
| WO | WO 2009/024595 A1 | 2/2009 |
| WO | WO 2010/011352 A2 | 1/2010 |
| WO | WO 2010/015938 A2 | 2/2010 |
| WO | WO 2010/016766 A2 | 2/2010 |
| WO | WO 2010/049752 A1 | 5/2010 |
| WO | WO 2010/077681 A1 | 7/2010 |
| WO | WO 2010/077955 A1 | 7/2010 |
| WO | WO 2010/090513 A2 | 8/2010 |
| WO | WO 2010/108001 A2 | 9/2010 |
| WO | WO 2010/119819 A1 | 10/2010 |
| WO | WO 2010/121923 A1 | 10/2010 |
| WO | WO 2010/129294 A3 | 4/2011 |
| WO | WO 2011/043591 A2 | 4/2011 |
| WO | WO 2011/098402 A1 | 8/2011 |
| WO | WO 2012/014076 A2 | 2/2012 |
| WO | WO 2012/044992 A2 | 4/2012 |
| WO | WO 2012/068251 A2 | 5/2012 |
| WO | WO 2012/087965 A2 | 6/2012 |
| WO | WO 2012/140274 A2 | 10/2012 |
| WO | WO 2012/168930 A1 | 12/2012 |
| WO | WO 2013/054112 A1 | 4/2013 |
| WO | WO 2013/061608 A1 | 5/2013 |
| WO | WO 2013/074681 A1 | 5/2013 |
| WO | WO 2013/093812 A2 | 6/2013 |
| WO | WO 2014/066649 A1 | 5/2014 |
| WO | WO 2014/124527 A1 | 8/2014 |
| WO | WO 2014/127170 A1 | 8/2014 |
| WO | WO 2014/127219 A1 | 8/2014 |
| WO | WO 2014/145389 A1 | 9/2014 |
| WO | WO 2014/159356 A1 | 10/2014 |
| WO | WO 2014/170411 A1 | 10/2014 |
| WO | WO 2015/040142 A1 | 3/2015 |
| WO | WO 2015/173425 A1 | 11/2015 |
| WO | WO 2015/179393 A1 | 11/2015 |
| WO | 2015/200901 A1 | 12/2015 |
| WO | WO 2016/016894 A1 | 2/2016 |
| WO | WO 2016/056999 A1 | 4/2016 |
| WO | WO 2016/083612 A1 | 6/2016 |
| WO | WO 2016/083613 A2 | 6/2016 |
| WO | WO 2016/094457 A1 | 6/2016 |
| WO | WO 2017/120543 A1 | 7/2017 |
| WO | WO 2017/149025 A1 | 9/2017 |
| WO | WO 2017/205511 A1 | 11/2017 |
| WO | WO 2017/220586 A1 | 12/2017 |
| WO | WO-2018035138 A1 * | 2/2018 ......... A01K 67/0271 |
| WO | WO 2018/052953 A1 | 3/2018 |
| WO | WO 2018/0361191 A1 | 3/2018 |
| WO | WO 2018/102102 A1 | 6/2018 |
| WO | WO 2019/122388 A1 | 6/2019 |
| WO | WO 2019/228516 A1 | 12/2019 |
| WO | WO 2020/019023 A1 | 1/2020 |
| WO | WO 2020/205755 A1 | 10/2020 |
| WO | WO 2020/234250 A1 | 11/2020 |

OTHER PUBLICATIONS

Bedke et al., A microplate co-culture assay allows indvidualised compound efficacy testing in patients derived 3D tumour spheroids and autologous immune cells. Euro Urol Suppl Mar. 2017; 16(3): e1474.
Chakrabarti et al., Hedgehog signaling regulates PDL-1 expression in gastric cancer cells to induce tumor proliferation (Abstract). Gastroenterology. Su2091. 2 pages.
Choo, The HLA system: genetics, immunology, clinical testing, and clinical implications. Yonsei Med J. Feb. 28, 2007;48(1):11-23.
Daszkiewicz et al., A 3D image-based quantificaiton of immune cell-tumor spheroid interactions in the presence of checkpoint inhibition. J Clin Oncol. Mar. 2017; 35(7): 82.
Daszkiewicz et al., A 3D in vitro culture-based method to visualize and quantify effects of immuno-modulatory drugs. In: Proceedings of the American Association for Cancer Research Annual Meeting 2017; Apr. 1-5, 2017; Washington, DC. Philadelphia (PA): AACR; Cancer Res 2017;77(13 Suppl):Abstract nr 4611.
Devi et al., Assessing the immunomodulatory role of heteroglycan in a tumor spheroid and macrophage co-culture model system. Carbohydr Polym. 2015;127:1-10. doi: 10.1016/j.carbpol.2015.03.035. Epub Mar. 25, 2015.
Finnberg et al., Application of 3D tumoroid systems to define immune and cytotoxic therapeutic responses based on tumoroid and tissue slice culture molecular signatures. Oncotarget. Aug. 5, 2017;8(40):66747-66757.
Finnberg et al., Use of 3D tumoroid systems to define immune and cytotoxic therapeutic responses based on tumoroid and tissue slice culture molecular signatures. Cancer Res. 2017; 77(13 Suppl): Abstract Nr 3990.
Hirschhaeuser et al., Efficacy of catumaxomab in tumor spheroid killing is mediated by its trifunctional mode of action. Cancer Immunol Immunother. Nov. 2010;59(11):1675-84. doi: 10.1007/s00262-010-0894-1. Epub Jul. 21, 2010.
Kuball et al., Facilitating matched pairing and expression of TCR chains introduced into human T cells. Blood. Mar. 15, 2007;109(6):2331-8. doi: 10.1182/blood-2006-05-023069. Epub Nov. 2, 2006.
Nozaki et al., Co-culture with intestinal epithelial organoids allows efficient expansion and motility analysis of intraepithelial lymphocytes. J Gastroenterol. Mar. 2016;51(3):206-13. Epub Jan. 22, 2016.
Purwada et al., Modular Immune Organoids with Integrin Ligand Specificity Differentially Regulate Ex Vivo B Cell Activation. ACS Biomater Sci Eng. Feb. 13, 2017;3(2):214-225. doi: 10.1021/acsbiomaterials.6b00474. Epub Jan. 5, 2017.
Rabinowitz et al., Transforming growth factor β signaling controls activities of human intestinal CD8(+)T suppressor cells. Gastroenterology. Mar. 2013;144(3):601-612.e1. doi: 10.1053/j.gastro.2012.12.001. Epub Dec. 8, 2012.
Rennert et al., A microfluidically perfused three dimensional human liver model. Biomaterials. Dec. 2015;71:119-131. doi: 10.1016/j.biomaterials.2015.08.043. Epub Aug. 25, 2015.
Rogoz et al., A 3-D enteroid-based model to study T-cell and epithelial cell interaction. J Immunol Methods. Jun. 2015;421:89-95. doi: 10.1016/j.jim.2015.03.014. Epub Apr. 2, 2015.
Sachs et al., Intestinal epithelial organoids fuse to form self-organizing tubes in floating collagen gels. Development. Mar. 15, 2017;144(6):1107-12.
Sadelain et al., Therapeutic T cell engineering. Nature. May 24, 2017;545(7655):423-431.
Santhanam et al., Upregulated pathways and products of tryptophan metabolism is associated with the neoplastic transition in the colon epithelium. AGA Abstracts. Su1195. 1 page.
Schumacher et al., The use of murine-derived fundic organoids in studies of gastric physiology. J Physiol. Apr. 15, 2015;593(8):1809-27. doi: 10.1113/jphysiol.2014.283028. Epub Feb. 19, 2015.
Sebestyen et al., RhoB Mediates Phosphoantigen Recognition by Vγ9Vδ2 T Cell Receptor. Cell Rep. May 31, 2016;15(9):1973-85. doi: 10.1016/j.celrep.2016.04.081. Epub May 19, 2016.
Shiina et al., MHC genotyping in human and nonhuman species by PCR-based next-generation sequencing. Next Generation Sequencing—Advances, Applications and Challenges:Chapter 3. 2015.
Tian et al., Integrin-specific hydrogels as adaptable tumor organoids for malignant B and T cells. Biomaterials. Dec. 2015;73:110-9. doi: 10.1016/j.biomaterials.2015.09.007. Epub Sep. 11, 2015.

(56) References Cited

OTHER PUBLICATIONS

Upton et al., De novo synthesis of T cells from mPB CD34+ cells cultured in a 3-dimensional thymic organoid. Blood. 2003; 102(11): 279a.

U.S. Appl. No. 60/339,739, filed Dec. 10, 2001, Tang et al.

JP Notice of Reasons for Rejection mailed Sep. 3, 2012, for Application No. JP2011- 547839.

JP Notice of Reasons for Rejection mailed Oct. 3, 2013, for Application No. JP2012-158676.

JP Notice of Reasons for Rejection mailed Sep. 7, 2015, for Application No. JP2013- 521247.

International Search Report and Written Opinion dated Jun. 3, 2019, for Application No. PCT/EP2018/086716.

International Preliminary Report on Patentability dated Jul. 2, 2020, for Application No. PCT/EP2018/086716.

"The Wnt Family of Secreted Proteins", R&D Systems' 2004 Catalog, 7 pages (Jan. 1, 2004).

[No Author Listed] "Art Levinson, Sergey Brin and Anne Wojcicki, Mark Zuckerberg and Priscilla Chan, and Yuri Milner Announce the Breakthrough Prize in Life Sciences", Breakthrough Prize. Feb. 20, 2013: 3pgs. https://breakthroughprize.org/News/12.

[No Author Listed] An open label dose-escalation study of a self-complementary adeno-associated viral vector (scAAV2/8-LP1-hFIXco) for gene transfer in hemophilia B. ClinicalTrials.gov Archive. Jun. 29, 2010. Identifier NCT00979238. http://clinicaltrials.gov/archive/NTC00979238/2010_06_29. 3 pages.

[No Author Listed] Cancer Genome Atlas Network. Comprehensive genomic characterization of head and neck squamous cell carcinomas. Nature. Jan. 29, 2015;517(7536):576-82. doi: 10.1038/nature14129.

[No Author Listed] Definition of "Organoid", MediLexicon Dictionary. 2006, p. 1. http://www.medilexicon.com/medicaldictionary.php?t=63274.

[No Author Listed] G.I Research. 2004;12(2):3-10. Japanese.

[No Author Listed] Gastroenterology. 2005;128(4):Suppl. 2, A702. Abstract S1225.

[No Author Listed] Ministry of Health, Labour and Welfare, Ethical guidelines for clinical studies. Dated Jul. 30, 2003: p. 3. Accessed from <http://www.mhlw.go.jp/general/seido/kousei/i-kenkyu/rinsyo/dl/shishin.pdf.> Japanese.

[No Author Listed] Notch Signaling Pathway. Retrieved from the internet <https://www.sinobiological.com/pathways/notch-pathway> Nov. 5, 2020. 3 pages.

[No Author Listed] Purified Human Pancreatic Islets, In Vivo Islets Function. Document No. 3104, A04, Effective Date Jul. 7, 2008. DAIT, NIAID, NIH.

[No Author Listed] TGF-beta Inhibitor. Retrieved from the internet <https://kr.sinobiological.com/resource/cytokines/tgf-beta-inhibitors> Nov. 5, 2020. 6 pages.

[No Author Listed] TGF-beta Signaling Pathway. Retrieved from the internet <https://www.sinobiological.com/pathways/tgf-beta-pathway> Nov. 5, 2020. 3 pages.

[No Author Listed] The Wnt family of secreted proteins. R&D Systems. Jan. 1, 2004. http://www.rndsystems.com/mini_review_detail_objectname_MR04_WntFamily.aspx. 7 pages.

Abe et al., Apoptosis of mouse pancreatic acinar cells after duct ligation. Arch Histol Cytol. Jun. 1995;58(2):221-9.

Abud et al., Growth of intestinal epithelium in organ culture is dependent on EGF signalling. Exp Cell Res. Feb. 15, 2005;303(2):252-62.

Afroze et al., "The physiological roles of secretin and its receptor." Ann Transl Med. Oct. 2013; 1(3):29. doi: 10.3978/j.issn.2305-5839.2012.12.01.

Ahmed et al., Extracellular Matrix Regulation of Stem Cell Behavior. Curr Stem Cell Rep. 2016;2(3):197-206. doi: 10.1007/s40778-016-0056-2. Epub Jul. 7, 2016.

Aini et al. Accelerated telomere reduction and hepatocyte senescence in tolerated human liver allografts. Transpl Immunol. Aug. 2014;31(2):55-9. doi: 10.1016/j.trim.2014.06.008. Epub Jun. 30, 2014.

Al-Lazikani et al., Standard conformations for the canonical structures of immunoglobulins. J Mol Biol. Nov. 7, 1997;273(4):927-48. doi: 10.1006/jmbi.1997.1354.

Amado et al., Lentiviral vectors—the promise of gene therapy within reach? Science. Jul. 30, 1999;285(5428):674-6.

Anders et al., Differential expression analysis for sequence count data. Genome Biol. 2010; 11(10):R106. doi: 10.1186/GB-2010-11-10-r106. Epub Oct. 27, 2010.

Anderson, Human gene therapy. Nature. Apr. 30, 1998;392(6679 Suppl):25-30.

Andersson et al., Pharmacokinetics of cisplatin and its monohydrated complex in humans. J Pharm Sci. Aug. 1996;85(8):824-7. doi: 10.1021/js960037a.

Apelqvist et al., Notch signalling controls pancreatic cell differentiation. Nature. Aug. 26, 1999;400(6747):877-81.

Apte et al., Wnt/beta-catenin signaling mediates oval cell response in rodents. Hepatology. Jan. 2008;47(1):288-95.

Argiris et al., Head and neck cancer. Lancet. May 17, 2008;371(9625):1695-709. doi: 10.1016/S0140-6736(08)60728-X. Author Manuscript, 32 pages.

Azuma et al., Robust expansion of human hepatocytes in Fah-/-/Rag2-/-/Il2rg-/- mice. Nat Biotechnol. Aug. 2007;25(8):903-10. Epub Jul. 29, 2007. Author manuscript available in PMC Jul. 25, 2012.

Bainbridge et al., Effect of gene therapy on visual function in Leber's congenital amaurosis. N Engl J Med. May 22, 2008;358(21):2231-9. doi: 10.1056/NEJMoa0802268. Epub Apr. 27, 2008.

Bakkebø et al., TGF-β-induced growth inhibition in B-cell lymphoma correlates with Smad1/5 signalling and constitutively active p38 MAPK. BMC Immunol. Nov. 23, 2010;11:57. doi: 10.1186/1471-2172-11-57.

Barker et al., Identification of stem cells in small intestine and colon by marker gene Lgr5. Nature. Oct. 25, 2007;449(7165):1003-7. Epub Oct. 14, 2007.

Barker et al., Lgr proteins in epithelial stem cell biology. Development. Jun. 2013;140(12):2484-94.

Barker et al., Lgr5(+ve) stem cells drive self-renewal in the stomach and build long-lived gastric units in vitro. Cell Stem Cell. Jan. 8, 2010;6(1):25-36.

Barker et al., The intestinal stem cell. Genes Dev. Jul. 15, 2008;22(14):1856-64.

Barker et al., Tissue-resident adult stem cell populations of rapidly self-renewing organs. Cell Stem Cell. Dec. 3, 2010;7(6):656-70.

Barrentina et al., The Cancer Cell Line Encyclopedia enables predictive modelling of anticancer drug sensitivity. Nature. Mar. 28, 2012;483(7391):603-7. doi: 10.1038/nature11003. Erratum in: Nature. Dec. 13, 2012;492(7428):290. Erratum in: Nature. Jan. 2019;565(7738):E5-E6.

Bartfeld et al., In vitro expansion of human gastric epithelial stem cells and their responses to bacterial infection. Gastroenterology. Jan. 2015;148(1):126-136.e6. doi: 10.1053/j.gastro.2014.09.042. Epub Oct. 13, 2014.

Batlle et al., Beta-catenin and TCF mediate cell positioning in the intestinal epithelium by controlling the expression of EphB/ephrinB. Cell. Oct. 18, 2002;111(2):251-63.

Bhosale et al., Chromosomal Alterations and Gene Expression Changes Associated with the Progression of Leukoplakia to Advanced Gingivobuccal Cancer. Transl Oncol. Jun. 2017;10(3):396-409. doi: 10.1016/j.tranon.2017.03.008. Epub Apr. 21, 2017.

Bigorgne et al., TTC7A mutations disrupt intestinal epithelial apicobasal polarity. J Clin Invest. Jan. 2014;124(1):328-37. doi: 10.1172/JCI71471.

Billerbeck et al., Humanized mice efficiently engrafted with fetal hepatoblasts and syngeneic immune cells develop human monocytes and NK cells. J Hepatol. Aug. 2016;65(2):334-43. doi: 10.1016/j.jhep.2016.04.022. Epub May 2, 2016.

Binnerts et al., R-Spondin1 regulates Wnt signaling by inhibiting internalization of LRP6. Proc Natl Acad Sci U S A. Sep. 11, 2007;104(37):14700-5. Epub Sep. 2007.

Bjerknes et al., Clonal analysis of mouse intestinal epithelial progenitors. Gastroenterology. Jan. 1999;116(1):7-14.

(56) References Cited

OTHER PUBLICATIONS

Bjerknes et al., Intestinal epithelial stem cells and progenitors. Methods Enzymol. 2006;419:337-83.

Bjerknes et al., Multipotential stem cells in adult mouse gastric epithelium. Am J Physiol Gastrointest Liver Physiol. Sep. 2002;283(3):G767-77.

Blanpain et al., Epithelial stem cells: turning over new leaves. Cell. Feb. 9, 2007;128(3):445-58.

Bodnar et al., Characterization of human islet-like structures generated from pancreatic precursor cells in culture. Biotechnol Bioeng. Apr. 5, 2006;93(5):980-8.

Boj et al., Organoid models of human and mouse ductal pancreatic cancer. Cell. Jan. 15, 2015;160(1-2):324-38. doi: 10.1016/j.cell. 2014.12.021. Epub Dec. 31, 2014.

Bonaguidi et al., LIF and BMP signaling generate separate and discrete types of GFAP-expressing cells. Development. Dec. 2005;132(24):5503-14.

Bonaguidi et al., Noggin expands neural stem cells in the adult hippocampus. J Neurosci. Sep. 10, 2008;28(37):9194-204. doi: 10.1523/JNEUROSCI.3314-07.2008.

Bonner-Weir et al., In vitro cultivation of human islets from expanded ductal tissue. Proc Natl Acad Sci U S A. Jul. 5, 2000;97(14):7999-8004.

Bonner-Weir et al., New sources of pancreatic beta-cells. Nat Biotechnol. Jul. 2005;23(7):857-61.

Booth et al., Maintenance of functional stem cells in isolated and cultured adult intestinal epithelium. Exp Cell Res. Jun. 15, 1999;249(2):359-66.

Booth et al., The isolation and culture of adultmouse colonic epithelium. Epithelial Cell Biol. 1995;4(2):76-86.

Bossi et al., Prognostic and predictive value of EGFR in head and neck squamous cell carcinoma. Oncotarget. Nov. 8, 2016;7(45):74362-74379. doi: 10.18632/oncotarget.11413.

Bottenstein et al., Growth of a rat neuroblastoma cell line in serum-free supplemented medium. Proc Natl Acad Sci U S A. Jan. 1979;76(1):514-7.

Bottenstein et al., Growth of a rat neuroblastoma cell line in serum-free supplemented medium. Proc Natl Acad Sci U S A. Jan. 1979;76(1):514-7. doi: 10.1073/pnas.76.1.514.

Boutten et al., Oncostatin M is a potent stimulator of alpha1-antitrypsin secretion in lung epithelial cells: modulation by transforming growth factor-beta and interferon-gamma. Am J Respir Cell Mol Biol. Apr. 1998;18(4):511-20. doi: 10.1165/ajrcmb.18.4.2772.

Bouwens et al., Regulation of pancreatic beta-cell mass. Physiol Rev. Oct. 2005;85(4):1255-70.

Braakhuis et al., The potential of the nude mouse xenograft model for the study of head and neck cancer. Arch Otorhinolaryngol. 1984;239(1):69-79. doi: 10.1007/BF00454264.

Brassard et al., Engineering Stem Cell Self-organization to Build Better Organoids. Cell Stem Cell. Jun. 6, 2019;24(6):860-876. doi: 10.1016/j.stem.2019.05.005.

Brewer et al., Optimized survival of hippocampal neurons in B27-supplemented Neurobasal, a new serum-free medium combination. J Neurosci Res. Aug. 1, 1993;35(5):567-76.

Brinster et al., Regulation of metallothionein--thymidine kinase fusion plasmids injected into mouse eggs. Nature. Mar. 4, 1982;296(5852):39-42.

Brockbank et al., Cryopreservation Guide. 2007. Retrieved from the Internet: https://www.thermofisher.co.nz/Uploads/file/Scientific/Applications/Equipment-Furniture/Cryopreservation-Guide.pdf on May 2, 2019. 30 pages.

Broutier et al., Culture and establishment of self-renewing human and mouse adult liver and pancreas 3D organoids and their genetic manipulation. Nat Protoc. Sep. 2016;11(9):1724-43. doi: 10.1038/nprot.2016.097. Epub Aug. 25, 2016.

Broutier et al., Human primary liver cancer-derived organoid cultures for disease modeling and drug screening. Nat Med. Dec. 2017;23(12):1424-1435. doi: 10.1038/nm.4438. Epub Nov. 13, 2017.

Buczacki et al., Intestinal label-retaining cells are secretory precursors expressing Lgr5. Nature. Mar. 7, 2013; 495(7439):65-9. doi: 10.1038/nature11965. Epub Feb. 27, 2013.

Burke et al., Liver zonation occurs through a beta-catenin-dependent, c-Myc-independent mechanism. Gastroenterology. Jun. 2009;136(7):2316-2324.e1-3. doi: 10.1053/j.gastro.2009.02.063. Epub Mar. 5, 2009.

Buset et al., Defining conditions to promote the attachment of adult human colonic epithelial cells. In Vitro Cell Dev Biol. Jun. 1987;23(6):403-12.

Byron et al., Anti-integrin monoclonal antibodies. J Cell Sci. Nov. 15, 2009;122(Pt 22):4009-11. doi: 10.1242/jcs.056770.

Cai et al., Dysregulations in the PI3K pathway and targeted therapies for head and neck squamous cell carcinoma. Oncotarget. Mar. 28, 2017;8(13):22203-22217. doi: 10.18632/oncotarget.14729.

Calderwood DA. Integrin activation. J Cell Sci. Feb. 15, 2004;117(Pt 5):657-66. doi: 10.1242/jcs.01014.

Capaccio et al., Modern management of obstructive salivary diseases. Acta Otorhinolaryngol Ital. Aug. 2007;27(4):161-72.

Caplen et al., Specific inhibition of gene expression by small double-stranded RNAs in invertebrate and vertebrate systems. Proc Natl Acad Sci U S A. Aug. 14, 2001;98(17):9742-7. Epub Jul. 31, 2001.

Carraway et al., Neuregulin-2, a new ligand of ErbB3/ErbB4-receptor tyrosine kinases. Nature. May 29, 1997; 387(6632):512-6.

Cassiman et al. The vagal nerve stimulates activation of the hepatic progenitor cell compartment via muscarinic acetylcholine receptor type 3. Am J Pathol. Aug. 2002;161(2):521-30.

Castillo-Gonzalez et al., Dysregulated cholinergic network as a novel biomarker of poor prognostic in patients with head and neck squamous cell carcinoma. BMC Cancer. May 10, 2015;15:385. doi: 10.1186/s12885-015-1402-y.

Cavalieri et al., Efficacy and safety of single-agent pan-human epidermal growth factor receptor (HER) inhibitor dacomitinib in locally advanced unresectable or metastatic skin squamous cell cancer. Eur J Cancer. Jul. 2018;97:7-15. doi: 10.1016/j.ejca.2018. 04.004. Epub May 4, 2018.

Chai et al., Wnt signaling induces proliferation of sensory precursors in the postnatal mouse cochlea. Proc Natl Acad Sci U S A. May 22, 2012;109(21):8167-72. doi: 10.1073/pnas.1202774109. Epub May 4, 2012.

Chapman et al., Analysis of spatial and temporal gene expression patterns in blastula and gastrula stage chick embryos. Dev Biol. May 1, 2002;245(1):187-99.

Chatterjee et al., Induced Pluripotent Stem (IPS) Cell Culture Methods and Induction of Differentiation into Endothelial Cells. Methods Mol Biol. 2016;1357:311-27.

Chen et al., Small molecule-mediated disruption of Wnt-dependent signaling in tissue regeneration and cancer. Nat Chem Biol. Feb. 2009;5(2):100-7. Epub Jan. 4, 2009.

Cheng et al., Central and peripheral administration of secretin inhibits food intake in mice through the activation of the melanocortin system. Neuropsychopharmacology. Jan. 2011; 36(2):459-71. doi: 10.1038/npp.2010.178. Epub Oct. 6, 2010.

Cheng et al., Origin, differentiation and renewal of the four main epithelial cell types in the mouse small intestine. I. Columnar cell. Am J Anat. Dec. 1974;141(4):461-79.

Chun et al., A new selective and potent inhibitor of human cytochrome P450 1B1 and its application to antimutagenesis. Cancer Res. Nov. 15, 2001;61(22):8164-70. Erratum in: Cancer Res Feb. 15, 2002;62(4):1232.

Clarke et al., Cancer stem cells—perspectives on current status and future directions: AACR Workshop on Cancer Stem Cells. Cancer Res. 2006;66:9339-44.

Clarkson et al., Oral Viral Infections: Diagnosis and Management. Dent Clin North Am. Apr. 2017;61(2):351-363. doi: 10.1016/j.cden. 2016.12.005.

Clevers et al. Cell Technology. 2009; 28(7):702-03. Japanese.

Clevers, Modeling Development and Disease with Organoids. Cell. Jun. 16, 2016;165(7):1586-1597. doi: 10.1016/j.cell.2016.05.082.

Clotman et al., Control of liver cell fate decision by a gradient of TGFβ signaling modulated by Onecut transcription factors. Genes & Dev. 2005; 19:1849-54.

(56) References Cited

OTHER PUBLICATIONS

Co et al., Controlling Epithelial Polarity: A Human Enteroid Model for Host-Pathogen Interactions. Cell Rep. Feb. 26, 2019;26(9):2509-2520.e4. doi: 10.1016/j.celrep.2019.01.108.
Cole et al., Measuring GSK3 expression and activity in cells. Methods Mol Biol. 2008; 468:45-65. doi: 10.1007/978-1-59745-249-6_4.
Corro et al., A brief history of organoids. Am J Physiol Cell Physiol. Jul. 1, 2020;319(1):C151-C165. doi: 10.1152/ajpcell.00120.2020. Epub May 27, 2020.
Couchie et al., In vitro differentiation of WB-F344 rat liver epithelial cells into the biliary lineage. Differentiation. Jan. 2002;69(4-5):209-15. doi: 10.1046/j.1432-0436.2002.690414.x.
Crawford et al., The notch response inhibitor DAPT enhances neuronal differentiation in embryonic stem cell-derived embryoid bodies independently of sonic hedgehog signaling. Dev Dyn. Mar. 2007;236(3):886-92.
Crosnier et al., Organizing cell renewal in the intestine: stem cells, signals and combinatorial control. Nat Rev Genet. May 2006;7(5):349-59.
Cruz-Acuna et al., Synthetic hydrogels for human intestinal organoid generation and colonic wound repair. Nat Cell Biol. Nov. 2017;19(11):1326-1335. doi: 10.1038/ncb3632. Epub Oct. 23, 2017.
Cuny et al., Structure-activity relationship study of bone morphogenetic protein (BMP) signaling inhibitors. Bioorg Med Chem Lett. Aug. 1, 2008; 18(15):4388-92. doi: 10.1016/j.bmcl.2008.06.052. Epub Jun. 27, 2008.
De Gouville et al., Inhibition of TGF-β signaling by an ALK5 inhibitor protects rats from dimethylnitrosamine-induced liver fibrosis. Br J Pharmacol. May 2005;145(2):166-77.
De La Costa et al., Somatic mutations of the beta-catenin gene are frequent in mouse and human hepatocellular carcinomas. Proc Natl Acad Sci U S A. Jul. 21, 1998;95(15):8847-51. doi: 10.1073/pnas.95.15.8847.
De Lau et al., Lgr5 homologues associate with Wnt receptors and mediate R-spondin signalling. Nature. Jul. 4, 2011;476(7360):293-7. doi: 10.1038/nature10337.
De Lau et al., The R-spondin protein family. Genome Biol. 2012;13(3):242. doi: 10.1186/gb-2012-13-3-242.
De Lau et al., The R-spondin/Lgr5/Rnf43 module: regulator of Wnt signal strength. Genes Dev. Feb. 15, 2014;28(4):305-16. doi: 10.1101/gad.235473.113.
Dekkers et al., A functional CFTR assay using primary cystic fibrosis intestinal organoids. Nat Med. Jul. 2013; 19(7):939-45. doi: 10.1038/nm.3201. Epub Jun. 2, 2013.
Denu, Vitamin B3 and sirtuin function. Trends Biochem Sci. Sep. 2005;30(9):479-83.
Deveney et al., Establishment of human colonic epithelial cells in long-term culture. J Surg Res. Aug. 1996;64(2):161-9.
Dey et al., Phenotypic and functional characterization of human mammary stem/progenitor cells in long term culture. PLoS One. 2009;4(4):e5329. doi: 10.1371/journal.pone.0005329. Epub Apr. 24, 2009.
Dignass et al., Peptide growth factors in the intestine. Eur J Gastroenterol Hepatol. Jul. 2001;13(7):763-70.
Dijkstra et al., Generation of Tumor-Reactive T Cells by Co-culture of Peripheral Blood Lymphocytes and Tumor Organoids. Cell. Sep. 6, 2018;174(6):1586-1598.e12. doi: 10.1016/j.cell.2018.07.009. Epub Aug. 9, 2018.
Dollé et al., EpCAM and the biology of hepatic stem/progenitor cells. Am J Physiol Gastrointest Liver Physiol. Feb. 1, 20155;308(4):G233-50. doi: 10.1152/ajpgi.00069.2014. Epub Dec. 4, 2014.
Dong et al., The epithelial-mesenchymal transition promotes transdifferentiation of subcutaneously implanted hepatic oval cells into mesenchymal tumor tissue. Stem Cells Dev. Nov. 2009;18(9):1293-8. doi: 10.1089/scd.2008.0321.
Dontu et al., Role of Notch signaling in cell-fate determination of human mammary stem/progenitor cells. Breast Cancer Res. 2004; 6(6):R605-15. Epub Aug. 1, 20046.
Dor et al., Adult pancreatic beta-cells are formed by self-duplication rather than stem-cell differentiation. Nature. May 6, 2004;429(6987):41-6.
Dorrell et al., Surface markers for the murine oval cell response. Hepatology. Oct. 2008; 48(4):1282-91. doi: 10.1002/hep.22468.
Dou et al., Expanding Sca-1(+) mammary stem cell in the presence of oestrogen and growth hormone. Clin Transl Oncol. Jun. 2012; 14(6):444-51. doi: 10.1007/s12094-012-0822-2.
Drew et al., Comparison of 2 cell-based phosphoprotein assays to support screening and development of an ALK inhibitor. J Biomol Screen. Feb. 2011;16(2):164-73. doi: 10.1177/1087057110394657.
Driehuis et al., Oral Mucosal Organoids as a Potential Platform for Personalized Cancer Therapy. Cancer Discov. Jul. 2019;9(7):852-871. doi: 10.1158/2159-8290.CD-18-1522. Epub May 3, 2019. Erratum in: Cancer Discov. Mar. 2020;10(3):476.
Driehuis et al., WNT signalling events near the cell membrane and their pharmacological targeting for the treatment of cancer. Br J Pharmacol. Dec. 2017; 174(24):4547-4563. doi: 10.1111/bph.13758. Epub Apr. 4, 2017.
Drost et al., Organoid culture systems for prostate epithelial and cancer tissue. Nat Protoc. Feb. 2016;11(2):347-58. doi: 10.1038/nprot.2016.006. Epub Jan. 2, 20161.
Drost et al., Organoids in cancer research. Nat Rev Cancer. Jul. 2018; 18(7):407-418. doi: 10.1038/s41568-018-0007-6.
Drost et al., Sequential cancer mutations in cultured human intestinal stem cells. Nature. May 7, 2015;521(7550):43-7. doi: 10.1038/nature14415. Epub Apr. 2, 20159.
D'SOUZA et al., Case-control study of human papillomavirus and oropharyngeal cancer. N Engl J Med. May 1, 20070;356(19):1944-56. doi: 10.1056/NEJMoa065497.
Duncan et al., The ploidy conveyor of mature hepatocytes as a source of genetic variation. Nature. Oct. 7, 2010;467(7316):707-10. doi: 10.1038/nature09414. Epub Sep. 2, 20102.
Dutta et al., A key tyrosine (Y1494) in the beta4 integrin regulates multiple signaling pathways important for tumor development and progression. Cancer Res. Nov. 1, 2008;68(21):8779-87. doi: 10.1158/0008-5472.CAN-08-2125.
Eccles, The epidermal growth factor receptor/Erb-B/HER family in normal and malignant breast biology. Int J Dev Biol. 2011; 55(7-9):685-96. doi: 10.1387/ijdb. 113396se.
Economopoulou et al., The emerging role of immunotherapy in head and neck squamous cell carcinoma (HNSCC): anti-tumor immunity and clinical applications. Ann Transl Med. May 2016;4(9):173. doi: 10.21037/atm.2016.03.34.
Eden et al., GOrilla: a tool for discovery and visualization of enriched GO terms in ranked gene lists. BMC Bioinformatics. Feb. 3, 2009;10:48. doi: 10.1186/1471-2105-10-48.
Egan et al., Notch receptors, partners and regulators—from conserved domains to powerful functions. Experimental Med. 1998;16(3):200-229. Japanese.
Egerod et al., A major lineage of enteroendocrine cells coexpress CCK, secretin, GIP, GLP-1, PYY, and neurotensin but not somatostatin. Endocrinology. Dec. 2012; 153(12):5782-95. doi: 10.1210/en.2012-1595. Epub Oct. 12, 2012.
Egles et al., Integrin-blocking antibodies delay keratinocyte re-epithelialization in a human three-dimensional wound healing model. PLoS One. May 21, 2010;5(5):e10528. doi: 10.1371/journal.pone.0010528.
Elbashir et al., Duplexes of 21-nucleotide RNAs mediate RNA interference in cultured mammalian cells. Nature. May 24, 2001;411(6836):494-8.
Engelhardt et al., Detection of alpha-foetoprotein in mouse liver differentiated hepatocytes before their progression through S phase. Nature. Sep. 9, 1976;263(5573):146-8.
English Abstract of Sato et al., GI Research, 2004; 12(2):3-10. 1 page.
Etienne et al., Visualization of herpes simplex virus type 1 virions using fluorescent colors. J Virol Methods. Mar. 2017;241:46-51. doi: 10.1016/j.jviromet.2016.12.012. Epub Dec. 21, 2016. Author Manuscript, 14 pages.
Evans et al., The development of a method for the preparation of rat intestinal epithelial cell primary cultures. J Cell Sci. Jan. 1992;101 (Pt 1):219-31.

(56) References Cited

OTHER PUBLICATIONS

Evarts et al., A precursor-product relationship exists between oval cells and hepatocytes in rat liver. Carcinogenesis. Nov. 1987;8(11):1737-40.
Faas et al., Virtual nanoscopy: generation of ultra-large high resolution electron microscopy maps. J Cell Biol. Aug. 6, 2012;198(3):457-69. doi: 10.1083/jcb.201201140.
Fan et al., Cholangiocarcinomas can originate from hepatocytes in mice. J Clin Invest. Aug. 2012;122(8):2911-5. doi: 10.1172/JCI63212. Epub Jul. 17, 2012.
Farin et al., Redundant sources of Wnt regulate intestinal stem cells and promote formation of Paneth cells. Gastroenterology. Dec. 2012; 143(6):1518-1529.e7. doi: 10.1053/j.gastro.2012.08.031. Epub Aug. 23, 2012.
Farin et al., Visualization of a short-range Wnt gradient in the intestinal stem-cell niche. Nature. Feb. 18, 2016; 530(7590):340-3. doi: 10.1038/nature16937. Epub Feb. 10, 2016.
Federico, Lentiviruses as gene delivery vectors. Curr Opin Biotechnol. Oct. 1999;10(5):448-53.
Fitzmaurice et al., Global, Regional, and National Cancer Incidence, Mortality, Years of Life Lost, Years Lived With Disability, and Disability-Adjusted Life-years for 32 Cancer Groups, 1990 to 2015: A Systematic Analysis for the Global Burden of Disease Study. JAMA Oncol. Apr. 1, 2017;3(4):524-548. doi: 10.1001/jamaoncol.2016.5688. Erratum in: JAMA Oncol. Mar. 1, 2017;3(3):418. Author Manuscript, 56 pages.
Font-Burgada et al., Hybrid Periportal Hepatocytes Regenerate the Injured Liver without Giving Rise to Cancer. Cell. Aug. 13, 2015;162(4):766-79. doi: 10.1016/j.cell.2015.07.026.
Freed-Pastor et al., Mutant p53: one name, many proteins. Genes Dev. Jun. 15, 2012;26(12):1268-86. doi: 10.1101/gad.190678.112.
Fritsch et al., Characterization of the novel and specific PI3Kα inhibitor NVP-BYL719 and development of the patient stratification strategy for clinical trials. Mol Cancer Ther. May 2014;13(5):1117-29. doi: 10.1158/1535-7163.MCT-13-0865. Epub Mar. 7, 2014.
Fuchs O. Inhibition of TGF-signaling for the treatment of tumor metastasis and fibrotic diseases. Current Signal Transduction Therapy. Jan. 1, 2011;6(1):29-43.
Fuchs, Inhibition of TGF-β signaling for the treatment of tumor metastasis and fibrotic diseases. Curr Signal Transduction Ther. 2011;6:29-43.
Fujii et al., A Colorectal Tumor Organoid Library Demonstrates Progressive Loss of Niche Factor Requirements during Tumorigenesis. Cell Stem Cell. Jun. 2, 2016;18(6):827-838. doi: 10.1016/j.stem.2016.04.003. Epub May 19, 2016.
Fukamachi, Proliferation and differentiation of fetal rat intestinal epithelial cells in primary serum-free culture. J Cell Sci. Oct. 1992;103 ( Pt 2):511-9.
Furth et al., Temporal control of gene expression in transgenic mice by a tetracycline-responsive promoter. Proc Natl Acad Sci U S A. Sep. 27, 1994;91(20):9302-6.
Furuyama et al., Continuous cell supply from a Sox9-expressing progenitor zone in adult liver, exocrine pancreas and intestine. Nat Genet. Jan. 2011;43(1):34-41. doi: 10.1038/ng.722. Epub 2010.
Gao et al., Biology of AAV serotype vectors in liver-directed gene transfer to nonhuman primates. Mol Ther. Jan. 2006;13(1):77-87. Epub Oct. 10, 2005.
Garraway et al., Human prostate sphere-forming cells represent a subset of basal epithelial cells capable of glandular regeneration in vivo. Prostate. Apr. 1, 2010;70(5):491-501. doi: 10.1002/pros.21083.
Geiduschek et al., Transcription by RNA polymerase III. Annu Rev Biochem. 1988;57:873-914.
Gerbal-Chaloin et al., The WNT/β-catenin pathway is a transcriptional regulator of CYP2E1, CYP1A2, and aryl hydrocarbon receptor gene expression in primary human hepatocytes. Mol Pharmacol. Dec. 2014; 86(6):624-34. doi: 10.1124/mol.114.094797. Epub Sep. 16, 2014.
Ghasemi et al., High-throughput testing in head and neck squamous cell carcinoma identifies agents with preferential activity in human papillomavirus-positive or negative cell lines. Oncotarget. May 25, 2018;9(40):26064-26071. doi: 10.18632/oncotarget.25436.
Ghosh et al., Activity assay of epidermal growth factor receptor tyrosine kinase inhibitors in triple-negative breast cancer cells using peptide-conjugated magnetic beads. Assay Drug Dev Technol. Feb. 2013; 11(1):44-51. doi: 10.1089/adt.2012.454. Epub Sep. 20, 2012.
Gillison et al., A causal role for human papillomavirus in head and neck cancer. Lancet. May 8, 2004;363(9420):1488-9. doi: 10.1016/S0140-6736(04)16194-1.
Githens et al., Rat pancreatic interlobular duct epithelium: isolation and culture in collagen gel. In Vitro Cell Dev Biol. Aug. 1989;25(8):679-88.
Gjorevski et al., Designer matrices for intestinal stem cell and organoid culture. Nature. Nov. 24, 2016;539(7630):560-564. doi: 10.1038/nature20168. Epub Nov. 16, 2016.
Gonçalves et al., Adeno-associated virus: from defective virus to effective vector. Virol J. 2005;2:43. 17 pages.
Gonzalez et al., Identification of 9 genes differentially expressed in head and neck squamous cell carcinoma. Arch Otolaryngol Head Neck Surg. Jul. 2003;129(7):754-9. doi: 10.1001/archotol.129.7.754.
González et al., Notch Inhibition Prevents Differentiation of Human Limbal Stem/Progenitor Cells in vitro. Sci Rep. Jul. 17, 2019;9(1):10373.
Gossen et al., Tight control of gene expression in mammalian cells by tetracycline-responsive promoters. Proc Natl Acad Sci U S A. Jun. 15, 1992;89(12):5547-51.
Gradwohl et al., neurogenin3 is required for the development of the four endocrine cell lineages of the pancreas. Proc Natl Acad Sci U S A. Feb. 15, 2000;97(4):1607-11.
Greene et al., Partial hepatectomy in the mouse: technique and perioperative management. J Invest Surg. Mar.-Apr. 2003;16(2):99-102.
Gregorieff et al., Expression pattern of Wnt signaling components in the adult intestine. Gastroenterology. Aug. 2005;129(2):626-38.
Gregorieff et al., Wnt signaling in the intestinal epithelium: from endoderm to cancer. Genes Dev. Apr. 15, 2005;19(8):877-90.
Griffin et al., Human keratinocyte cultures in the investigation of early steps of human papillomavirus infection. Methods Mol Biol. 2014;1195:219-38. doi: 10.1007/7651_2013_49. Author Manuscriptt, 19 pages.
Grompe, Fah Knockout Animals as Models for Therapeutic Liver Repopulation. Adv Exp Med Biol. 2017;959:215-230.
Grompe, Liver stem cells, where art thou? Cell Stem Cell. Sep. 4, 2014;15(3):257-258. doi: 10.1016/j.stem.2014.08.004. PMID: 25192457.
Grossmann et al., Progress on isolation and short-term ex-vivo culture of highly purified non-apoptotic human intestinal epithelial cells (IEC). Eur J Cell Biol. May 2003;82(5):262-70.
Grün et al., Single-cell messenger RNA sequencing reveals rare intestinal cell types. Nature. Sep. 10, 2015;525(7568):251-5. doi: 10.1038/nature14966. Epub Aug. 19, 2015.
Gu et al., Direct evidence for the pancreatic lineage: NGN3+ cells are islet progenitors and are distinct from duct progenitors. Development. May 2002;129(10):2447-57.
Guan et al., A meta-analysis comparing cisplatin-based to carboplatin-based chemotherapy in moderate to advanced squamous cell carcinoma of head and neck (SCCHN). Oncotarget. Feb. 9, 2016;7(6):7110-9. doi: 10.18632/oncotarget.6858.
Gunawardene et al., Classification and functions of enteroendocrine cells of the lower gastrointestinal tract. Int J Exp Pathol. Aug. 2011;92(4):219-31. doi: 10.1111/j.1365-2613.2011.00767.x. Epub Apr. 25, 2011.
Gupta et al., Compilation of small RNA sequences. Nucleic Acids Res. Apr. 25, 1991;19 Suppl:2073-5.
Haegebarth et al., Wnt signaling, lgr5, and stem cells in the intestine and skin. Am J Pathol. Mar. 2009;174(3):715-21. doi: 10.2353/ajpath.2009.080758. Epub Feb. 5, 2009.
Hall et al., The alpha 1/beta 1 and alpha 6/beta 1 integrin heterodimers mediate cell attachment to distinct sites on laminin. J Cell Biol. Jun. 1990;110(6):2175-84. doi: 10.1083/jcb.110.6.2175.
Halpern et al., Single-cell spatial reconstruction reveals global division of labour in the mammalian liver. Nature. Feb. 16,

(56) References Cited

OTHER PUBLICATIONS

2017;542(7641):352-356. doi: 10.1038/nature21065. Epub Feb. 6, 2017. Erratum in: Nature. Mar. 30, 2017;543(7647):742.

Hanna et al., Human embryonic stem cells with biological and epigenetic characteristics similar to those of mouse ESCs. Proc Natl Acad Sci U S A. May 18, 2010;107(20):9222-7. doi: 10.1073/pnas.1004584107. Epub May 4, 2010.

Hao et al., Beta-cell differentiation from nonendocrine epithelial cells of the adult human pancreas. Nat Med. Mar. 2006;12(3):310-6. Epub Feb. 19, 2006.

Harada et al., Rapid formation of hepatic organoid in collagen sponge by rat small hepatocytes and hepatic nonparenchymal cells. J Hepatol. Nov. 2003;39(5):716-23.

Haramis et al., De novo crypt formation and juvenile polyposis on BMP inhibition in mouse intestine. Science. Mar. 12, 2004;303(5664):1684-6.

Hashimshony et al., CEL-Seq: single-cell RNA-Seq by multiplexed linear amplification. Cell Rep. Sep. 27, 2012; 2(3):666-73. doi: 10.1016/j.celrep.2012.08.003. Epub Aug. 30, 2012.

Hay et al., Efficient differentiation of hepatocytes from human embryonic stem cells exhibiting markers recapitulating liver development in vivo. Stem Cells. Apr. 2008;26(4):894-902. doi: 10.1634/stemcells.2007-0718. Epub Jan. 31, 2008.

Hayashi et al., Establishment and characterization of a parietal endoderm-like cell line derived from Engelbreth-Holm-Swarm tumor (EHSPEL), a possible resource for an engineered basement membrane matrix. Matrix Biol. Apr. 2004;23(1):47-62.

Hayashi et al., Establishment and characterization of a parietal endoderm-like cell line derived from Engelbreth-Holm-Swarm tumor (EHSPEL), a possible resource for an engineered basement membrane matrix. Matrix Biol. Apr. 2004;23(1):47-62. doi: 10.1016/j.matbio.2004.02.003.

Hayflick., The cell biology of aging. J Invest Dermatol. Jul. 1979;73(1):8-14.

Herbst, Review of epidermal growth factor receptor biology. Int J Radiat Oncol Biol Phys. 2004;59(2 Suppl):21-6.

Hernandez, Small nuclear RNA genes: a model system to study fundamental mechanisms of transcription. J Biol Chem. Jul. 20, 2001;276(29):26733-6. Epub Jun. 4, 2001.

Heuberger et al., Shp2/MAPK signaling controls goblet/paneth cell fate decisions in the intestine. Proc Natl Acad Sci U S A. Mar. 4, 2014; 111(9):3472-7. doi: 10.1073/pnas.1309342111. Epub Feb. 18, 2014.

Hirata et al., Establishment and characterization of hepatic stem-like cell lines from normal adult rat liver. J Biochem. Jan. 2009;145(1):51-8. doi: 10.1093/jb/mvn146. Epub Oct. 30, 2008.

Ho et al., Preliminary results from a phase 2 trial of tipifarnib in HRAS-mutant head and neck squamous cell carcinomas. International Journal of Radiation Oncology, Biology, Physics. Apr. 1, 2018;100(5):1367.

Hodin et al., Immediate-early gene expression in EGF-stimulated intestinal epithelial cells. J Surg Res. Jun. 1994;56(6):500-4.

Höfer et al., Cytoskeletal markers allowing discrimination between brush cells and other epithelial cells of the gut including enteroendocrine cells. Histochem Cell Biol. May 1996; 105(5):405-12.

Hofmann et al., Cell-cell contacts prevent anoikis in primary human colonic epithelial cells. Gastroenterology. Feb. 2007;132(2):587-600.

Hombach-Klonisch et al. Adult stem cells and their transdifferentiation potential—perspectives and therapeutic applications. J Mol Med (Berl). Dec. 2008;86(12):1301-14. doi: 10.1007/s00109-008-0383-6. Epub Jul. 16, 2008.

Hong et al., Proteomic analysis of differential protein expression in response to epidermal growth factor in neonatal porcine pancreatic cell monolayers. J Cell Biochem. Jul. 1, 2005;95(4):769-81.

Hongo et al., A comparison of in vitro platinum-DNA adduct formation between carboplatin and cisplatin. Int J Biochem. Aug. 1994;26(8):1009-16. doi: 10.1016/0020-711x(94)90072-8.

Hoogstraat et al., Simultaneous detection of clinically relevant mutations and amplifications for routine cancer pathology. J Mol Diagn. Jan. 2015;17(1):10-8. doi: 10.1016/j.jmoldx.2014.09.004. Epub Oct. 24, 2014.

Horikoshi et al., High-Speed Knock-In, Functional analyses of secreted proteins by high-speed knock-in (HSKI) system II: intestinotrophic activities of R-spondin family proteins. Seikagaku. 2007:3P-1232.

Hou et al., Pluripotent stem cells induced from mouse somatic cells by small-molecule compounds. Science. Aug. 9, 2013; 341(6146):651-4. doi: 10.1126/science.1239278. Epub Jul. 18, 2013.

Howe et al., The responsiveness of a tetracycline-sensitive expression system differs in different cell lines. J Biol Chem. Jun. 9, 1995;270(23):14168-74.

Howitt et al., Tuft cells, taste-chemosensory cells, orchestrate parasite type 2 immunity in the gut. Science. Mar. 18, 2016; 351(6279):1329-33. doi: 10.1126/science.aaf1648. Epub Feb. 4, 2016.

Hsieh et al., Truncated mammalian Notch1 activates CBF1/RBPJk-repressed genes by a mechanism resembling that of Epstein-Barr virus EBNA2. Mol Cell Biol. Mar. 1996;16(3):952-9.

Hu et al., Wnt/β-catenin signaling in murine hepatic transit amplifying progenitor cells. Gastroenterology. Nov. 2007;133(5):1579-91. Epub Aug. 28, 2007.

Huang et al., Direct reprogramming of human fibroblasts to functional and expandable hepatocytes. Cell Stem Cell. Mar. 6, 2014;14(3):370-84. doi: 10.1016/j.stem.2014.01.003. Epub Feb. 27, 2014.

Huang et al., Induction of functional hepatocyte-like cells from mouse fibroblasts by defined factors. Nature. May 11, 2011;475(7356):386-9.

Huch et al., In vitro expansion of single Lgr5+ liver stem cells induced by Wnt-driven regeneration. Nature. Feb. 14, 2013;494(7436):247-50. doi: 10.1038/nature11826. Epub Jan. 27, 2013.

Huch et al., Long-term culture of genome-stable bipotent stem cells from adult human liver. Cell. Jan. 15, 2015;160(1-2):299-312.doi: 10.1016/j.cell.2014.11.050. Epub Dec. 18, 2014.

Huch et al., Sox9 marks adult organ progenitors. Nat Genet. Jan. 2011;43(1):9-10.

Huch et al., Urokinase-type plasminogen activator receptor transcriptionally controlled adenoviruses eradicate pancreatic tumors and liver metastasis in mouse models. Neoplasia. Jun. 2009;11(6):518-28, 4 p following 528.

Hughes et al., Matrigel: a complex protein mixture required for optimal growth of cell culture. Proteomics. May 2010;10(9):1886-90. doi: 10.1002/pmic.200900758.

Humphries et al., Integrin ligands at a glance. J Cell Sci. Oct. 1, 2006;119(Pt 19):3901-3. doi: 10.1242/jcs.03098.

Humphries MJ. Integrin structure. Biochem Soc Trans. 2000;28(4):311-39.

Huschtscha et al., Normal human mammary epithelial cells proliferate rapidly in the presence of elevated levels of the tumor suppressors p53 and p21(WAF1/CIP1). J Cell Sci. Aug. 15, 2009; 122(Pt 16):2989-95. doi: 10.1242/jcs.044107. Epub Jul. 28, 2009.

Hynds et al., Concise review: the relevance of human stem cell-derived organoid models for epithelial translational medicine. Stem Cells. Mar. 2013; 31(3):417-22. doi: 10.1002/stem.1290.

Igarashi et al., Characterization of recombinant human fibroblast growth factor (FGF)-10 reveals functional similarities with keratinocyte growth factor (FGF-7). J Biol Chem. May 22, 1998;273(21):13230-5.

Imahori et al., Seikagaku Jiten [Dictionary of Biochemistry]. Oct. 8, 1998;3:808-9.

Itoh et al., Inducible expression of Wnt genes during adult hepatic stem/progenitor cell response. FEBS Lett. Feb. 18, 2009;583(4):777-81. doi: 10.1016/j.febslet.2009.01.022. Epub Jan. 25, 2009.

Jaks et al., Lgr5 marks cycling, yet long-lived, hair follicle stem cells. Nat Genet. Nov. 2008;40(11):1291-9. Epub Oct. 12, 2008.

Janda et al., Surrogate Wnt agonists that phenocopy canonical Wnt and β-catenin signalling. Nature. May 11, 2017;545(7653):234-237. doi: 10.1038/nature22306. Epub May 3, 2017.

(56) References Cited

OTHER PUBLICATIONS

Janssen et al., Nutrient sensing in the gut: new roads to therapeutics? Trends Endocrinol Metab. Feb. 2013; 24(2):92-100. doi: 10.1016/j.tem.2012.11.006. Epub Dec. 21, 2012.

Jeong et al., Neuregulin-1 induces cancer stem cell characteristics in breast cancer cell lines. Oncol Rep. Sep. 2014; 32(3):1218-24. doi: 10.3892/or.2014.3330. Epub Jul. 11, 2014.

Jiang, et al., Generation of insulin-producing islet-like clusters from human embryonic stem cells, Stem Cells. Aug. 2007;25(8):1940-53.

Johnson et al., Relationships between drug activity in NCI preclinical in vitro and in vivo models and early clinical trials. Br J Cancer. May 18, 2001;84(10):1424-31. doi: 10.1054/bjoc.2001.1796.

Juric et al., Phosphatidylinositol 3-Kinase α-Selective Inhibition With Alpelisib (BYL719) in PIK3CA-Altered Solid Tumors: Results From the First-in-Human Study. J Clin Oncol. May 1, 2018;36(13):1291-1299. doi: 10.1200/JCO.2017.72.7107. Epub Feb. 5, 2018. Erratum in: J Clin Oncol. Feb. 1, 2019;37(4):361. Erratum in: J Clin Oncol. Feb. 1, 2019;37(4):361.

Kadesch, Notch signaling: a dance of proteins changing partners. Exp Cell Res. Oct. 10, 2000;260(1):1-8.

Kamiya et al., Oncostatin M and hepatocyte growth factor induce hepatic maturation via distinct signaling pathways. FEBS Lett. Mar. 9, 2001;492(1-2):90-4.

Kan et al., p53-mediated growth suppression in response to Nutlin-3 in cyclin D1 transformed cells occurs independently of p21. Cancer Res. Oct. 15, 2007; 67(20):9862-8.

Kaplitt et al., Safety and tolerability of gene therapy with an adeno-associated virus (AAV) borne GAD gene for Parkinson's disease: an open label, phase I trial. Lancet. Jun. 23, 2007;369(9579):2097-105.

Katsuda et al., Conversion of Terminally Committed Hepatocytes to Culturable Bipotent Progenitor Cells with Regenerative Capacity. Cell Stem Cell. Jan. 5, 2017;20(1):41-55. doi: 10.1016/j.stem.2016.10.007. Epub Nov. 10, 2016.

Kawasaki et al., Effects of growth factors on the growth and differentiation of mouse fetal liver epithelial cells in primary cultures. J Gastroenterol Hepatol. Jun. 2005;20(6):857-64.

Kay et al., Viral vectors for gene therapy: the art of turning infectious agents into vehicles of therapeutics. Nat Med. Jan. 2001;7(1):33-40.

Ke et al. "Down-regulation of Wnt signaling could promote bone marrow derived mesenchymal stem cells to differentiate into hepatocytes". BBRC, 367 (2008) 342 348.

Kedinger et al., Intestinal epithelial-mesenchymal cell interactions. Ann N Y Acad Sci. Nov. 17, 1998;859:1-17.

Kemp et al. The Roles of Wnt Signaling in Early Mouse Development and Embryonic Stem Cells. Functional Development and Embryology. 2007. 1(1): 1-13. Last accessed at http://www.globalsciencebooks.info/JournalsSup/images/SF/FDE_1(1)1-13.pdf Jan. 21, 2014.

Kerr-Conte et al., Ductal cyst formation in collagen-embedded adult human islet preparations. A means to the reproduction of nesidioblastosis in vitro. Diabetes. Aug. 1996;45(8):1108-14.

Khetani et al., Microscale culture of human liver cells for drug development. Nat Biotechnol. Jan. 2008;26(1):120-6. doi: 10.1038/nbt1361. Epub Nov. 18, 2007.

Kijima et al., Three-Dimensional Organoids Reveal Therapy Resistance of Esophageal and Oropharyngeal Squamous Cell Carcinoma Cells. Cell Mol Gastroenterol Hepatol. Sep. 14, 2018;7(1):73-91. doi: 10.1016/j.jcmgh.2018.09.003.

Kim et al., In vivo functioning and transplantable mature pancreatic islet-like cell clusters differentiated from embryonic stem cell. Pancreas. Aug. 2003;27(2):e34-41.

Kim et al., Mitogenic influence of human R-spondin1 on the intestinal epithelium. Science. Aug. 19, 2005;309(5738):1256-9.

Kim et al., R-Spondin family members regulate the Wnt pathway by a common mechanism. Mol Biol Cell. Jun. 2008;19(6):2588-96. doi: 10.1091/mbc.e08-02-0187. Epub Apr. 9, 2008.

Kirikoshi et al., WNT10A and WNT6, clustered in human chromosome 2q35 region with head-to-tail manner, are strongly coexpressed in SW480 cells. Biochem Biophys Res Commun. May 18, 2001; 283(4):798-805.

Kitisin et al., Hepatocellular stem cells. Cancer Biomark. 2007;3(4-5):251-62.

Kogata et al., Neuregulin 3 and erbb signalling networks in embryonic mammary gland development. J Mammary Gland Biol Neoplasia. Jun. 2013; 18(2):149-54. doi: 10.1007/s10911-013-9286-4. Epub May 7, 2013.

Kohno et al., Effects of hyaluronidase on doxorubicin penetration into squamous carcinoma multicellular tumor spheroids and its cell lethality. J Cancer Res Clin Oncol. 1994;120(5):293-7. doi: 10.1007/BF01236386.

Koo et al., Controlled gene expression in primary Lgr5 organoid cultures. Nat Methods. Dec. 4, 2011;9(1):81-3. doi: 10.1038/nmeth.1802.

Koo et al., Stem cells marked by the R-spondin receptor LGR5. Gastroenterology. Aug. 2014; 147(2):289-302. doi: 10.1053/j.gastro.2014.05.007. Epub May 21, 2014.

Korinek et al., Constitutive transcriptional activation by a beta-catenin-Tcf complex in APC-/-colon carcinoma. Science. Mar. 21, 1997;275(5307):1784-7.

Korinek et al., Depletion of epithelial stem-cell compartments in the small intestine of mice lacking Tcf-4. Nat Genet. Aug. 1998;19(4):379-83.

Kramer et al., Small-Molecule Inhibitors of GSK-3: Structural Insights and Their Application to Alzheimer's Disease Models. Int J Alzheimers Dis. 2012;2012:381029. doi: 10.1155/2012/381029. Epub Jul. 22, 2012.

Kross et al., Co-culture of head and neck squamous cell carcinoma spheroids with autologous monocytes predicts prognosis. Scand J Immunol. Apr. 2008;67(4):392-9. doi: 10.1111/j.1365-3083.2008.02072.x. Epub Feb. 12, 2008.

Kuhnert et al., Essential requirement for Wnt signaling in proliferation of adult small intestine and colon revealed by adenoviral expression of Dickkopf-1. Proc Natl Acad Sci U S A. Jan. 6, 2004;101(1):266-71. Epub Dec. 26, 2003.

Laban et al., Sorafenib sensitizes head and neck squamous cell carcinoma cells to ionizing radiation. Radiother Oncol. Nov. 2013;109(2):286-92. doi: 10.1016/j.radonc.2013.07.003. Epub Aug. 13, 2013.

Latella et al., Characterization of the mucins produced by normal human colonocytes in primary culture. Int J Colorectal Dis. 1996;11(2):76-83.

Latorre et al., Enteroendocrine cells: a review of their role in brain-gut communication. Neurogastroenterol Motil. May 2016; 28(5):620-30. doi: 10.1111/nmo.12754. Epub Dec. 21, 2015.

Lee et al., In vitro hepatic differentiation of human mesenchymal stem cells. Hepatology. Dec. 2004;40(6):1275-84.

Lee et al., Lung stem cell differentiation in mice directed by endothelial cells via a BMP4-NFATc1-thrombospondin-1 axis. Cell. Jan. 30, 2014; 156(3):440-55. doi: 10.1016/j.cell.2013.12.039.

Lee et al., Neuregulin autocrine signaling promotes self-renewal of breast tumor-initiating cells by triggering HER2/HER3 activation. Cancer Res. Jan. 1, 2014; 74(1):341-52. doi: 10.1158/0008-5472.CAN-13-1055. Epub Oct. 31, 2013.

Lee et al., The role of gremlin, a BMP antagonist, and epithelial-to-mesenchymal transition in proliferative vitreoretinopathy. Invest Ophthalmol Vis Sci. Sep. 2007;48(9):4291-9.

Leemans et al., The molecular landscape of head and neck cancer. Nat Rev Cancer. May 2018;18(5):269-282. doi: 10.1038/nrc.2018.11. Epub Mar. 2, 2018. Erratum in: Nat Rev Cancer. Oct. 2018;18(10):662.

Lefebvre et al., Culture of adult human islet preparations with hepatocyte growth factor and 804G matrix is mitogenic for duct cells but not for beta-cells. Diabetes. Jan. 1998;47(1):134-7.

Lemaigre, Mechanisms of liver development: concepts for understanding liver disorders and design of novel therapies. Gastroenterology. Jul. 2009;137(1):62-79.

Lengauer et al., Genetic instability in colorectal cancers. Nature. Apr. 10, 1997;386(6625):623-7. doi: 10.1038/386623a0.

(56) References Cited

OTHER PUBLICATIONS

Leost et al., Paullones are potent inhibitors of glycogen synthase kinase-3beta and cyclin-dependent kinase 5/p25. Eur J Biochem. Oct. 2000;267(19):5983-94.
Levy et al., Long-term culture and expansion of primary human hepatocytes. Nat Biotechnol. Dec. 2015;33(12):1264-1271. doi: 10.1038/nbt.3377. Epub Oct. 26, 2015.
Li et al., Adult Mouse Liver Contains Two Distinct Populations of Cholangiocytes. Stem Cell Reports. Aug. 8, 2017;9(2):478-489.
Li et al., Conformational equilibria and intrinsic affinities define integrin activation. EMBO J. Mar. 1, 2017;36(5):629-645. doi: 10.15252/embj.201695803. Epub Jan. 25, 2017.
Li et al., Fast and accurate long-read alignment with Burrows-Wheeler transform. Bioinformatics. Mar. 1, 2010;26(5):589-95. doi: 10.1093/bioinformatics/btp698. Epub Jan. 15, 2010.
Li et al., Hepatoblast-like progenitor cells derived from embryonic stem cells can repopulate livers of mice. Gastroenterology. Dec. 2010;139(6):2158-2169.e8. doi: 10.1053/j.gastro.2010.08.042. Epub Aug. 27, 2010.
Li et al., Isolation and culture of adult mouse hepatocytes. Methods Mol Biol. 2010;633:185-96.
Li et al., Stem cell niche: structure and function. Annu Rev Cell Dev Biol. 2005;21:605-31.
Li et al., The human homolog of rat Jagged1 expressed by marrow stroma inhibits differentiation of 32D cells through interaction with Notch1. Immunity. Jan. 1998;8(1):43-55.
Liang et al., Genetic and epigenetic variations in iPSCs: potential causes and implications for application. Cell Stem Cell. Aug. 1, 2013;13(2):149-59.
Liao et al., Glycogen synthase kinase-3beta activity is required for androgen-stimulated gene expression in prostate cancer. Endocrinology. Jun. 2004; 145(6):2941-9. Epub Feb. 26, 2004.
Lin et al., Distributed hepatocytes expressing telomerase repopulate the liver in homeostasis and injury. Nature. Apr. 2018;556(7700):244-248. doi: 10.1038/s41586-018-0004-7. Epub Apr. 4, 2018.
Little et al., Engineering biomaterials for synthetic neural stem cell microenvironments. Chem Rev. May 2008;108(5):1787-96.
Liu et al., A novel chemical-defined medium with bFGF and N2B27 supplements supports undifferentiated growth in human embryonic stem cells. Biochem Biophys Res Commun. Jul. 21, 2006;346(1):131-9. Epub May 24, 2006.
Liu et al., A small-molecule agonist of the Wnt signaling pathway. Angew Chem Int Ed Engl. Mar. 18, 2005;44(13):1987-90.
Liu et al., Osteopontin Promotes Hepatic Progenitor Cell Expansion and Tumorigenicity via Activation of β-Catenin in Mice. Stem Cells. Dec. 2015;33(12):3569-80. doi: 10.1002/stem.2072. Epub Jun. 23, 2015.
Love et al., Moderated estimation of fold change and dispersion for RNA-seq data with DESeq2. Genome Biol. 2014;15(12):550. doi: 10.1186/s13059-014-0550-8.
Lowes et al., Oval cell-mediated liver regeneration: Role of cytokines and growth factors. J Gastroenterol Hepatol. Jan. 2003;18(1):4-12.
Lund et al., Genetic and epigenetic stability of human pluripotent stem cells. Nat Rev Genet. Oct. 2012;13(10):732-44. doi: 10.1038/nrg3271. Epub Sep. 11, 2012.
Luque et al., Activated conformations of very late activation integrins detected by a group of antibodies (HUTS) specific for a novel regulatory region (355-425) of the common beta 1 chain. J Biol Chem. May 10, 1996;271(19):11067-75.
Lustig et al., Negative feedback loop of Wnt signaling through upregulation of conductin/axin2 in colorectal and liver tumors. Mol Cell Biol. Feb. 2002;22(4):1184-93.
Macchiarini et al., Clinical transplantation of a tissue-engineered airway. Lancet. Dec. 13, 2008;372(9655):2023-30. doi: 10.1016/S0140-6736(08)61598-6. Epub Nov. 18, 2008.
Machiels et al., Activity and safety of afatinib in a window preoperative EORTC study in patients with squamous cell carcinoma of the head and neck (SCCHN). Ann Oncol. Apr. 1, 2018;29(4):985-991. doi: 10.1093/annonc/mdy013.
Machiels et al., Afatinib versus methotrexate as second-line treatment in patients with recurrent or metastatic squamous-cell carcinoma of the head and neck progressing on or after platinum-based therapy (LUX-Head & Neck 1): an open-label, randomised phase 3 trial. Lancet Oncol. May 2015;16(5):583-94. doi: 10.1016/S1470-2045(15)70124-5. Epub Apr. 16, 2015.
Mader et al., A steroid-inducible promoter for the controlled overexpression of cloned genes in eukaryotic cells. Proc Natl Acad Sci U S A. Jun. 15, 1993;90(12):5603-7.
Maguire et al., Safety and efficacy of gene transfer for Leber's congenital amaurosis. N Engl J Med. May 22, 2008;358(21):2240-8. Epub Apr. 27, 2008. Author manuscript available in PMC Mar. 1, 2010.
Malato et al., Fate tracing of mature hepatocytes in mouse liver homeostasis and regeneration. J Clin Invest. Dec. 2011;121(12):4850-60. doi: 10.1172/JCI59261. Epub Nov. 21, 2011.
Malorni et al., The antioxidant N-acetyl-cysteine protects cultured epithelial cells from menadione-induced cytopathology. Chem Biol Interact. May 19, 1995;96(2):113-23.
Manandhar et al., Glucagon-like peptide-1 (GLP-1) analogs: recent advances, new possibilities, and therapeutic implications. J Med Chem. Feb. 12, 2015; 58(3):1020-37. doi: 10.1021/jm500810s. Epub Nov. 13, 2014.
Manno et al., Successful transduction of liver in hemophilia by AAV-Factor IX and limitations imposed by the host immune response. Nat Med. Mar. 2006;12(3):342-7. Epub Feb. 12, 2006. Erratum in: Nat Med. May 2006;12(5):592. Rasko, John [corrected to Rasko, John JE]; Rustagi, Pradip K [added].
Marin et al., Towards efficient cell targeting by recombinant retroviruses. Mol Med Today. Sep. 1997;3(9):396-403.
Marquardt et al., Functional and genetic deconstruction of the cellular origin in liver cancer. Nat Rev Cancer. Nov. 2015;15(11):653-67. Rev Cancer 15, 653-667.
Martin et al., Modeling antibody hypervariable loops: a combined algorithm. Proc Natl Acad Sci U S A. Dec. 1989;86(23):9268-72. doi: 10.1073/pnas.86.23.9268.
Martin-Belmonte et al., Cell-polarity dynamics controls the mechanism of lumen formation in epithelial morphogenesis. Curr Biol. Apr. 8, 2008;18(7):507-13. doi: 10.1016/j.cub.2008.02.076. Erratum in: Curr Biol. Jul. 8, 2008;18(13):1016. Curr Biol. Apr. 22, 2008;18(8):630.
Mason et al., Entrapped collagen type 1 promotes differentiation of embryonic pancreatic precursor cells into glucose-responsive beta-cells when cultured in three-dimensional PEG hydrogels. Tissue Eng Part A. Dec. 2009;15(12):3799-808. doi: 10.1089/ten.TEA.2009.0148.
Mattaj et al., Changing the RNA polymerase specificity of U snRNA gene promoters. Cell. Nov. 4, 1988;55(3):435-42.
Maushagen et al., Effects of paclitaxel on permanent head and neck squamous cell carcinoma cell lines and identification of anti-apoptotic caspase 9b. J Cancer Res Clin Oncol. Jun. 2016;142(6):1261-71. doi: 10.1007/s00432-016-2150-3. Epub Apr. 1, 2016.
Mayer et al., A Phase Ib Study of Alpelisib (BYL719), a PI3Kα-Specific Inhibitor, with Letrozole in ER+/HER2-Metastatic Breast Cancer. Clin Cancer Res. Jan. 1, 2017;23(1):26-34. doi: 10.1158/1078-0432.CCR-16-0134. Epub Apr. 28, 2016.
Mayo et al., The mouse metallothionein-I gene is transcriptionally regulated by cadmium following transfection into human or mouse cells. Cell. May 1982;29(1):99-108.
Mcewen et al., Regulation of the fibroblast growth factor receptor 3 promoter and intron I enhancer by Sp1 family transcription factors. J Biol Chem. Feb. 27, 1998;273(9):5349-57.
Meijer et al., GSK-3-selective inhibitors derived from Tyrian purple indirubins. Chem Biol. Dec. 2003;10(12):1255-66.
Meijer et al., Pharmacological inhibitors of glycogen synthase kinase 3. Trends Pharmacol Sci. Sep. 2004;25(9):471-80.
Meng et al., Characterization of integrin engagement during defined human embryonic stem cell culture. FASEB J. Apr. 2010;24(4):1056-65. doi: 10.1096/fj.08-126821. Epub Nov. 20, 2009.
Menke et al., Conversion of metaplastic Barrett's epithelium into post-mitotic goblet cells by gamma-secretase inhibition. Dis Model Mech. Jan.-Feb. 2010;3(1-2):104-10. doi: 10.1242/dmm.003012.

(56) References Cited

OTHER PUBLICATIONS

Mery et al., Preclinical models in Hnscc: A comprehensive review. Oral Oncol. Feb. 2017;65:51-56. doi: 10.1016/j.oraloncology.2016.12.010. Epub Dec. 28, 2016.
Metzger et al., The human oestrogen receptor functions in yeast. Nature. Jul. 7, 1988;334(6177):31-6.
Michalopoulos, Liver regeneration after partial hepatectomy: critical analysis of mechanistic dilemmas. Am J Pathol. Jan. 2010;176(1):2-13. doi: 10.2353/ajpath.2010.090675. Epub Dec. 17, 2009.
Miralles et al., Signaling through fibroblast growth factor receptor 2b plays a key role in the development of the exocrine pancreas. Proc Natl Acad Sci U S A. May 25, 1999;96(11):6267-72.
Mirochnik et al., Androgen receptor drives cellular senescence. PLoS One. 2012;7(3):e31052. doi: 10.1371/journal.pone.0031052. Epub Mar. 5, 2012.
Mitaka, Reconstruction of hepatic organoid by hepatic stem cells. J Hepatobiliary Pancreat Surg. 2002;9(6):697-703.
Miyajima et al., Stem/progenitor cells in liver development, homeostasis, regeneration, and reprogramming. Cell Stem Cell. May 1, 2014;14(5):561-74.
Mizuochi et al., Infection, inflammation and immunity. 2004;34(2):40-52. Japanese.
Monnet et al., Selection of IgG Variants with Increased FcRn Binding Using Random and Directed Mutagenesis: Impact on Effector Functions. Front Immunol. Feb. 4, 2015;6:39. doi: 10.3389/fimmu.2015.00039.
Montesano et al., Collagen matrix promotes reorganization of pancreatic endocrine cell monolayers into islet-like organoids. J Cell Biol. Sep. 1983;97(3):935-9.
Moore et al., Alternative sources of adult stem cells: a possible solution to the embryonic stem cell debate. Gend Med. Sep. 2006;3(3):161-8. doi: 10.1016/s1550-8579(06)80204-4.
Mori et al., Micropatterned organoid culture of rat hepatocytes and HepG2 cells. J Biosci Bioeng. Sep. 2008;106(3):237-42.
Morin et al., Activation of beta-catenin-Tcf signaling in colon cancer by mutations in beta-catenin or APC. Science. Mar. 21, 1997;275(5307):1787-90.
Muñoz et al., The Lgr5 intestinal stem cell signature: robust expression of proposed quiescent '+4' cell markers. EMBO J. Jun. 12, 2012; 31(14):3079-91. doi: 10.1038/emboj.2012.166.
Munster et al., Abstract A46: Inhibition of PIK3CA with BYL719 can overcome resistance to cetuximab in squamous cell carcinoma of the head and neck (SCCHN). Molecular Cancer Therapeutics. 2015;14(7): A46-A46, DOI: 10.1158/1538-8514.PI3K14-A46.
Murry et al., Differentiation of embryonic stem cells to clinically relevant populations: lessons from embryonic development. Cell. Feb. 22, 2008;132(4):661-80.
Myslinski et al., An unusually compact external promoter for RNA polymerase III transcription of the human HIRNA gene. Nucleic Acids Res. Jun. 15, 2001;29(12):2502-9.
Naftalin et al., Progesterone stimulation of fluid absorption by the rat uterine gland. Reproduction. May 2002;123(5):633-8.
Nagai et al., Differentiation of liver epithelial (stem-like) cells into hepatocytes induced by coculture with hepatic stellate cells. Biochem Biophys Res Commun. May 24, 2002;293(5):1420-5. doi: 10.1016/S0006-291X(02)00406-0.
Nakamura et al., Anti-patched-1 antibodies suppress hedgehog signaling pathway and pancreatic cancer proliferation. Anticancer Res. Nov.-Dec. 2007; 27(6A):3743-7.
Nakamura et al., Crosstalk between Wnt and Notch signaling in intestinal epithelial cell fate decision. J Gastroenterol. Sep. 2007; 42(9):705-10. Epub Sep. 25, 2007.
Nakamura et al., Molecular cloning and expression of human hepatocyte growth factor. Nature. Nov. 23, 1989;342(6248):440-3.
Nakanishi et al., Dclk1 distinguishes between tumor and normal stem cells in the intestine. Nat Genet. Jan. 2013; 45(1):98-103. doi: 10.1038/ng.2481. Epub Dec. 2, 2012.
Namkung et al., Small-molecule activators of TMEM16A, a calcium-activated chloride channel, stimulate epithelial chloride secretion and intestinal contraction. FASEB J. Nov. 2011; 25(11):4048-62. doi: 10.1096/fj.11-191627. Epub Aug. 11, 2011.
Nasonkin et al., Nonhuman sialic acid Neu5Gc is very low in human embryonic stem cell-derived neural precursors differentiated with B27/N2 and noggin: implications for transplantation. Exp Neurol. Oct. 2006;201(2):525-9.
Nault et al., High frequency of telomerase reverse-transcriptase promoter somatic mutations in hepatocellular carcinoma and preneoplastic lesions. Nat Commun. 2013;4:2218. doi: 10.1038/ncomms3218. Erratum in: Nat Commun. 2013;4:2577. Zucman Rossi, Jessica [corrected to Zucman-Rossi, Jessica].
Niu et al., Differential androgen receptor signals in different cells explain why androgen-deprivation therapy of prostate cancer fails. Oncogene. Jun. 24, 2010;29(25):3593-604. doi: 10.1038/onc.2010.121. Epub May 3, 2010.
Oda et al. A comprehensive pathway map of epidermal growth factor receptor signaling. Mol Syst Biol. 2005;1:2005.0010. doi: 10.1038/msb4100014. Epub May 25, 2005.
Odze, Barrett esophagus: histology and pathology for the clinician. Nat Rev Gastroenterol Hepatol. Aug. 2009;6(8):478-90. doi: 10.1038/nrgastro.2009.103. Epub Jul. 7, 2009.
Oeztuerk-Winder et al., Regulation of human lung alveolar multipotent cells by a novel p38α MAPK/miR-17-92 axis. EMBO J. Aug. 15, 2012; 31(16):3431-41. doi: 10.1038/emboj.2012.192. Epub Jul. 24, 2012.
Ootani et al., Foveolar differentiation of mouse gastric mucosa in vitro. Am J Pathol. Jun. 2003;162(6):1905-12.
Ootani et al., Sustained in vitro intestinal epithelial culture within a Wnt-dependent stem cell niche. Nat Med. Jun. 2009;15(6):701-6. doi: 10.1038/nm.1951. Epub Apr. 27, 2009.
Otsuka et al., Distinct effects of p38alpha deletion in myeloid lineage and gut epithelia in mouse models of inflammatory bowel disease. Gastroenterology. Apr. 2010;138(4):1255-65, 1265.e1-9. doi: 10.1053/j.gastro.2010.01.005. Epub Jan. 18, 2010. Includes Supplemental Information.
Overturf et al., Hepatocytes corrected by gene therapy are selected in vivo in a murine model of hereditary tyrosinaemia type I. Nat Genet. Mar. 1996;12(3):266-73.
Pang et al., Immunologic, functional, and morphological characterization of three new human small intestinal epithelial cell lines. Gastroenterology. Jul. 1996;111(1):8-18.
Panja, A novel method for the establishment of a pure population of nontransformed human intestinal primary epithelial cell (HIPEC) lines in long term culture. Lab Invest. Sep. 2000;80(9):1473-5.
Pasic et al., Sustained activation of the HER1-ERK1/2-RSK signaling pathway controls myoepithelial cell fate in human mammary tissue. Genes Dev. Aug. 1, 2011; 25(15):1641-53. doi: 10.1101/gad.2025611.
Peng et al., Inhibition of p38 MAPK facilitates ex vivo expansion of skin epithelial progenitor cells. In Vitro Cell Dev Biol Anim. Oct. 2009;45(9):558-65. doi: 10.1007/s11626-009-9223-4. Epub Jun. 24, 2009.
Peng et al., Viral vector targeting. Curr Opin Biotechnol. Oct. 1999;10(5):454-7.
Perez et al., Comparative cytotoxicity of CI-973, cisplatin, carboplatin and tetraplatin in human ovarian carcinoma cell lines. Int J Cancer. May 10, 1991;48(2):265-9. doi: 10.1002/ijc.2910480219.
Perreault et al., Use of the dissociating enzyme thermolysin to generate viable human normal intestinal epithelial cell cultures. Exp Cell Res. May 1, 1996;224(2):354-64.
Petersen et al., Interaction with basement membrane serves to rapidly distinguish growth and differentiation pattern of normal and malignant human breast epithelial cells. Proc Natl Acad Sci USA. Oct. 1, 1992;89(19):9064-8.
Pettipher et al., Antagonism of the prostaglandin D2 receptors DP1 and CRTH2 as an approach to treat allergic diseases. Nat Rev Drug Discov. Apr. 2007;6(4):313-25.
Pin et al., Modelling the spatio-temporal cell dynamics reveals novel insights on cell differentiation and proliferation in the small intestinal crypt. PLoS One. 2012; 7(5):e37115. doi: 10.1371/journal.pone.0037115. Epub May 18, 2012.
Pinto et al., Canonical Wnt signals are essential for homeostasis of the intestinal epithelium. Genes Dev. Jul. 15, 2003;17(14):1709-13.

(56) References Cited

OTHER PUBLICATIONS

Planas-Paz et al., The RSPO-LGR4/5-ZNRF3/RNF43 module controls liver zonation and size. Nat Cell Biol. May 2016;18(5):467-79. doi: 10.1038/ncb3337. Epub Apr. 18, 2016. Erratum in: Nat Cell Biol. Oct. 27, 2016;18(11):1260.
Planutis et al., Regulation of norrin receptor frizzled-4 by Wnt2 in colon-derived cells. BMC Cell Biol. Mar. 26, 2007;8:12.
Pokharel et al., Integrin activation by the lipid molecule 25-hydroxycholesterol induces a proinflammatory response. Nature communications. Apr. 1, 2019;10(1):1-7. https://doi.org/10.1038/s41467-019-09453-x.
Polychronopoulos et al., Structural basis for the synthesis of indirubins as potent and selective inhibitors of glycogen synthase kinase-3 and cyclin-dependent kinases. J Med Chem. Feb. 12, 2004;47(4):935-46. doi: 10.1021/jm031016d.
Powell et al., Myofibroblasts. II. Intestinal subepithelial myofibroblasts. Am J Physiol. Aug. 1999;277(2 Pt 1):C183-201.
Pyeon et al., Production of infectious human papillomavirus independently of viral replication and epithelial cell differentiation. Proc Natl Acad Sci U S A. Jun. 28, 2005;102(26):9311-6. doi: 10.1073/pnas.0504020102. Epub Jun. 15, 2005.
Ramiya et al., Reversal of insulin-dependent diabetes using islets generated in vitro from pancreatic stem cells. Nat Med. Mar. 2000;6(3):278-82.
Raven et al., Cholangiocytes act as facultative liver stem cells during impaired hepatocyte regeneration. Nature. Jul. 20, 2017;547(7663):350-354. doi: 10.1038/nature23015. Epub Jul. 12, 2017. Erratum in: Nature. Mar. 14, 2018;555(7696):402.
Reed E. Platinum-DNA adduct, nucleotide excision repair and platinum based anti-cancer chemotherapy. Cancer Treat Rev. Oct. 1998;24(5):331-44. doi: 10.1016/s0305-7372(98)90056-1.
Reiser, Production and concentration of pseudotyped HIV-1-based gene transfer vectors. Gene Ther. Jun. 2000;7(11):910-3.
Resnitzky et al., Acceleration of the G1/S phase transition by expression of cyclins D1 and E with an inducible system. Mol Cell Biol. Mar. 1994;14(3):1669-79.
Robinton et al., The promise of induced pluripotent stem cells in research and therapy. Nature. Jan. 18, 2012;481(7381):295-305. doi: 10.1038/nature10761.
Rogler et al., Differential activation of cytokine secretion in primary human colonic fibroblast/myofibroblast cultures. Scand J Gastroenterol. Apr. 2001;36(4):389-98.
Rokutan et al., Epidermal growth factor-induced mitogen signals in cultured intestinal epithelial cells. J Gastroenterol. Jul. 1994;29 Suppl 7:59-62.
Rooman et al., Mitogenic effect of gastrin and expression of gastrin receptors in duct-like cells of rat pancreas.Gastroenterology. Oct. 2001;121(4):940-9.
Rooman et al., Modulation of rat pancreatic acinoductal transdifferentiation and expression of PDX-1 in vitro. Diabetologia. Jul. 2000;43(7):907-14.
Rulifson et al., Wnt signaling regulates pancreatic beta cell proliferation. Proc Natl Acad Sci U S A. Apr. 10, 2007;104(15):6247-52. doi: 10.1073/pnas.0701509104. Epub Apr. 2, 2007.
Russell, Update on adenovirus and its vectors. J Gen Virol. Nov. 2000;81(Pt 11):2573-604.
Sachs et al., Long-term expanding human airway organoids for disease modeling. The EMBO journal. Feb. 15, 2019;38(4):e100300. doi:10.15252/embj.2018100300.
Saha et al., Designing synthetic materials to control stem cell phenotype. Curr Opin Chem Biol. Aug. 2007;11(4):381-7. doi: 10.1016/j.cbpa.2007.05.030. Epub Jul. 31, 2007.
Saha et al., Substrate modulus directs neural stem cell behavior. Biophys J. Nov. 1, 2008;95(9):4426-38. Epub Jul. 25, 2008.
Sangiorgi et al., Bmi1 is expressed in vivo in intestinal stem cells. Nat Genet. Jul. 2008; 40(7):915-20. doi: 10.1038/ng.165. Epub Jun. 8, 2008.
Sansom et al., Loss of Apc in vivo immediately perturbs Wnt signaling, differentiation, and migration. Genes Dev. Jun. 15, 2004;18(12):1385-90.
Sarkozi et al., Oncostatin M inhibits TGF-β1-induced CTGF expression via STAT3 in human proximal tubular cells. Biochem Biophys Res Commun. Aug. 10, 2012;424(4):801-6. doi: 10.1016/j.bbrc. 2012.07.042. Epub Jul. 16, 2012.
Sarközi et al., Oncostatin M is a novel inhibitor of TGF-β1-induced matricellular protein expression. Am J Physiol Renal Physiol. Nov. 2011;301(5):F1014-25. doi: 10.1152/ajprenal.00123.2011. Epub Aug. 3, 2011.
Sasaki et al., Expression and distribution of laminin alpha1 and alpha2 chains in embryonic and adult mouse tissues: an immunochemical approach. Exp Cell Res. May 1, 2002;275(2):185-99.
Sato et al., G.I Research. 2004;12(2):3-10. Japanese.
Sato et al., Long-term expansion of epithelial organoids from human colon, adenoma, adenocarcinoma, and Barrett's epithelium. Gastroenterology. Nov. 2011;141(5):1762-72. doi: 10.1053/j.gastro. 2011.07.050. Epub Sep. 2, 2011.
Sato et al., Paneth cells constitute the niche for Lgr5 stem cells in intestinal crypts. Nature. Jan. 20, 2011;469(7330):415-8. doi: 10.1038/nature09637. Epub Nov. 28, 2010.
Sato et al., Role of p38 MAPK in transforming growth factor beta stimulation of collagen production by scleroderma and healthy dermal fibroblasts. J Invest Dermatol. Apr. 2002;118(4):704-11. doi: 10.1046/j.1523-1747.2002.01719.x.
Sato et al., Single Lgr5 stem cells build crypt-villus structures in vitro without a mesenchymal niche. Nature. May 14, 2009;459(7244):262-5.
Sawada et al., Selective killing of Paneth cells by intravenous administration of dithizone in rats. Int J Exp Pathol. Aug. 1991;72(4):407-21.
Sayers et al., Herpes Simplex Virus 1 Enters Human Keratinocytes by a Nectin-1-Dependent, Rapid Plasma Membrane Fusion Pathway That Functions at Low Temperature. J Virol. Oct. 28, 2016;90(22):10379-10389. doi: 10.1128/JVI.01582-16.
Schaub et al., Evidence against a stem cell origin of new hepatocytes in a common mouse model of chronic liver injury. Cell Rep. Aug. 21, 2014;8(4):933-9. doi: 10.1016/j.celrep.2014.07.003. Epub Aug. 14, 2014. Erratum in: Cell Rep. Sep. 11, 2014;8(5):1607.
Schrader et al., Kallikrein-related peptidase 6 regulates epithelial-to-mesenchymal transition and serves as prognostic biomarker for head and neck squamous cell carcinoma patients. Mol Cancer. May 20, 2015;14:107. doi: 10.1186/s12943-015-0381-6.
Schroter et al., Detection of myosin light chain phosphorylation—a cell-based assay for screening Rho-kinase inhibitors. Biochem Biophys Res Commun. Sep. 19, 2008;374(2):356-60. Epub Jul. 16, 2008.
Schuler et al., Efficient temporally controlled targeted somatic mutagenesis in hepatocytes of the mouse. Genesis. Jul. 2004;39(3):167-72.
Schwitzgebel et al., Expression of neurogenin3 reveals an islet cell precursor population in the pancreas. Development. Aug. 2000;127(16):3533-42.
Seaberg et al., Clonal identification of multipotent precursors from adult mouse pancreas that generate neural and pancreatic lineages. Nat Biotechnol. Sep. 2004;22(9):1115-24. Epub Aug. 22, 2004.
Segev et al., Differentiation of human embryonic stem cells into insulin-producing clusters. Stem Cells. 2004;22(3):265-74.
Sekiya et al., Direct conversion of mouse fibroblasts to hepatocyte-like cells by defined factors. Nature. Jun. 29, 2011;475(7356):390-3.
Sekiya et al., Hepatocytes, rather than cholangiocytes, can be the major source of primitive ductules in the chronically injured mouse liver. Am J Pathol. May 2014;184(5):1468-78. doi: 10.1016/j.ajpath. 2014.01.005. Epub Mar. 1, 2014.
Sell et al., Hepatocyte proliferation and alpha 1-fetoprotein in pregnant, neonatal, and partially hepatectomized rats. Cancer Res. Apr. 1974;34(4):865-71.
Semler et al., Mechanochemical manipulation of hepatocyte aggregation can selectively induce or repress liver-specific function. Biotechnol Bioeng. Aug. 20, 2000;69(4):359-69.
Sen Majumdar et al., Generation of insulin-producing islet-like clusters from human embryonic stem cells. Diabetologia. 2007;50(1):S222-223, Abstract 0530.

(56) References Cited

OTHER PUBLICATIONS

Shah et al., Metabolic Imaging of Head and Neck Cancer Organoids. PLoS One. Jan. 18, 2017;12(1):e0170415. doi: 10.1371/journal.pone.0170415.
Shaner et al., A bright monomeric green fluorescent protein derived from Branchiostoma lanceolatum. Nat Methods. May 2013;10(5):407-9. doi: 10.1038/nmeth.2413. Epub Mar. 24, 2013.
Shattil et al., The final steps of integrin activation: the end game. Nat Rev Mol Cell Biol. Apr. 2010;11(4):288-300. doi: 10.1038/nrm2871.
Shay et al., Telomerase therapeutics for cancer: challenges and new directions. Nat Rev Drug Discov. Jul. 2006;5(7):577-84. Epub Jun. 9, 2006.
Shi et al., Directed differentiation of human pluripotent stem cells to cerebral cortex neurons and neural networks. Nat Protoc. Oct. 2012;7(10):1836-46. doi: 10.1038/nprot.2012.116. Epub Sep. 13, 2012.
Shibue et al., Fatty acid-binding protein 5 regulates diet-induced obesity via GIP secretion from enteroendocrine K cells in response to fat ingestion. Am J Physiol Endocrinol Metab. Apr. 1, 2015; 308(7):E583-91. doi: 10.1152/ajpendo.00543.2014. Epub Jan. 27, 2015.
Shimizu et al., Identification of a novel therapeutic target for head and neck squamous cell carcinomas: a role for the neurotensin-neurotensin receptor 1 oncogenic signaling pathway. Int J Cancer. Oct. 15, 2008;123(8):1816-23. doi: 10.1002/ijc.23710.
Shockett et al., A modified tetracycline-regulated system provides autoregulatory, inducible gene expression in cultured cells and transgenic mice. Proc Natl Acad Sci U S A. Jul. 3, 1995;92(14):6522-6.
Showell et al., T-box genes in early embryogenesis. Dev Dyn. Jan. 2004;229(1):201-18.
Simmini et al., Transformation of intestinal stem cells into gastric stem cells on loss of transcription factor Cdx2. Nat Commun. Dec. 11, 2014;5:5728. doi: 10.1038/ncomms6728.
Si-Tayeb et al., Highly efficient generation of human hepatocyte-like cells from induced pluripotent stem cells. Hepatology. Jan. 2010;51(1):297-305. doi: 10.1002/hep.23354. Erratum in: Hepatology. Mar. 2010;51(3):1094.
Smith et al., Animal models for the study of squamous cell carcinoma of the upper aerodigestive tract: a historical perspective with review of their utility and limitations. Part A. Chemically-induced de novo cancer, syngeneic animal models of HNSCC, animal models of transplanted xenogeneic human tumors. Int J Cancer. May 1, 2006;118(9):2111-22. doi: 10.1002/ijc.21694.
Smith et al., Comparison of Biosequences, Advances in Applied Mathematics 1981; 2(4):482-489.
Smits et al., Immortalized N/TERT keratinocytes as an alternative cell source in 3D human epidermal models. Sci Rep. Sep. 19, 2017;7(1):11838. doi: 10.1038/s41598-017-12041-y.
Smolich et al., Wnt family proteins are secreted and associated with the cell surface. Mol Biol Cell. Dec. 1993;4(12):1267-75. doi: 10.1091/mbc.4.12.1267.
Snippert et al., Intestinal crypt homeostasis results from neutral competition between symmetrically dividing Lgr5 stem cells. Cell. Oct. 1, 2010;143(1):134-44. doi: 10.1016/j.cell.2010.09.016.
Snippert et al., Lgr6 marks stem cells in the hair follicle that generate all cell lineages of the skin. Science. Mar. 12, 2010;327(5971):1385-9. doi: 10.1126/science.1184733.
Snykers et al., Differentiation of neonatal rat epithelial cells from biliary origin into immature hepatic cells by sequential exposure to hepatogenic cytokines and growth factors reflecting liver development. Toxicol In Vitro. Oct. 2007;21(7):1325-31. Epub Apr. 4, 2007.
Snykers et al., In vitro differentiation of embryonic and adult stem cells into hepatocytes: state of the art. Stem Cells. Mar. 2009;27(3):577-605.
Sommerfelt, Retrovirus receptors. J Gen Virol. Dec. 1999;80 ( Pt 12):3049-64.
Soriano, Generalized lacZ expression with the ROSA26 Cre reporter strain. Nat Genet. Jan. 1999;21(1):70-1.
Soulieres et al., Buparlisib and paclitaxel in patients with platinum-pretreated recurrent or metastatic squamous cell carcinoma of the head and neck (BERIL-1): a randomised, double-blind, placebo-controlled phase 2 trial. Lancet Oncol. Mar. 2017;18(3):323-335. doi: 10.1016/S1470-2045(17)30064-5. Epub Jan. 26, 2017.
Spence et al., Directed differentiation of human pluripotent stem cells into intestinal tissue in vitro. Nature. Feb. 3, 2011; 470(7332):105-9. doi: 10.1038/nature09691. Epub Dec. 12, 2010.
Spradling, Drummond-Barbosa D, Kai T. Stem cells find their niche. Nature.Nov. 1, 2001;414(6859):98-104.
Squier et al., Biology of oral mucosa and esophagus. J Natl Cancer Inst Monogr. 2001;(29):7-15. doi: 10.1093/oxfordjournals.jncimonographs.a003443.
Srinivas et al., Cre reporter strains produced by targeted insertion of EYFP and ECFP into the ROSA26 locus. BMC Dev Biol. 2001;1:4. Epub Mar. 27, 2001.
St Clair et al., Crypt fission and crypt No. in the small and large bowel of postnatal rats. Cell Tissue Kinet. May 1985;18(3):255-62.
St Clair et al., Inhibition by ganciclovir of cell growth and DNA synthesis of cells biochemically transformed with herpesvirus genetic information. Antimicrob Agents Chemother. Jun. 1987;31(6):844-9.
Stanger, Cellular homeostasis and repair in the mammalian liver. Annu Rev Physiol. 2015;77:179-200. doi: 10.1146/annurev-physiol-021113-170255.
Stepniak et al., c-Jun/AP-1 controls liver regeneration by repressing p53/p21 and p38 MAPK activity. Genes Dev. Aug. 15, 2006; 20(16):2306-14.
Stingl et al., Characterization of bipotent mammary epithelial progenitor cells in normal adult human breast tissue. Breast Cancer Res Treat. May 2001;67(2):93-109.
Stingl et al., Purification and unique properties of mammary epithelial stem cells. Nature. Feb. 23, 2006;439(7079):993-7. Epub Jan. 4, 2006.
Stroes et al., Intramuscular administration of AAV1-lipoprotein lipase S447X lowers triglycerides in lipoprotein lipase-deficient patients. Arterioscler Thromb Vasc Biol. Dec. 2008;28(12):2303-4. Supplementary Tables and Figures 8 pages.
Su et al., Relating conformation to function in integrin a5B1. Proc Natl Acad Sci U S A. Jul. 5, 2016;113(27):E3872-81. doi: 10.1073/pnas.1605074113. Epub Jun. 17, 2016.
Sun et al., Integrin activation by talin, kindlin and mechanical forces. Nat Cell Biol. Jan. 2019;21(1):25-31. doi: 10.1038/s41556-018-0234-9. Epub Jan. 2, 2019.
Sun et al., 干细胞向肝细胞诱导分化机制的研究进展 (Research progress in mechanism in inducing stems cells to differentiate into hepatocytes), Medical Review, vol. 16, No. 9, 2010); a Chinese review.
Supek et al., REVIGO summarizes and visualizes long lists of gene ontology terms. PLoS One. 2011; 6(7):e21800. doi: 10.1371/journal.pone.0021800. Epub Jul. 18, 2011.
Suzuki et al., Prospective isolation of multipotent pancreatic progenitors using flow-cytometric cell sorting. Diabetes. Aug. 2004;53(8):2143-52.
Suzuki et al., Role for growth factors and extracellular matrix in controlling differentiation of prospectively isolated hepatic stem cells. Development. Jun. 2003;130(11):2513-24.
Swenson, Direct conversion of mouse fibroblasts to hepatocyte-like cells using forced expression of endodermal transcription factors. Hepatology. Jan. 2012;55(1):316-8.
Takeda et al., Interconversion between intestinal stem cell populations in distinct niches. Science. Dec. 9, 2011; 334(6061):1420-4. doi: 10.1126/science.1213214. Epub Nov. 10, 2011.
Tanaka et al., Head and neck cancer organoids established by modification of the CTOS method can be used to predict in vivo drug sensitivity. Oral Oncol. Dec. 2018;87:49-57. doi: 10.1016/j.oraloncology.2018.10.018. Epub Oct. 23, 2018.
Tanimizu et al., Notch signaling controls hepatoblast differentiation by altering the expression of liver-enriched transcription factors. J Cell Sci. Jul. 1, 2004;117(Pt 15):3165-74.
Tanimizu et al., Sry HMG box protein 9-positive (Sox9+) epithelial cell adhesion molecule-negative (EpCAM-) biphenotypic cells derived

(56) References Cited

OTHER PUBLICATIONS from hepatocytes are involved in mouse liver regeneration. J Biol Chem. Mar. 14, 2014;289(11):7589-98. doi: 10.1074/jbc.M113.517243. Epub Jan. 30, 2014.
Tarlow et al., Bipotential adult liver progenitors are derived from chronically injured mature hepatocytes. Cell Stem Cell. Nov. 6, 2014;15(5):605-18. doi: 10.1016/j.stem.2014.09.008. Epub Oct. 9, 2014.
Terry et al., Impaired enteroendocrine development in intestinal-specific Islet1 mouse mutants causes impaired glucose homeostasis. Am J Physiol Gastrointest Liver Physiol. Nov. 15, 2014;307(10):G979-91. doi: 10.1152/ajpgi.00390.2013. Epub Sep. 11, 2014.
Teta et al., Growth and regeneration of adult beta cells does not involve specialized progenitors. Dev Cell. May 2007;12(5):817-26.
Tetteh et al., Replacement of Lost Lgr5-Positive Stem Cells through Plasticity of Their Enterocyte-Lineage Daughters. Cell Stem Cell. Feb. 4, 2016; 18(2):203-13. doi: 10.1016/j.stem.2016.01.001. Epub Jan. 28, 2016.
Thenappan et al. New Therapeutics Targeting Colon Cancer Stem Cells. Curr Colorectal Cancer Rep. Oct. 1, 2009;5(4):209.
Thenappan et al., Role of transforming growth factor beta signaling and expansion of progenitor cells in regenerating liver. Hepatology. Apr. 2010;51(4):1373-82. doi: 10.1002/hep.23449.
Thomas et al., Role of gastrointestinal hormones in the proliferation of normal and neoplastic tissues. Endocr Rev. Oct. 2003;24(5):571-99.
Tisato et al., Upregulation of SOCS-1 by Nutlin-3 in acute myeloid leukemia cells but not in primary normal cells. Clinics (Sao Paulo). Jan. 2014; 69(1):68-74. doi: 10.6061/clinics/2014(01)10.
Tojo et al., The ALK-5 inhibitor A-83-01 inhibits Smad signaling and epithelial-to-mesenchymal transition by transforming growth factor-beta. Cancer Sci. Nov. 2005;96(11):791-800.
Touhami et al., The role of NGF signaling in human limbal epithelium expanded by amniotic membrane culture. Invest Ophthalmol Vis Sci. Apr. 2002;43(4):987-94.
Trautmann et al., Isolation, culture, and characterization of human pancreatic duct cells. Pancreas. Mar. 1993;8(2):248-54.
Trierweiler et al., The transcription factor c-JUN/AP-1 promotes HBV-related liver tumorigenesis in mice. Cell Death Differ. Apr. 2016; 23(4):576-82. doi: 10.1038/cdd.2015.121. Epub Oct. 16, 2015.
Tsai et al., LGR4 and LGR5 Function Redundantly During Human Endoderm Differentiation. Cell Mol Gastroenterol Hepatol. Jun. 23, 2016;2(5):648-662.e8. doi: 10.1016/j.jcmgh.2016.06.002. eCollection Sep. 2016.
Tsuchida et al., Classification of 'activation' antibodies against integrin beta1 chain. FEBS Lett. Oct. 20, 1997;416(2):212-6. doi: 10.1016/s0014-5793(97)01206-4.
Ueno, Morio Biotechnology Journal. 2007;11-12:701-5. Japanese.
Valyi-Nagy et al., Herpes simplex virus 1 infection promotes the growth of a subpopulation of tumor cells in three-dimensional uveal melanoma cultures. Journal of virology. Sep. 12, 2018;92(19):e00700-18.
Van Amerongen et al., Developmental stage and time dictate the fate of Wnt/β-catenin-responsive stem cells in the mammary gland. Cell Stem Cell. Sep. 7, 2012;11(3):387-400. doi: 10.1016/j.stem.2012.05.023. Epub Aug. 2, 2012.
Van De Wetering et al., Mutant E-cadherin breast cancer cells do not display constitutive Wnt signaling. Cancer Res. Jan. 1, 2001;61(1):278-84.
Van De Wetering et al., Prospective derivation of a living organoid biobank of colorectal cancer patients. Cell. May 7, 2015;161(4):933-45. doi: 10.1016/j.cell.2015.03.053.
Van De Wetering et al., The beta-catenin/TCF-4 complex imposes a crypt progenitor phenotype on colorectal cancer cells. Cell. Oct. 18, 2002;111(2):241-50.
Van Der Flier et al., Transcription factor achaete scute-like 2 controls intestinal stem cell fate. Cell. Mar. 6, 2009;136(5):903-12.

Van Es et al., Dll1+ secretory progenitor cells revert to stem cells upon crypt damage. Nat Cell Biol. Oct. 2012; 14(10):1099-1104. doi: 10.1038/ncb2581. Epub Sep. 23, 2012.
Van Es et al., Notch/gamma-secretase inhibition turns proliferative cells in intestinal crypts and adenomas into goblet cells. Nature. Jun. 16, 2005;435(7044):959-63.
Van Jaarsveld et al., Difference Makers: Chromosomal Instability versus Aneuploidy in Cancer. Trends Cancer. Oct. 2016;2(10):561-571. doi: 10.1016/j.trecan.2016.09.003. Epub Sep. 24, 2016.
Vassilev et al., In vivo activation of the p53 pathway by small-molecule antagonists of MDM2. Science. Feb. 6, 2004;303(5659):844-8. doi: 10.1126/science.1092472. Epub Jan. 2, 2004.
Vaughan et al., Lineage-negative progenitors mobilize to regenerate lung epithelium after major injury. Nature. Jan. 29, 2015; 517(7536):621-5. doi: 10.1038/nature14112. Epub Dec. 24, 2014.
Verbeke et al., Humanization of the mouse mammary gland by replacement of the luminal layer with genetically engineered preneoplastic human cells. Breast Cancer Res. Dec. 20, 2014; 16(6):504. doi: 10.1186/s13058-014-0504-9.
Verma et al., Sustained telomere length in hepatocytes and cholangiocytes with increasing age in normal liver. Hepatology. Oct. 2012;56(4):1510-20. doi: 10.1002/hep.25787. Epub Aug. 27, 2012.
Vickaryous et al., Human cell type diversity, evolution, development, and classification with special reference to cells derived from the neural crest. Biol Rev Camb Philos Soc. Aug. 2006;81(3):425-55. doi: 10.1017/S1464793106007068. Epub Jun. 22, 2006.
Vigna et al., Lentiviral vectors: excellent tools for experimental gene transfer and promising candidates for gene therapy. J Gene Med. Sep.-Oct. 2000;2(5):308-16.
Vincan et al., Frizzled-7 dictates three-dimensional organization of colorectal cancer cell carcinoids. Oncogene. Apr. 5, 2007;26(16):2340-52. Epub Oct. 2, 2006.
Visco et al., Differential response to keratinocyte growth factor receptor and epidermal growth factor receptor ligands of proliferating and differentiating intestinal epithelial cells. J Cell Physiol. J Cell Physiol. Jul. 2004;200(1):31-44.
Vlachigiannis et al., Patient-derived organoids model treatment response of metastatic gastrointestinal cancers. Science. Feb. 23, 2018;359(6378):920-926. doi: 10.1126/science.aao2774. Author Manuscript, 17 pages.
Voronkov et al., Wnt/beta-catenin signaling and small molecule inhibitors. Curr Pharm Des. 2013; 19(4):634-64.
Voskoglou-Nomikos et al., Clinical predictive value of the in vitro cell line, human xenograft, and mouse allograft preclinical cancer models. Clin Cancer Res. Sep. 15, 2003;9(11):4227-39.
Walen, Spontaneous cell transformation: karyoplasts derived from multinucleated cells produce new cell growth in senescent human epithelial cell cultures. In Vitro Cell Dev Biol Anim. May-Jun. 2004;40(5-6):150-8.
Walther et al., Viral vectors for gene transfer: a review of their use in the treatment of human diseases. Drugs. Aug. 2000;60(2):249-71.
Wang et al., A regulatory system for new use in gene transfer. Proc. Natl. Acad. Sci. USA. 1994;91:8180-4.
Wang et al., Dissecting signaling pathways that govern self-renewal of rabbit embryonic stem cells. J Biol Chem. Dec. 19, 2008;283(51):35929-40.
Wang et al., Duct- to islet-cell differentiation and islet growth in the pancreas of duct-ligated adult rats. Diabetologia. Dec. 1995;38(12):1405-11.
Wang et al., Regulation of TRAIL expression by the phosphatidylinositol 3-kinase/Akt/GSK-3 pathway in human colon cancer cells. J Biol Chem. Sep. 27, 2002;277(39):36602-10.
Wang et al., Self-renewing diploid Axin2(+) cells fuel homeostatic renewal of the liver. Nature. Aug. 13, 2015;524(7564):180-5. doi: 10.1038/nature14863. Epub Aug. 5, 2015.
Watanabe et al., A Rock inhibitor permits survival of dissociated human embryonic stem cells. Nat Biotechnol. Jun. 2007;25(6):681-6. Epub May 27, 2007.
Wei et al., Wnt proteins in intestinal epithelial progenitor cells. R&D Systems. 2015. Poster. 1 page.

(56) References Cited

OTHER PUBLICATIONS

Whitehead et al., A method for the isolation and culture of human colonic crypts in collagen gels. In Vitro Cell Dev Biol. Jun. 1987;23(6):436-42.
Whitehead et al., Clonogenic growth of epithelial cells from normal colonic mucosa from both mice and humans. Gastroenterology. Oct. 1999;117(4):858-65.
Willert et al., Wnt proteins are lipid-modified and can act as stem cell growth factors. Nature. May 22, 2003;423(6938):448-52. Epub Apr. 27, 2003.
Williams et al., The role of the Wnt family of secreted proteins in rat oval "stem" cell-based liver regeneration: Wnt1 drives differentiation. Am J Pathol. Jun. 2010;176(6):2732-42. Epub Apr. 22, 2010.
Willis, RNA polymerase III. Genes, factors and transcriptional specificity. Eur J Biochem. Feb. 15, 1993;212(1):1-11.
Wouters et al., Evolution of distinct EGF domains with specific functions. Protein Sci. Apr. 2005;14(4):1091-103.
Wu et al., FGF19 regulates cell proliferation, glucose and bile acid metabolism via FGFR4-dependent and independent pathways. PLoS One. Mar. 18, 2011;6(3):e17868.
Xu et al., Beta cells can be generated from endogenous progenitors in injured adult mouse pancreas. Cell. Jan. 25, 2008;132(2):197-207.
Yan et al., Expression profile analysis of head and neck squamous cell carcinomas using data from The Cancer Genome Atlas. Mol Med Rep. May 2016;13(5):4259-65. doi: 10.3892/mmr.2016.5054. Epub Mar. 28, 2016.
Yan et al., The intestinal stem cell markers Bmi1 and Lgr5 identify two functionally distinct populations. Proc Natl Acad Sci U S A. Jan. 10, 2012; 109(2):466-71. doi: 10.1073/pnas.1118857109. Epub Dec. 21, 2011.
Yang et al. Differentiation of Human Induced-Pluripotent Stem Cells into Smooth-Muscle Cells: Two Novel Protocols. PLoS One. Jan. 15, 2016;11(1):e0147155. doi: 10.1371/journal.pone.0147155.
Yang et al., A small molecule agonist of an integrin, alphaLbeta2. J Biol Chem. Dec. 8, 2006;281(49):37904-12. doi: 10.1074/jbc.M606888200. Epub Oct. 5, 2006.
Yang et al., In vitro trans-differentiation of adult hepatic stem cells into pancreatic endocrine hormone-producing cells. Proc Natl Acad Sci U S A. Jun. 11, 2002;99(12):8078-83. Epub Jun. 4, 2002.
Yang et al.,β-catenin signaling in murine liver zonation and regeneration: a Wnt-Wnt situation! Hepatology. Sep. 2014; 60(3):964-76. doi: 10.1002/hep.27082. Epub Jul. 25, 2014.
Yanger et al., Adult hepatocytes are generated by self-duplication rather than stem cell differentiation. Cell Stem Cell. Sep. 4, 2014;15(3):340-349. doi: 10.1016/j.stem.2014.06.003. Epub Aug. 14, 2014.
Yanger et al., Robust cellular reprogramming occurs spontaneously during liver regeneration. Genes Dev. Apr. 1, 2013;27(7):719-24. doi: 10.1101/gad.207803.112. Epub Mar. 21, 2013. Erratum in: Genes Dev. Jul. 1, 2013;27(13):1537.
Yaswen et al., Isolation of oval cells by centrifugal elutriation and comparison with other cell types purified from normal and preneoplastic livers. Cancer Res. Jan. 1984;44(1):324-31.
Yen, The gastrointestinal tract stem cell niche. Stem Cell Rev. 2006;2(3):203-12.
Yimlamai et al., Hippo pathway activity influences liver cell fate. Cell. Jun. 5, 2014;157(6):1324-1338.
Yin et al., Niche-independent high-purity cultures of Lgr5+ intestinal stem cells and their progeny. Nat Methods. Jan. 2014;11(1):106-12. doi: 10.1038/nmeth.2737. Epub Dec. 1, 2013.
Yokoyama et al., Regeneration of mouse liver after partial hepatectomy. Cancer Res. Jan. 1953;13(1):80-5.
Yoshimura et al., Vascular endothelial cells and smooth muscle cells mediate carbachol-induced hepatocyte proliferation via muscarinic receptors and IP3/PKC signaling cascades. Cell Biol Int. Apr. 2009; 33(4):516-23.
Yu et al., Beta1-integrin orients epithelial polarity via Rac1 and laminin. Mol Biol Cell. Feb. 2005;16(2):433-45. doi: 10.1091/mbc. e04-05-0435. Epub Dec. 1, 2004.
Yu et al., Cancer therapy. Ex vivo culture of circulating breast tumor cells for individualized testing of drug susceptibility. Science. Jul. 11, 2014; 345(6193):216-20. doi: 10.1126/science.1253533.
Zaret, Genetic programming of liver and pancreas progenitors: lessons for stem-cell differentiation. Nat Rev Genet. May 2008;9(5):329-40. doi: 10.1038/nrg2318.
Zauli et al., MDM2 antagonist Nutlin-3 suppresses the proliferation and differentiation of human pre-osteoclasts through a p53-dependent pathway. J Bone Miner Res. Oct. 2007; 22(10):1621-30.
Zhang et al., Receptor specificity of the fibroblast growth factor family. The complete mammalian FGF family. J Biol Chem. Jun. 9, 2006;281(23):15694-700. doi: 10.1074/jbc.M601252200. Epub Apr. 4, 2006.
Zhou et al., Oxidative stress-induced intestinal epithelial cell apoptosis is mediated by p38 MAPK. Biochem Biophys Res Commun. Dec. 1, 2006;350(4):860-5. Epub Sep. 29, 2006.
Zhu et al., Study on a 3D Hydrogel-Based Culture Model for Characterizing Growth of Fibroblasts under Viral Infection and Drug Treatment. SLAS Discov. Jun. 2017;22(5):626-634. doi: 10.1177/2472555217701247. Epub Mar. 24, 2017.
Zhu et al., Chemical strategies for stem cell biology and regenerative medicine. Annu Rev Biomed Eng. Aug. 15, 2011;13:73-90.
Zhu et al., Mouse liver repopulation with hepatocytes generated from human fibroblasts. Nature. Apr. 3, 2014;508(7494):93-7. doi: 10.1038/nature13020. Epub Feb. 23, 2014.
Zilberberg et al., A rapid and sensitive bioassay to measure bone morphogenetic protein activity. BMC Cell Biol. Sep. 19, 2007;8:41.
Zimmerman, Lung organoid culture. Differentiation. 1987; 36(1):86-109.
Zolk et al., Transporter gene expression in human head and neck squamous cell carcinoma and associated epigenetic regulatory mechanisms. Am J Pathol. Jan. 2013;182(1):234-43. doi: 10.1016/j.ajpath. 2012.09.008. Epub Nov. 6, 2012.
Zong et al., Notch signaling controls liver development by regulating biliary differentiation. Development. May 2009;136(10):1727-39. doi: 10.1242/dev.029140. Epub Apr. 15, 2009.
Zuo el al., p63(+)Krt5(+) distal airway stem cells are essential for lung regeneration. Nature. Jan. 29, 2015; 517(7536):616-20. doi: 10.1038/nature13903. Epub Nov. 12, 2014.
Agopian et al., Intestinal stem cell organoid transplantation generates neomucosa in dogs. J Gastrointest Surg. May 2009;13(5):971-82. doi: 10.1007/s11605-009-0806-x. Epub Jan. 23, 2009.
Casey et al., Theory of cell fate. Wiley Interdiscip Rev Syst Biol Med. Mar. 2020; 12(2):e1471. doi: 10.1002/wsbm.1471. Epub Dec. 12, 2019.
Kim et al., Engraftment potential of spheroid-forming hepatic endoderm derived from human embryonic stem cells. Stem Cells Dev. Jun. 15, 2013;22(12):1818-29. doi: 10.1089/scd.2012.0401. Epub Mar. 12, 2013.
Tostões et al., Human liver cell spheroids in extended perfusion bioreactor culture for repeated-dose drug testing. Hepatology. Apr. 2012;55(4):1227-36.
You et al., The type III TGF-beta receptor signals through both Smad3 and the p38 MAP kinase pathways to contribute to inhibition of cell proliferation. Carcinogenesis. Dec. 2007;28(12):2491-500. doi: 10.1093/carcin/bgm195. Epub Sep. 3, 2007.
U.S. Appl. No. 12/705,336, filed May 10, 2010, Granted, U.S. Pat. No. 8,906,631.
U.S. Appl. No. 14/494,511, filed Sep. 23, 2014, Granted, U.S. Pat. No. 9,833,496.
U.S. Appl. No. 15/813,863, filed Nov. 15, 2017, Granted, U.S. Pat. No. 10,940,180.
U.S. Appl. No. 17/161,376, filed Jan. 28, 2021, Published, 2021-0228682.
U.S. Appl. No. 13/147,163, filed Sep. 14, 2011, Granted, U.S. Pat. No. 8,642,339.
U.S. Appl. No. 14/079,545, filed Nov. 13, 2013, Granted, U.S. Pat. No. 10,947,510.
U.S. Appl. No. 16/113,445, filed Aug. 27, 2018, Published, 2019-0100728.
U.S. Appl. No. 13/194,866, filed Jul. 29, 2011, Granted, U.S. Pat. No. 9,752,124.

(56) References Cited

OTHER PUBLICATIONS

U.S. Appl. No. 15/654,243, filed Jul. 19, 2017, Published, 2018-0072995.
U.S. Appl. No. 13/812,614, filed Apr. 8, 2013, Granted, U.S. Pat. No. 9,765,301.
U.S. Appl. No. 15/665,363, filed Jul. 31, 2017, Granted, U.S. Pat. No. 11,034,935.
U.S. Appl. No. 17/191,650, filed Mar. 3, 2021, Published, 2021-0317416.
U.S. Appl. No. 14/124,884, filed May 9, 2014, Published, 2014-0243227.
U.S. Appl. No. 14/367,061, filed Jun. 19, 2014, Granted, U.S. Pat. No. 10,006,904.
U.S. Appl. No. 16/003,293, filed Jun. 8, 2018, Granted, U.S. Pat. No. 11,035,852.
U.S. Appl. No. 17/314,557, filed May 7, 2021, Published, 2021-0333266.
U.S. Appl. No. 17/611,561, filed Nov. 15, 2021, Published, 2022-0340879.
U.S. Appl. No. 15/310,905, filed Nov. 14, 2016, Granted, U.S. Pat. No. 10,597,633.
U.S. Appl. No. 16/743,191, filed Jan. 15, 2020, Published, 2020-0172861.
U.S. Appl. No. 16/906,515, filed Jun. 19, 2020, Published, 2020-0318063.
U.S. Appl. No. 15/529,346, filed May 24, 2017, Granted, U.S. Pat. No. 11,130,943.
U.S. Appl. No. 17/410,126, filed Aug. 24, 2021, Published, 2022-0135952.
U.S. Appl. No. 15/529,150, filed May 24, 2017, Granted, U.S. Pat. No. 10,961,511.
U.S. Appl. No. 17/182,457, filed Feb. 23, 2021, Published, 2021-0254017.
U.S. Appl. No. 16/078,354, filed Aug. 21, 2018, Granted, U.S. Pat. No. 11,591,572.
U.S. Appl. No. 16/310,933, filed Dec. 18, 2018, Published, 2021-0047618.
U.S. Appl. No. 17/296,049, filed May 21, 2021, Published, 2022-0017860.
U.S. Appl. No. 18/100,195, filed Jan. 23, 2023, Pending.
Leonard et al., Screening of budesonide nanoformulations for treatment of inflammatory bowel disease in an inflamed 3D cell-culture model. ALTEX. 2012;29(3):275-85.
Noben et al., Human intestinal epithelium in a dish: Current models for research into gastrointestinal pathophysiology. United European Gastroenterol J. Dec. 2017;5(8):1073-1081. doi: 10.1177/2050640617722903. Epub Jul. 21, 2017.
Schmohl et al., Characterization of immunologically active drugs in a novel organotypic co- culture model of the human gut and whole blood. Int Immunopharmacol. Dec. 2012;14(4):722-8. doi: 10.1016/j.intimp.2012.10.010. Epub Oct. 24, 2012.
Vadstrup et al., Validation and Optimization of an Ex Vivo Assay of Intestinal Mucosal Biopsies in Crohn's Disease: Reflects Inflammation and Drug Effects. PLoS One. May 12, 2016;11(5):e0155335.
U.S. Appl. No. 17/161,376, filed Jan. 28, 2021, Abandoned, 2021-0228682.
U.S. Appl. No. 13/194,86, filed Jul. 29, 2011, Granted, U.S. Pat. No. 9,752,124.
U.S. Appl. No. 15/654,243, filed Mar. 15, 2018, Published, 2018-0072995.
U.S. Appl. No. 16/954,506, filed Jun. 16, 2020, Published, 2021-0208131.
U.S. Appl. No. 16/743,191, filed Jun. 4, 2020, Granted, U.S. Pat. No. 11,725,184.
U.S. Appl. No. 16/906,515, filed Oct. 8, 2020, Allowed, 2020-0318063.
U.S. Appl. No. 18/100,195, filed Jan. 23, 2023, Published, 2023-0272347.
Blaüer et al., A novel organotypic culture model for normal human endometrium: regulation of epithelial cell proliferation by estradiol and medroxyprogesterone acetate. Hum Reprod. Apr. 2005;20(4):864-71. doi: 10.1093/humrep/deh722. Epub Jan. 21, 2005.
Öhlund et al., Distinct populations of inflammatory fibroblasts and myofibroblasts in pancreatic cancer. J Exp Med. Mar. 6, 2017;214(3):579-596. doi: 10.1084/jem.20162024. Epub Feb. 23, 2017.
Alizadeh-Navaei et al., Comparison of leucine-rich repeat-containing G protein-coupled receptor 5 expression in different cancer and normal cell lines. Biomed Rep. Jul. 2016;5(1):130-132. doi: 10.3892/br.2016.684. Epub May 20, 2016.
Bernshteyn et al., Hepatic cyst. StatPearls. Jun. 2023. Retrieved from <https://www.ncbi.nlm.nih.gov/books/NBK526052>. 4 pages.
Cameron, D., Powerful technique for multiplying adult stem cells may aid therapies, 2006. Retrieved from <https://wi.mit.edu/news/powerful-technique-multiplying-adult-stem-cells-may-aid-therapies>. 4 pages.
Caporale et al., Locoregional IL-2 therapy in the treatment of colon cancer. Cell-induced lesions of a murine model. Anticancer Res. Mar.-Apr. 2007;27(2):985-9.
Drakos et al., Inhibition of p53-murine double minute 2 interaction by nutlin-3A stabilizes p53 and induces cell cycle arrest and apoptosis in Hodgkin lymphoma. Clin Cancer Res. Jun. 1, 2007;13(11):3380-7.
Dunlap, Cysts of the jaws. Sep. 2007. Retrieved from <https://dentistry.umkc.edu/wp-content/uploads/2017/09/Jcysts.pdf>. 8 pages.
Kucab et al., Selection of TP53-mutated human TP53 knock-in (hupki) mouse embryo fibroblasts using the MDM2 inhibitor Nutlin-3a. Abstract 15. 36th Annual Meeting of the United Kingdom Environmental Mutagen Society. Bristol, UK. Jul. 15-17, 2013. Mutagenesis. 2014; 29(1): 83-84.
Mitaka et al., Reconstruction of hepatic organoid by rat small hepatocytes and hepatic nonparenchymal cells. Hepatology. Jan. 1999;29(1):111-25.
Miyachi et al., Restoration of p53 pathway by nutlin-3 induces cell cycle arrest and apoptosis in human rhabdomyosarcoma cells. Clin Cancer Res. Jun. 15, 2009;15(12):4077-84. doi: 10.1158/1078-0432. CCR-08-2955. Epub Jun. 9, 2009.
Sato et al., EGFR inhibitors prevent induction of cancer stem-like cells in esophageal squamous cell carcinoma by suppressing epithelial-mesenchymal transition. Cancer Biol Ther. 2015;16(6):933-40. doi: 10.1080/15384047.2015.1040959. Epub Apr. 21, 2015.
Sato et al., Intestinal stem cells. Seikagaku. Sep. 2013; 85(9):743-8. Japanese.
Tian et al., Opposing activities of Notch and Wnt signaling regulate intestinal stem cells and gut homeostasis. Cell Rep. Apr. 7, 2015;11(1):33-42. doi: 10.1016/j.celrep.2015.03.007. Epub Mar. 26, 2015.
Vanuytsel et al., Major signaling pathways in intestinal stem cells. Biochim Biophys Acta 2013; 1830(2): 2410-26.
Villalonga-Planells et al., Activation of p53 by nutlin-3a induces apoptosis and cellular senescence in human glioblastoma multiforme. PLoS One. Apr. 5, 2011;6(4):e18588.
Zhao et al., Abstract 4529: Cellular pharmacokinetic and activity studies with the MDDM2-p53 inhibitor Nutlin-3. 101st Annual Meeting of the American Association foro Cancer Research. 2010. Apr. 17-21, 2010. Cancer Res. Apr. 2010; 70(8): Supp. 4 pages.

* cited by examiner

B  organoid cultures

C  T-cell cultures

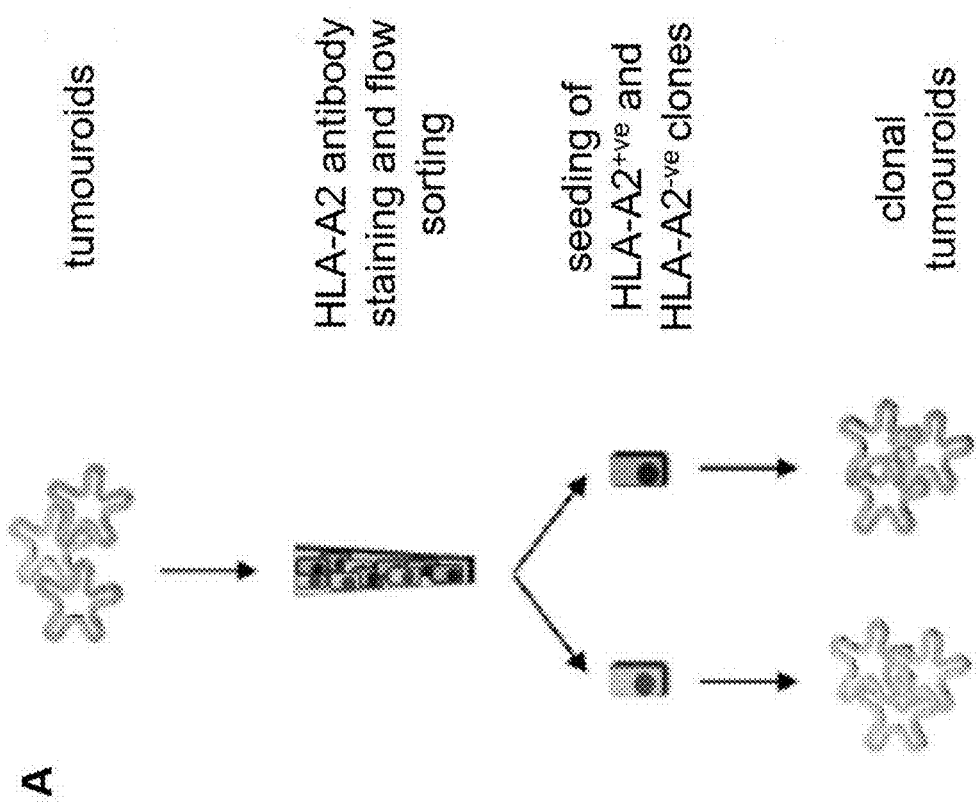

SEQUENCE LISTING

```
<160> NUMBER OF SEQ ID NOS: 7

<210> SEQ ID NO 1
<211> LENGTH: 17
<212> TYPE: DNA
<213> ORGANISM: Artificial Sequence
<220> FEATURE:
<223> OTHER INFORMATION: GAPDH Forward Primer

<400> SEQUENCE: 1
gtcggagtca acggatt                                                  17

<210> SEQ ID NO 2
<211> LENGTH: 17
<212> TYPE: DNA
<213> ORGANISM: Artificial Sequence
<220> FEATURE:
<223> OTHER INFORMATION: GAPDH Reverse Primer

<400> SEQUENCE: 2
aagcttcccg ttctcag                                                  17

<210> SEQ ID NO 3
<211> LENGTH: 18
<212> TYPE: DNA
<213> ORGANISM: Artificial Sequence
<220> FEATURE:
<223> OTHER INFORMATION: HPRT Forward Primer

<400> SEQUENCE: 3
ggcgtcgtga ttagtgat                                                 18

<210> SEQ ID NO 4
<211> LENGTH: 18
<212> TYPE: DNA
<213> ORGANISM: Artificial Sequence
<220> FEATURE:
<223> OTHER INFORMATION: HPRT Reverse Primer

<400> SEQUENCE: 4
agggctacaa tgtgatgg                                                 18

<210> SEQ ID NO 5
```

```
<211> LENGTH: 21
<212> TYPE: DNA
<213> ORGANISM: Artificial Sequence
<220> FEATURE:
<223> OTHER INFORMATION: CD274 Forward Primer

<400> SEQUENCE: 5
tgcagggcat tccagaaaga t                                              21

<210> SEQ ID NO 6
<211> LENGTH: 22
<212> TYPE: DNA
<213> ORGANISM: Artificial Sequence
<220> FEATURE:
<223> OTHER INFORMATION: CD274 Reverse Primer

<400> SEQUENCE: 6
ccgtgacagt aaatgcgttc ag                                             22

<210> SEQ ID NO 7
<211> LENGTH: 15
<212> TYPE: DNA
<213> ORGANISM: Unknown
<220> FEATURE:
<223> OTHER INFORMATION: Mammalian

<400> SEQUENCE: 7
cagctgtagc tacgt                                                     15
```

IMMUNE CELL ORGANOID CO-CULTURES

RELATED APPLICATIONS

This application is a national stage filing under 35 U.S.C. § 371 of International Application No. PCT/EP2018/086716, filed Dec. 21, 2018, which was published under PCT Article 21 (2) in English, and claims the benefit of United Kingdom Application No. 1721615.1, filed Dec. 21, 2017, each of which is herein incorporated by reference in its entirety.

All documents cited herein are incorporated by reference in their entirety.

TECHNICAL FIELD

The present invention relates to organoid co-cultures and their use in the investigation of diseases.

REFERENCE TO A SEQUENCE LISTING SUBMITTED AS A TEXT FILE VIA EFS-WEB

The instant application contains a Sequence Listing which has been submitted in ASCII format via EFS-Web and is hereby incorporated by reference in its entirety. Said ASCII copy, created on Jul. 6, 2020, is named C097370023US00-SUBSEQ-MAT and is 1 kilobyte in size.

BACKGROUND

Clinical research into the physiology underlying diseases, such as cancer and immune diseases, remains a cornerstone of medical progress, though in vitro systems for performing such investigations remain basic. Equally, modern regimens for the treatment of such diseases typically involve rigorous test systems during development, to ensure the efficacy and safety of regimens. Though recent advances in these fields have increased the efficacy of investigative and therapeutic test systems, there is a need for improvements in terms of the efficiency, accuracy, and cost-effectiveness of the systems. An ideal test system would accurately replicate the physiology of a patient or patient population, at biochemical, cellular, tissue, organ, and organism levels, without requiring the performance of tests directly upon patients and minimizing use of patient samples. A variety of different treatment agents and timescales must be accommodated in one system.

In vitro models are needed for 'screening' candidate compounds to identify new regimens for investigating and treating cancer and immune diseases at the level of a population. In addition, there is increasing interest in 'personalised medicine' wherein in vitro models can be used to test (sometimes previously approved) regimens in patient subgroups with particular characteristics, or even on samples from a single patient, to determine the optimum regimen for that particular subgroup or patient.

The field of organoid technology is revolutionizing our understanding of developmental biology. An organoid is a cellular structure obtained by expansion of epithelial cells and consisting of tissue-specific cell types that self-organizes through cell sorting and spatially restricted lineage commitment (Clevers, Cell. 2016 Jun. 16; 165 (7): 1586-1597). A limitation of organoid-based models in the prior art, is that they contain only epithelial cells and so are not fully representive of an in vivo tissue system that contains multiple cells types. In particular, human 'co-cultures' of cancer organoids ("tumouroids") and immune cells have not been described, certainly not wherein the cancer and immune cells have been obtained from the same patient. The immune cells improve the accuracy of the organoid as a test system, replicating the physiology of the patient and ensuring that the immune system is represented in the test system.

Previous attempts have demonstrated the co-culture of murine intra-epithelial lymphocytes (IELs) with murine intestinal epithelial organoids, for the purposes of understanding the spatiotemporal behaviours of IELs with intestinal epithelial cells—Nozaki et al. (J Gastroenterol. 2016 March; 51 (3): 206-13) and Rogoz et al. (J Immunol Methods. 2015 June; 421:89-95—but the progression to developing human organoid co-cultures and the application to investigating and treating cancer were not reported. So-called 'tumouroids' have been prepared from samples derived from colorectal cancer patients (Drost et al., Nature. 2015 May 7; 521 (7550): 43-7; van de Wetering et al., Cell. 2015 May 7; 161 (4): 933-45), but have not been co-cultured with immune cells to investigate treatment regimens for cancer.

There is a need for improved methods for preparing organoid co-cultures and tumouroid co-cultures and methods for using these co-cultures in drug screening, particularly a system in which the interaction between disease cells and immune cells can be leveraged to investigate an increased array of drugs with high-throughput capability.

SUMMARY OF INVENTION

The inventors have developed organoid co-cultures useful for investigations relating to diseases, such as cancer and immune diseases, including the identification of suitable treatments for such diseases. This involves in some embodiments preparing co-cultures of organoids and immune cells, particularly disease organoids (such as tumoroids) and immune cells, which can be exposed to candidate agents for treating diseases and detecting any changes for identifying suitable candidate agents.

Accordingly, the invention provides among other things a method for identifying an agent suitable for treating a cancer, wherein the method comprises:
  contacting a tumouroid co-culture with one or more candidate agents, wherein the tumouroid co-culture comprises immune cells and at least one tumouroid,
  detecting the presence or absence of one or more change in the tumouroid co-culture that is indicative of candidate agent suitability for treating the cancer, and
  identifying a candidate agent as suitable for treating the cancer if the presence or absence of one or more of said changes in the tumouroid co-culture is detected.

In some embodiments, the above method further comprises comparing the presence or absence of the one or more change of the tumouroid co-culture with a reference organoid or reference tumouroid, and wherein the method further comprises:
  contacting a reference organoid co-culture or reference tumouroid co-culture with the one or more candidate agents, wherein the reference organoid co-culture or reference tumouroid co-culture comprises immune cells and at least one organoid or tumouroid, and
  detecting the presence or absence of the one or more change in the reference organoid co-culture or reference tumouroid co-culture that is indicative of candidate agent suitability for treating the cancer.

The invention further provides a method for identifying an agent suitable for treating an immune disease, wherein the method comprises:

contacting an organoid co-culture with one or more candidate agents, wherein the organoid co-culture comprises diseased immune cells and at least one organoid, detecting the presence or absence of one or more change in the organoid co-culture that is indicative of candidate agent suitability for treating the immune disease, and identifying a candidate agent as suitable for treating the immune disease if the presence or absence of one or more of said changes in the organoid co-culture is detected.

In some embodiments, the above method further comprises comparing the presence or absence of the one or more change of the organoid co-culture with a reference immune cell (e.g. from a control patient lacking the immune disease), and wherein the method further comprises:

contacting a reference organoid co-culture with the one or more candidate agents, wherein the reference organoid co-culture comprises immune cells and at least one organoid, and detecting the presence or absence of the one or more change in the reference organoid co-culture that is indicative of candidate agent suitability for treating the immune disease.

Also provided is a method of testing a CAR-T immunotherapy, TCR transgenic T cells, neoantigen, or checkpoint inhibitor, for efficacy and/or safety when used for treating epithelial cancer, the method comprising:

optionally providing from the same patient tumour epithelial cells, normal epithelial cells, and immune cells, expanding the tumour epithelial cells in tumouroid culture medium to form a tumouroid, and culturing the tumouroid with the immune cells in a tumouroid co-culture medium comprising interleukin to form a tumouroid co-culture, expanding the normal epithelial cells in organoid culture medium to form an organoid, and culturing the organoid with the immune cells in an organoid co-culture medium comprising interleukin to form a reference organoid co-culture, contacting the tumouroid co-culture and reference organoid co-culture with the CAR-T immunotherapy, TCR transgenic T cells, neoantigen, or checkpoint inhibitor, detecting the presence or absence of one or more change in the tumouroid co-culture and reference organoid co-culture, wherein the presence or absence of one or more change is indicative of efficacy and/or safety of the CAR-T immunotherapy, TCR transgenic T cells, neoantigen, or checkpoint inhibitor, and comparing the tumouroid co-culture and reference organoid co-culture.

Also provided is a method of testing a candidate compound for efficacy and/or safety when used for treating epithelial cancer, the method comprising:

optionally providing from the same patient tumour epithelial cells, normal epithelial cells, and immune cells, expanding the tumour epithelial cells in tumouroid culture medium to form a tumouroid, and culturing the tumouroid with the immune cells in a tumouroid co-culture medium comprising interleukin to form a tumouroid co-culture, expanding the normal epithelial cells in organoid culture medium to form an organoid, and culturing the organoid with the immune cells in an organoid co-culture medium comprising interleukin to form a reference organoid co-culture, contacting the tumouroid co-culture and reference organoid co-culture with the candidate compound, detecting the presence or absence of one or more change in the tumouroid co-culture and reference organoid co-culture, wherein the presence or absence of one or more change is indicative of efficacy and/or safety of the candidate compound, and comparing the tumouroid co-culture and reference organoid co-culture.

Also provided is a method for preparing an organoid-immune cell co-culture, wherein the method comprises:

optionally culturing epithelial cells in contact with an extracellular matrix in an organoid culture medium to obtain an organoid;

removing said extracellular matrix and organoid culture medium from said organoid;

resuspending said organoid in immune cell culture medium supplemented with interleukin;

preparing an immune cell suspension comprising immune cells, immune cell culture medium supplemented with interleukin, and collagen at at least 5-10% concentration in the suspension; and mixing the immune cell suspension comprising immune cells with the resuspended organoid.

Also provided is a method for preparing a tumouroid-immune cell co-culture, wherein the method comprises:

optionally culturing tumour epithelial cells in contact with an extracellular matrix in an tumouroid culture medium to obtain an organoid;

removing said extracellular matrix and tumouroid culture medium from said tumouroid;

resuspending said tumouroid in immune cell culture medium supplemented with interleukin;

preparing an immune cell suspension comprising immune cells, immune cell culture medium supplemented with interleukin, and collagen at at least 5-10% concentration in the suspension; and mixing the immune cell suspension comprising immune cells with the resuspended tumouroid.

Also provided is a method for testing a therapeutic agent, wherein the method comprises:

contacting an organoid co-culture with one or more candidate agents, wherein the organoid co-culture comprises immune cells and at least one organoid, detecting the presence or absence of one or more change in the organoid co-culture that is indicative of therapeutic efficacy, and identifying a candidate agent as a therapeutic agent if the presence or absence of one or more of said changes in the organoid co-culture is detected.

Also provided is an organoid co-culture obtainable or obtained by the methods of the invention.

Also provided is a tumouroid co-culture obtainable or obtained by the methods of the invention.

Also provided is a population of organoids obtainable or obtained by methods of the invention.

Also provided is a population of tumouroids obtainable or obtained by methods of the invention.

Also provided is an organoid co-culture medium suitable for use in methods of the invention. Also provided is a tumouroid co-culture medium and organoid co-culture medium suitable for use in methods of the invention. Also provided is a tumouroid or organoid in a medium comprising an interleukin, optionally where the interleukin is selected from the group consisting of IL-2, IL-7 and IL-15

The invention also provides a kit comprising a tumouroid, organoid, tumouroid co-culture or organoid co-culture of the invention.

BRIEF DESCRIPTION OF DRAWINGS

FIG. 1A. Schematic of the procedure. Biopsies of normal colon mucosa and tumour tissue are taken from resected colon and/or rectum of colorectal cancer patients. Peripheral blood is also taken during surgery. Normal colon mucosa is treated with EDTA to liberate the crypts for derivation of normal colon organoid and further digested to make a single-cell suspension containing intra-epithelial lymphocytes (IELs) for T-cell cultures. Tumour tissue is digested to make a single-cell suspension containing epithelial tumour cells for the derivation of tumouroids as well as tumour-infiltrating lymphocytes (TILs) for T-cell cultures. Peripheral blood is processed to purify peripheral blood mononuclear cells enriched for peripheral blood lymphocytes (PBLs) and T cells. Primary analysis is performed by T-cell receptor (TCR) sequencing and immunophenotyping of the T cells and single-cell messenger RNA (mRNA) sequencing of the cells present in the single-cell suspensions of normal colon epithelium and tumour epithelium. Organoid cultures are analysed using whole-genome sequencing, mRNA sequencing and peptidome profiling. The sequence shown under the DNA Sequencing heading corresponds to SEQ ID NO: 7.

FIG. 1B. Representative brightfield images of normal colon organoids and tumouroids derived from patient samples. Colonic crypts were embedded into basement membrane extract (BME) and cultured with medium containing R-spondin-1, Noggin, Wnt3A conditioned media, B27 supplement without vitamin A, nicotinamide, N-acetylcysteine, EGF, TGF-β inhibitor A-83-01, gastrin, p38 MAPK inhibitor SB202190 and prostaglandine E2. Normal colon organoids developed within 1 week and were passaged weekly thereafter (top panel). Single-cell suspensions from colorectal cancer samples were embedded into basement membrane extract (BME) and cultured with medium containing R-spondin-1, Noggin conditioned media, B27 supplement without vitamin A, nicotinamide, N-acetylcysteine, EGF, TGF-β inhibitor A-83-01, gastrin, p38 MAPK inhibitor SB202190 and prostaglandine E2. Tumoroids formed within 1 week and were passaged weekly thereafter (bottom panel).

FIG. 1C. Representative brightfield images of clonal outgrowth of intra-epithelial lymphocytes (IELs) and tumour-infiltrating lymphocytes (TILs) derived from patient samples (left panels). Flow cytometry analysis shows robust expansion of CD4+T helper (Th) cells and CD8+ cytotoxic T cells (CTLs). Single-cell suspensions from normal colon mucosa or colorectal cancer tissue were maintained in T-cell medium containing interleukin-2 (IL-2). Clonal outgrowth of T cells was noticeable within 1-2 weeks (left panels).

FIG. 1 is described further in Example 1.

FIG. 2A. Schematic of the procedure. Normal colon organoids were liberated from the BME drop using Cell Recovery Solution and washed in completed Advanced DMEM/F12. Expanded CD3+ T cells were harvested from the culture and labelled with green dye (Vybrant CFDA SE Cell Tracer). Colon organoids and labelled T cells were mixed in human colon organoid medium and embedded into BME drops. Co-cultures were maintained in human colon organoid medium containing IL-2 for 60 hours. Co-cultures were liberated from BME using Cell Recovery Solution and fixed in 4% paraformaldehyde. Fixed whole-mounts were stained with Phalloidin to mark polymerised actin and DAPI to label nuclei. Whole-mounts were mounted onto slide in ProLong Gold anti-fade mounting medium and imaged on a Leica SP8X confocal microscope.

FIG. 2B. Maximum projection of z-stack images of colon organoid co-cultures. F-actin in organoids is labelled in dark grey and T cells are labelled in light grey. Insert in the right panel shows a T cell infiltrating the colon epithelium.

FIG. 2C. Three-dimensional reconstruction of a normal colon organoid and T cells.

FIG. 2 is described further in Example 8.

FIG. 3A. Schematic of the procedure. Tumouroids were liberated from the BME drop using Cell Recovery Solution and washed in complete Advanced DMEM/F12. Allogeneic CD8+ T cells isolated from peripheral blood samples were labelled with green dye (Vybrant CFDA SE Cell Tracer). Tumouroids and T cells were mixed with human colon organoid medium containing IL-2 and either 10% BME or rat tail collagen I and live imaged for 80 hours on a Leica SP8X confocal microscope equipped with a live imaging chamber at 37° C. and 5% $CO_2$ atmosphere.

FIG. 3B. Representative composite images of the tumouroid co-cultures. Brightfield channel and green fluorescence channel were merged to generated composite images. T-cell travel paths were tracked using Imaris software.

FIG. 3C. Quantification of the track length of T cells in both conditions shows significantly longer track path of T cells co-cultured in 10% collagen compared to 10% BME.

FIG. 3 is explained in more detail in Example 10.

FIG. 4A. Schematic of the procedure. Tumouroids were dissociated into single cells using TrypLE enzymatic digestion. Single cells were stained with anti-HLA-A2 antibody and purified based on anti-HLA-A2 immunoreactivity. HLA-A2+ve and HLA-A2⁻ ve tumour cells were embedded and maintained to generate tumouroids.

FIG. 4B. Flow cytometric analysis showing establishment of pure HLA-A2+ve or HLA-A2-ve tumouroids lines. Controls are the HLA-A2+ve JY cell line as well as the normal colon organoid lines derived from the same patient samples as the HLA-A2+ve or HLA-A2⁻ ve tumouroid lines.

FIG. 4 is explained further in Example 11.

FIG. 5A. Schematic of the procedure. HLA-A2+ve or HLA-A2⁻ ve tumouroids were pulsed for 2 hours with the HLA-A2 restricted Wilms tumour 1 (WT1) peptide. TCR transgenic CD8+ T cells harbouring a WT1 peptide-specific TCR were then co-cultured for 48 hours with HLA-A2+ve or HLA-A2⁻ ve tumouroids pulsed with WT1 peptide.

FIG. 5B. Representative brightfield images of co-cultures after 48 hours showing significant death of HLA-A2+ve tumouroids pulsed with WT1 peptides only. All other conditions, i.e. HLA-A2+ve or HLA-A2⁻ ve tumouroids not pulsed with WT1 peptides and HLA-A2⁻ ve tumouroids pulsed with WT1 peptide, show normal growth.

FIG. 5 is explained in more detail in Example 12.

FIG. 6A. Schematic of the procedure. Co-culture was performed as described for FIG. 5A but only for 12 hours and incubated with and without anti-PD1 checkpoint inhibitor. Cell viability assay was performed using the CellTiter Glo Luminescent Cell Viability Assay kit (Promega) according to the manufacturer's instructions.

FIG. 6B. Cell viability of tumouroids normalised to no peptide controls.

FIG. 6 is explained in more detail in Example 13.

FIG. 7A. Schematic of the procedure. Tumouroids were liberated from the Matrigel® drop using Dispase and passed over 70 µm and 20 µm filters subsequently. Organoids were recovered from the 20 µm filter, counted and plated. Tumouroids and T cells were mixed with human colon organoid medium containing RPMI, IL-2 and 5% Matrigel® and incubated at 37° C. and 5% $CO_2$ atmosphere. After 24 hours incubation organoids were imaged using a brightfield inverted microscope.

FIG. 7B. Representative images of the tumouroid co-cultures.

FIG. 7C. Representative images of the organoid co-cultures.

FIG. 7D. Quantification IFN-γ levels of co-cultures.

FIG. 7 is explained further in Example 14.

FIG. 8A. Schematic of the procedure. Tumouroids were liberated from the Matrigel® drop using Dispase and passed over 70 µm and 20 µm filters subsequently. Organoids were recovered from the 20 µm filter, counted and plated. Cultured T cells were labelled with far-red dye (CellVue Claret). Tumouroids and T cells were mixed with human colon organoid medium containing RPMI, IL-2 and 5% Matrigel® and live imaged for 68 hours on a Leica SP8X confocal microscope equipped with a live imaging chamber at 37° C. and 5% $CO_2$ atmosphere.

FIG. 8B. Representative composite images of the tumouroid and non-targeting T cell co-cultures. Brightfield channel and far-red fluorescence channel were merged to generated composite images.

FIG. 8C. Representative composite images of the tumouroid and targeting T cell co-cultures. Brightfield channel and far-red fluorescence channel were merged to generated composite images.

FIG. 8 is described further in Example 15.

FIG. 9A. Average gene expression of different immunomodulators in normal colon and CRC organoid lines; n.s., non-significant; *, p<0.05.

FIG. 9B. Hierarchical clustering of the individual normal colon and CRC organoid lines in the 'living biobank' displaying gene expression of selected immunomodulators. Color gradients represent z valued of each row (gene transcripts).

FIG. 9C. Human colon organoid lines genetically engineered to carry one or more mutations found in CRCs. Expression levels of CD274 (PD-L1) in organoid lines (n=2) at steady state (Ctrl) and upon stimulation with 20 ng/mL recombinant human IFN-γ assessed by quantitative PCR. A, $APC^{KO/KO}$; N.D., not detected; K, $KRAS^{G12D/+}$: P, $P53^{KO/KO}$; S, $SMAD4^{KO/KO}$, WT, wild-type.

FIG. 9D. Human colon organoid lines genetically engineered to carry one or more mutations found in CRCs. Expression levels of CD274 (PD-L1) in organoid lines (n=2) at steady state (Ctrl) and upon stimulation with 20 ng/mL recombinant human IFN-γ assessed by flow cytometry. A, $APC^{KO/KO}$; N.D., not detected; K, $KRAS^{G12D/+}$: P, $P53^{KO/KO}$; S, $SMAD4^{KO/KO}$ WT, wild-type.

FIG. 11B. Flow cytometry analysis of HLA-A2 expression in cloned HLA-A2$^+$ and HLA-A2$^-$ lines.

FIG. 11C. Brightfield images of CRC organoids co-cultured with WT1 peptide-specific T-cell receptor-specific transgenic T cells for 48 hours; scale bars: 1 mm.

FIG. 11D. Images showing peptide-pulsed HLA-A2$^+$ CRC organoids at the beginning and end of co-culture with indicated peptide-specific T cells; scale bars: 70 µm.

FIG. 11E. IFN-γ production by WT1 (top) and EBV (bottom) peptide-specific T cells as measured by ELISA of supernatants collected after 18-hour co-culture with HLA-A2$^+$ CRC organoids pulsed with indicated peptides.

FIG. 11F. Live-cell imaging stills of an 18-hour co-culture experiment with EBV peptide-pulsed HLA-A2$^+$ CRC organoids co-cultured with an EBV-specific T-cell clone.

FIG. 11G. Quantification of CRC organoid killing by specific T cells. Graphs are representative of multiple repeated experiments with either EBV peptide and EBV T-cell- or WT1 peptide and WT1 T-cell co-cultures.

FIG. 11H. Representative projection image of T cells (blue) infiltrating a peptide-pulsed CRC organoid as recorded during the live-cell imaging experiments.

FIG. 11I. Quantification of killing of IFN-γ treated CRC organoids by specific T cells in either presence or absence of a blocking antibody against PD-1. Graphs are representative of multiple repeated experiments with either EBV peptide and EBV T-cell- or WT1 peptide and WT1 T-cell co-cultures.

FIG. 11J. Quantification cell viability after 18 hours co-cultures of either peptide pulsed or non-pulsed HLA-A2$^+$ organoids with antigen specific T cells. Graphs represent ratio between peptide-pulsed and non-peptide pulsed conditions.

DETAILED DESCRIPTION OF INVENTION

Definitions

Figure 1:
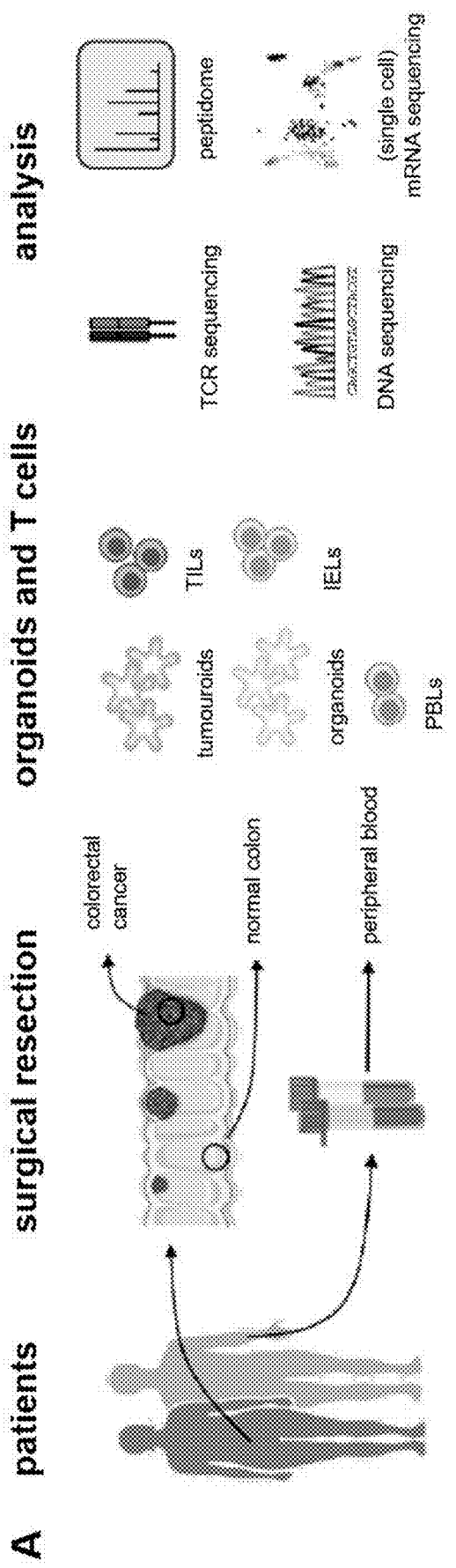
FIG. 1. Derivation of organoid, tumouroid and T cells from primary patient tissue.
Figure 1:
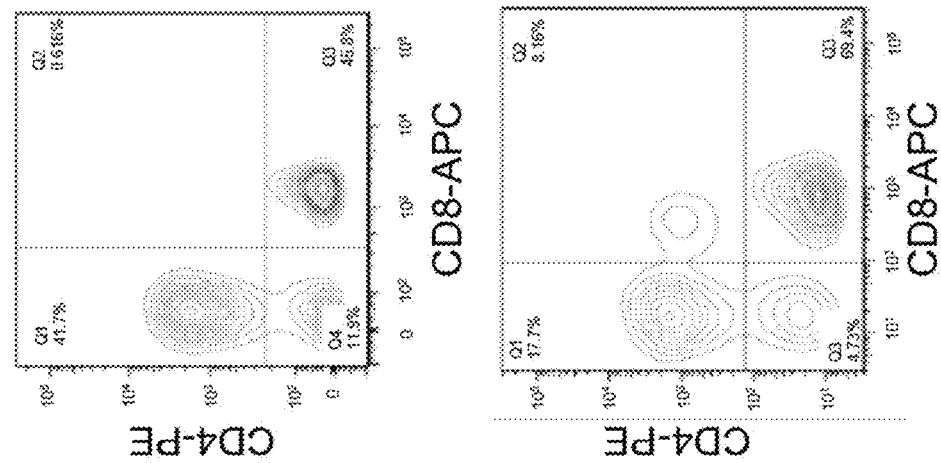
Figure 1:
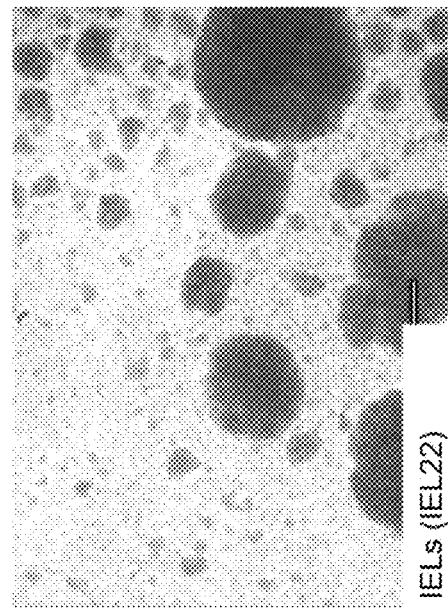
Figure 1:
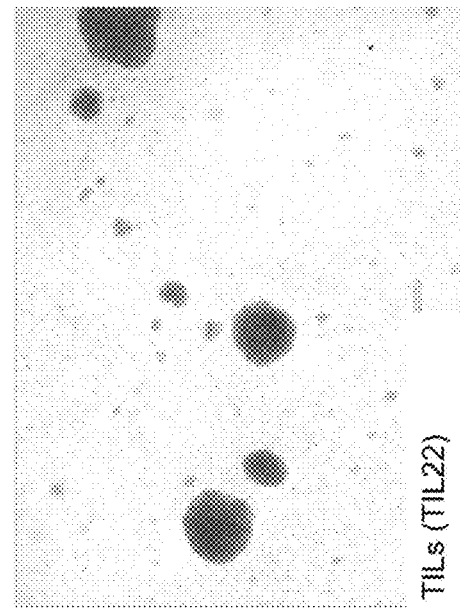
Figure 1:
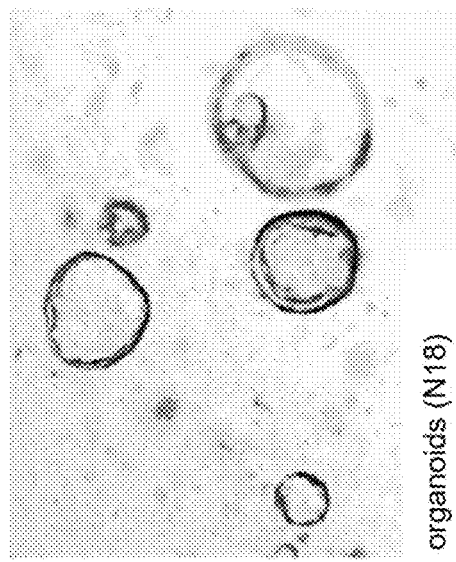
Figure 1:
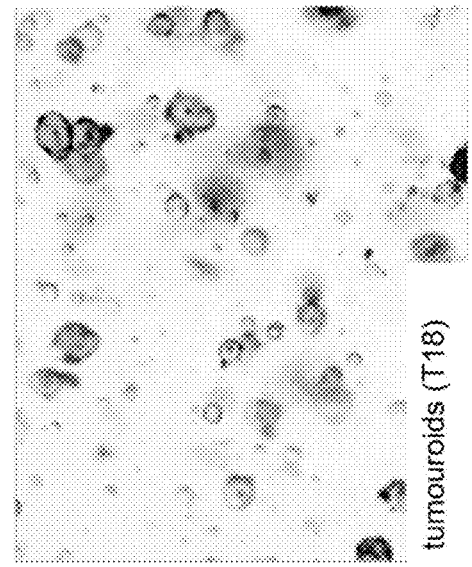

"Allogeneic" refers to entities (e.g. cells, tumouroids, co-cultures) derived from different patients. In the case of cells, this can refer to cells derived from a sample from a different patient or healthy control. Examples of suitable samples include, but are not limited to peripheral blood or tissue biopsy.

"Approximately" or "about", as used in this application, are equivalent. Any numerals used in this application with or without about/approximately are meant to cover any normal fluctuations appreciated by the person skilled in the art. As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

"Biologically active" refers to a characteristic of any agent that has activity in a biological system, and particularly in an organism. For instance, an agent that, when administered to an organism, has a biological effect on that organism, is considered to be biologically active.

"Co-culture" refers to two or more cell types maintained in conditions suitable for their mutual growth. In the context of the present disclosure, an "organoid co-culture" relates to an epithelial organoid, as defined elsewhere, in culture with a non-epithlial cell type, specifically an immune cell type. In some embodiments, cell types in co-culture exhibit a structural, biochemical and/or phenomenological association that they do not exhibit in isolation. In some embodiments, cell types in co-culture mimic the structural, biochemical and/or phenomenological association observed between the cell types in vivo.

"Comprise", "comprises" and "comprising" will be understood to imply the inclusion of a stated step or element or group of steps or elements but not the exclusion of any other step or element or group of steps or elements.

"Dose" refers to a specified quantity of a pharmaceutical agent provided in a single administration. In certain embodiments, a dose may be administered in two or more boluses, tablets, or injections. For example, in certain embodiments, where subcutaneous administration is desired, the desired dose requires a volume not easily accommodated by a single injection. In such embodiments, two or more injections may be used to achieve the desired dose. In certain embodiments, a dose may be administered in two or more injections to minimize injection site reaction in an individual. In certain embodiments, a dose is administered as a slow infusion.

"Immune disease" refers to any disorder of the immune system. Immune diseases typically have a genetic component, and include autoimmune diseases (in which the immune system erroneously acts upon 'self' components) and immune-mediated diseases (in which the immune system exhibits excessive function).

"Immunotherapy" refers to any medical intervention that induces, suppresses or enhances the immune system of a patient for the treatment of a disease. In some embodiments, immunotherapies activate a patient's innate and/or adaptive immune responses (e.g. T cells) to more effectively target and remove a pathogen or cure a disease, such as cancer or an immune disease.

"Intestine" and "intestinal" refer to the gastrointestinal tract, including the mouth, oral cavity, oesophagus, stomach, large intestine, small intestine, rectum, and anus.

"Organoid" refers to a cellular structure obtained by expansion of adult (post-embryonic) epithelial stem cells, preferably characterized by Lgr5 expression, and consisting of tissue-specific cell types that self-organize through cell sorting and spatially restricted lineage commitment (e.g. as described in Clevers, Cell. 2016 Jun. 16; 165 (7): 1586-1597, see particularly section called "Organoids derived from adult stem cells" at page 1590 onwards). In the present application, the term "organoid" may be used to refer to normal (e.g. non-tumour) organoids. Where organoids are described as "disease" organoids, this means that the organoid has a disease phenotype, e.g. typically because the organoid has been derived from one or more epithelial stem cell having a disease phenotype, or in some embodiments, because the organoid has been genetically modified to display particular characteristics of a disease phenotype.

"Population" refers to a group of entities sharing common traits. In some embodiments, "population" refers to patients sharing a set of relevant clinical traits. Preferably, a "population" may refer to a group of patients sharing the same cancer, and/or being treated with the same agent, and/or susceptible to successful treatment with the same agent. A population may differ in one or more characteristics, including genotype and/or specific agent response characteristics during treatment. A population may also refer to a group of cells, organoids, and/or co-cultures sharing one or more genotypic, phenotypic, or biochemical traits. A "sub-population" refers to a group of entities sharing a greater number of common traits, or a smaller number of dissimilar traits, than a larger population in which the entities of the sub-population are also classified.

"Safe" refers to a treatment for a disease, which has no side-effects or only has side-effects within a tolerable level according to standard clinical practice.

"Side effect" or "deleterious effect" refers to a physiological response attributable to a treatment other than desired effects.

"Subject" or "patient" or "individual" may refer to a human or any non-human animal (such as any mouse, rat, rabbit, dog, cat, cattle, swine, sheep, horse or primate). In preferred embodiments, the patient is a mammal, more preferably a human. "Human" may refer to pre- and/or post-natal forms. A subject can be a patient, which refers to a human presenting to a medical provider for diagnosis or treatment of a disease. The term "subject" is used herein interchangeably with "individual" or "patient." A patient can be afflicted with or is susceptible to a disease or disorder but may or may not display symptoms of the disease or disorder.

"Suffering from" refers to a patient who has been diagnosed with or displays one or more symptoms of a disease, disorder, and/or condition.

"Susceptible to" refers to a patient who has not been diagnosed with a disease, disorder, and/or condition. In some embodiments, a patient who is susceptible to a disease, disorder, and/or condition may not exhibit symptoms of the disease, disorder, and/or condition. In some embodiments, a patient who is susceptible to a disease, disorder, condition, or event may be characterized by one or more of the following: (1) a genetic mutation associated with development of the disease, disorder, and/or condition; (2) a genetic polymorphism associated with development of the disease, disorder, and/or condition; (3) increased and/or decreased expression and/or activity of a protein associated with the disease, disorder, and/or condition; (4) habits and/or lifestyles associated with development of the disease, disorder, condition, and/or (5) having undergone, planning to undergo, or requiring a transplant. In some embodiments, a patient who is susceptible to a disease, disorder, and/or condition will develop the disease, disorder, and/or condition. In some embodiments, a patient who is susceptible to a disease, disorder, and/or condition will not develop the disease, disorder, and/or condition.

"Therapeutically effective amount" refers to an amount of a therapeutic agent that is sufficient, when administered to a subject suffering from or susceptible to a disease, disorder, and/or condition, to treat, diagnose, prevent, and/or delay the onset of the symptom(s) of the disease, disorder, and/or condition. It will be appreciated by the skilled person that a therapeutically effective amount is typically administered via a dosing regimen comprising at least one unit dose.

"Treating", "treat", "treatment" refers to any method used to partially or completely alleviate, ameliorate, relieve, inhibit, prevent, delay onset of, reduce severity of and/or reduce incidence of one or more symptoms or features of a particular disease, disorder, and/or condition. Treatment may be administered to a subject who does not exhibit signs of a disease and/or exhibits only early signs of the disease for the purpose of decreasing the risk of developing pathology associated with the disease.

"Tumouroid" refers to an organoid comprising cells which exhibit one or more genetic, phenotypic or biochemical traits classified as cancerous. In the present application, the term "tumouroid" encompasses "organoids" derived from cancerous tissue. The term "tumouroid" may also encompass tumour progression organoids (TPOs), which are engineered tumour organoid cultures in which a normal organoid has been engineered to contain cancer mutations, for example using Cas9 technology.

Identification of Agents Suitable for Treatment

General. The invention concerns co-cultures of organoids and immune cells ('organoid co-cultures') and/or co-cultures of disease organoids (such as tumoroids) and immune cells ('disease organoid co-cultures' or more specifically 'tumouroid co-cultures'), and their use for investigating the physiology of diseases and/or the suitability of candidate agents for treating diseases. Suitability for treating a disease may comprise efficacy for treating the disease and/or safety for treating the disease. Diseases of particular interest include cancer and immune diseases.

Accordingly, the invention provides among other things a method for identifying an agent suitable for treating a cancer, wherein the method comprises:
  contacting a tumouroid co-culture with one or more candidate agents, wherein the tumouroid co-culture comprises immune cells and at least one tumouroid,
  detecting the presence or absence of one or more change in the tumouroid co-culture that is indicative of candidate agent suitability for treating the cancer, and
  identifying a candidate agent as suitable for treating the cancer if the presence or absence of one or more of said changes in the tumouroid co-culture is detected.

Also provided is a method for testing a therapeutic agent, wherein the method comprises:
  contacting a organoid co-culture with one or more candidate agents, wherein the organoid co-culture comprises immune cells and at least one organoid,
  detecting the presence or absence of one or more change in the organoid co-culture that is indicative of therapeutic efficacy, and
  identifying a candidate agent as a therapeutic agent if the presence or absence of one or more of said changes in the organoid co-culture is detected.

In some embodiments, the organoid is a disease organoid, e.g. an organoid displaying an immune disease phenotype. Owing to the presence of immune cells in the co-cultures of the invention, the co-cultures are particularly suitable for investigating the suitability of candidate immunotherapy agents.

The methods of the invention have high-throughput (HTP) capacity. In some embodiments, the methods of the invention can be performed on 96-well plates and/or on 384-well plates.

Contacting step. This may involve exposing the organoid co-culture to therapeutic levels of a known or unknown therapeutic. Typically, an agent will be dissolved in solution to a (predicted) therapeutically effective concentration, and administered to the co-culture by injection (or other appropriate administration) into a vessel in which the co-culture is maintained.

Detecting step. In some embodiments, the invention comprises a step of detecting the presence or absence of one or more changes in the tumouroid co-culture that are indicative of candidate agent suitability for treatment.

In principle, any biochemical, genetic, phenotypic or phenomenological change in the co-culture may be detected. In some embodiments, the one or more changes may be in one or more disease biomarkers, such as cancer biomarkers. In some embodiments, the one or more change may include a reduction in cell viability, a reduction in cell proliferation, an increase in cell death, a change in cell or organoid size, a change in cell motility, dissociation or disruption of the intact/compact epithelial cell layer (i.e. cells dissociate from the compact epithelial cell layer), change in production of cytokines and cytotoxic molecules by co-cultured immune cells and a change in the expression of one or more genes.

In principle, detection may be performed using any suitable laboratory method known to the skilled person. In some embodiments, detecting one or more changes can comprise a cellular proliferation assay, a viability assay, flow cytometric analysis, ELISA for IFN-γ (Interferon gamma) (as performed in e.g. FIG. 8D), analysis of gene expression and/or cellular imaging.

A reduction in cell viability may be detected by CellTiter Glo Luminescent Cell Viability Assay kit (Promega), intracellular flow cytometric staining for active Caspase 3 (BD), or positive stain for death cells. Positive strain for death cells includes non-cell membrane permeable DNA stains such as NucRed Dead 647 ReadyProb.

An increase in cell death may be detected by brightfield imaging.

Identifying step. The identifying may comprise identifying a change of a particular magnitude, and may be an automated and/or high-throughput process.

Comparing step. In some embodiments, the invention can comprise a step of comparing the organoid co-culture or tumouroid co-culture with a control, which may or may not be associated with the identifying step. This can involve comparing the presence or absence or magnitude of one or more changes of the tumouroid co-culture with a reference organoid or reference tumouroid, and may further comprise:
  contacting a reference organoid or reference tumouroid co-culture with the one or more candidate agents, wherein the reference organoid or reference tumouroid co-culture comprises immune cells and at least one organoid, and
  detecting the presence or absence of the one or more change in the reference organoid or reference tumouroid co-culture that is indicative of candidate agent suitability for treating the cancer.

In some embodiments, a candidate agent is identified as a suitable agent if the presence or absence of a change is detected in the tumouroid co-culture but not in the reference co-culture. In some embodiments, the reference organoid co-culture or reference tumouroid co-culture is used as a control, such as a negative control or a positive control.

Selecting step. In some embodiments, the method of the invention comprises a step of selecting a candidate agent as suitable for treating cancer. Selecting is distinct from identifying, as selecting may involve considerations considering the presence or absence or magnitude of the one or more changes of the provided method. For example, selecting may comprise additional considerations such as agent bioavailability, applicability to a patient sub-population, or agent delivery mechanisms, which may or may not be tested in the method.

In some embodiments, this step may be the final step of the method of the invention. In other embodiments, further steps are envisaged. For example, methods of the invention may further comprise the step of using the selected candidate agent in treatment.

Agents. Any agent may be tested according to the method of the invention. This includes any biological, chemical, physical, or other agent, or multiple agents administered concomitantly or in sequence.

The agents (or 'candidate agents') undergoing testing for the suitability of treating cancer, can be selected from one or more of the following therapeutic classes: immunotherapeutic, tumour-specific peptides, checkpoint inhibitors, alkylating agent, antimetabolite, metabolic agonist, metabolic antagonist, plant alkaloid, mitotic inhibitor, antitumour antibiotic, topoisomerase inhibitor, radiotherapeutics, chemotherapeutics, antibodies, photosensitizing agent, stem cell transplant, vaccine, cytotoxic agent, cytostatic agent, tyrosine kinase inhibitor, proteasome inhibitor, cytokine, interferon, interleukin, intercalating agent, targeted therapy agent, small-molecule drug, hormone, steroid, cellular therapeutic, viral vector, and nucleic acid therapeutic.

Preferably, the agents are tumour-specific peptides, inhibitors, or immunotherapeutics.

The agents are more preferably immunotherapeutics, for example chimeric antigen receptor (CAR)-T cell therapeutics, therapeutic TCR transgenic T cells, or neoantigens. Other agents include agents associated with antibody-dependent cell-mediated cytotoxicity (ADCC) or antibody-dependent cellular phagocytosis (ADCP).

Context. Methods of the claimed invention may be performed in vivo, ex vivo, in vitro in situ, ex situ, or any combination thereof. Preferably the methods are performed in vitro.

Personalised Medicine

General. One means of testing different regimens can be described as a 'personalised medicine' approach to testing. A personalised medicine approach can involve testing one or more candidate agents that are of known suitability for treatment, and/or identifying the one or more candidate agents as suitable agents in a particular patient.

The personalised medicine applications of the invention may require that both the tumouroid co-culture and the reference organoid co-culture or reference tumouroid co-culture are derived from the particular patient for whom the suitability of candidate agents for treating cancer is being identified.

The inventors have shown that it is possible to derive immune cells, normal (e.g. non-tumour) epithelial cells and tumour epithelial cells from a single tissue in a single patient, and to obtain organoid-immune cell co-cultures and tumouroid-immune cell co-cultures from these cells. These co-cultures provide a particularly useful model for testing individual patient response to candidate agents.

A patient for whom a candidate agent has been identified as being suitable for treating cancer, may subsequently be treated with the candidate agent so-identified.

Screening

General. Another means of testing different regimens can be described as a 'screening' approach to testing. A screening approach can involve testing one or more candidate agents that are of unknown suitability for treatment, and/or identifying a subset of the one or more candidate agents as suitable agents for treatment.

The screening applications of the invention may require that the one or more candidate agents are of known suitability for treating a first cancer and unknown suitability for treating a second cancer, with screening comprising identifying a subset of the one or more candidate agents as suitable agents for treating the second cancer.

In some embodiments, the screening approach identifies agents suitable for treating cancer at the 'population' level, rather than at the level of sub-populations. In other embodiments, the screening approach identifies agents suitable for treating cancer at the level of sub-populations. In some embodiments, the screening approach is not used to identify agents suitable for treating cancer at the level of individual patients (which is typically encompassed in a personalised medicine approach).

Cell Types and Diseases

Species. Cells, cancers, organoids and/or co-cultures of the invention or suitable for use with methods of the invention may be principally of any multicellular organism, preferably a multicellular organism susceptible to cancer. In some embodiments, the cells, cancers, organoids and/or co-cultures of the invention are mammalian (meaning derived from mammals), such as murine, primate or human cells, cancers, organoids and/or co-cultures. In a preferred embodiment, the cells, cancers, organoids and/or co-cultures of the invention are human (meaning derived from humans).

Epithelial cells. Organoids and/or organoid co-cultures of the invention are obtained from epithelial cells. Organoids and/or organoid co-cultures may be obtained from normal (i.e. non-disease) epithelial cells or from disease epithelial cells (sometimes specifically referred to as 'disease organoids' or 'disease co-cultures'). Tumouroids and/or tumouroid co-cultures of the invention are obtained from tumour epithelial cells. Any epithelial cell from which an organoid or tumouroid can be generated is suitable for use in the invention. Preferred tumour epithelial cells and/or normal epithelial cells include lung cells, liver cells, breast cells, skin cells, intestinal cells, crypt cells, rectal cells, pancreatic cells, endocrine cells, exocrine cells, ductal cells, renal cells, adrenal cells, thyroid cells, pituitary cells, parathyroid cells, prostate cells, stomach cells, oesophageal cells, ovary cells, fallopian tube cells and vaginal cells. Particularly preferred epithelial cells are intestinal cells, for example colorectal cells. The epithelial cells may be epithelial stem cells, preferably characterised by Lgr5 expression.

In some embodiments, the tumour epithelial cells and/or normal epithelial cells are obtained from a sample from a cancer patient. In a particular embodiment, tumour epithelial cells and normal epithelial cells are obtained from samples from the same cancer patient, optionally from the same sample. Suitable samples for obtaining epithelial cells include tissue biopsy, such as ascites from a colorectal or ovarian cancer patient; urine from a kidney cancer patient; or tissue biopsy from resected colon and/or rectum of colorectal cancer patient.

Immune cells. Any immune cell that can be incorporated into a co-culture is suitable for use with methods of the invention. Preferred immune cells include one or more cell types selected from the group consisting of intra-epithelial lymphocytes (IELs), tumour infiltrating lymphocytes (TILs), peripheral blood mononuclear cells (PBMCs), peripheral blood lymphocytes (PBLs), T cells, cytotoxic T lymphocytes (CTLs), B cells, NK cells, mononuclear phagocytes, α/β receptor T-cells and γ/δ receptor T cells. Preferred immune cells also include myeloid-derived suppressor cells.

The immune cells may be obtained from established cell lines available in the art (e.g. from ATCC or similar libraries of cell lines). Alternatively, the immune cells may be purified from an impure sample from a subject. There are advantages associated with obtaining the immune cells from the same patient as the tumor epithelial cells for deriving the tumouroid in the co-culture, because the resulting co-culture is thereby most representative (and so a most faithful model) of the patient from which its cells are derived. This is particularly useful in the context of personalized medicine.

An impure immune sample from which immune cells may be obtained, may include a tumour sample, normal (non-tumour) colon tissue and/or peripheral blood. In some embodiments, immune cells are obtained from a sample from a cancer patient. In some embodiments, the immune cells are obtained from a peripheral blood sample and/or a tissue biopsy. For example, peripheral blood lymphocytes (PBLs) and/or T cells may be obtained from a peripheral blood sample; or tumour-infiltrating lymphocytes (TILs) and/or intra-epithelial lymphocytes (IELs) are obtained from the tumor or healthy tissue biopsy, respectively.

Immune cells suitable for use in methods of the invention may be allogeneic with the tumouroid and/or organoid. In some embodiments, the immune cells are HLA-matched with the tumouroid and/or organoid, that is, the immune cells may be antigenically compatible with the patient from whom the tumouroid and/or organoid are derived (Shiina et al., (2016). MHC Genotyping in Human and Nonhuman Species by PCRbased Next-Generation Sequencing, Next Generation Sequencing-Advances, Applications and Challenges, Dr. Jerzy Kulski (Ed.), InTech, DOI: 10.5772/61842) (Choo, Yonsei Med J. 2007 Feb. 28; 48 (1): 11-23).

T cell engineering. An important aspect of the present invention is the use of engineered T cells, such as chimeric antigen receptor (CAR)-T cells (Sadelain et al., Nature. 2017 May 24; 545 (7655): 423-431). The invention provides methods and co-cultures which can be used for testing the suitability of different CAR-T cell types for different tumour phenotypes and tumour microenvironments. The present invention is an advantageous means of streamlining the process of CAR-T cell selection and performance augmentation, with improved scalablity and reduced cost compared to existing methods. In particular, the present invention is highly suitable for use with γδ T cells-unconventional T cells with strong anti-tumour reactivity towards a broad spectrum of tumours with diverse tissue origin (Sebestyen et al., Cell Rep. 2016 May 31; 15 (9): 1973-85). Thus in some embodiments, the immune cells in the co-culture are engineered T cells, such as CAR-T cells.

Organoid and tumouroids. Organoids may be prepared by culturing normal epithelial cells in an organoid culture medium. Tumouroids may be prepared by culturing tumour epithelial cells in a tumouroid culture medium. The normal epithelial cells may be autologous with the tumour epithelial cells (i.e. from the same patient). Organoids/tumouroids of the invention may be characterized by Lgr5 expression. In some embodiments, an organoid/tumouroid is a three-dimensional cellular structure. In some embodiments, an organoid/tumouroid comprises a lumen surrounded by epithelial cells. In some embodiments, the epithelial cells surrounding the lumen are polarized. The polarization may be disrupted in tumouroids. The epithelial cells from which organoids/tumouroids are obtained are preferably primary epithelial cells.

Cancer types. The methods of the invention are applicable to any cancer. In some embodiments, the cancer may be one or more of adenoma, adenomatous polyps, renal carcinoma, adrenal adenoma, thyroid adenoma, pituitary adenoma, parathyroid adenoma, hepatocellular adenoma, fibroadenoma, cystadenoma, bronchial adenoma, sebaceous adenoma, prostate adenoma, adenocarcinoma, cholangiocarcinoma, squamous cell cancer, ductal carcinoma, lobular carcinoma, carcinoma, adenosquamous carcinoma, anaplastic carcinoma, large cell carcinoma, small cell carcinoma, spindle cell carcinoma, sarcomatoid carcinoma, pleomorphic carcinoma, carcinosarcoma, basal cell carcinoma, VIPoma, linitis plastic, adenoid cystic carcinoma, renal cell carcinoma, mucoepidermoid carcinoma, bowel cancer, cancer of the small intestine, colon cancer, colorectal cancer, gastrointestinal cancer, oesophageal cancer, rectal cancer, vaginal cancer, pancreatic cancer, stomach cancer, ovarian cancer, cervical cancer, endometrial cancer, small cell lung carcinoma, non-small lung carcinoma, breast cancer and melanoma.

Cancers to which methods of the invention are particularly applicable include epithelial cancer, such as gastrointestinal cancer or colorectal cancer, pancreatic cancer, and breast cancer.

Cancer stages. The invention is applicable to cancer at any stage of progression. Cancer progression may be characterized in several systems. The TNM (Tumour, Node, Metastasis) system comprises three categories, each assigned a numerical degree. T refers to the size of the cancer and how far it has spread into nearby tissue—it can be 1, 2, 3 or 4, with 1 being small and 4 large. N refers to whether the cancer has spread to the lymph nodes—it can be between 0 (no lymph nodes containing cancer cells) and 3 (lots of lymph nodes containing cancer cells). M refers to whether the cancer has spread to another part of the body—it can either be 0 (the cancer hasn't spread) or 1 (the cancer has spread). A second system is the Numerical Staging System, which comprises four stages. Stage 1 usually means that a cancer is relatively small and contained within the organ it started in. Stage 2 usually means the cancer has not started to spread into surrounding tissue but the tumour is larger than in stage 1. Sometimes stage 2 means that cancer cells have spread into lymph nodes close to the tumour. This depends on the particular type of cancer. Stage 3 usually means the cancer is larger. It may have started to spread into surrounding tissues and there are cancer cells in the lymph nodes in the area. Stage 4 means the cancer has spread from where it started to another body organ. This is also called secondary or metastatic cancer. The Grading System is a third system of characterising the extent of progression of cancer. In grade I, cancer cells that resemble normal cells and aren't growing rapidly. In grade II, cancer cells that don't look like normal cells and are growing faster than normal cells. In Grade III, cancer cells that look abnormal and may grow or spread more aggressively.

Certain agents tested in methods of the invention, such as immunotherapy, are more relevant in later (metastasized) stages of cancers such as colorectal cancers, because often surgical resection is enough when no metastasis is present. Accordingly, the invention is applicable to cancer at or below one of Stage III, Grade III, or T2 N1 M1.

For other cancers that are less easy to resect surgically, immunotherapy can also be relevant at earlier stages. Further, use of the invention on tumour progression organoids (TPOs) also enables investigation of treatments for cancers at easier stages. Accordingly, the invention is applicable to cancer at or below one of Stage II, Grade II, or T2 N1 M0.

Immune diseases. In addition to cancers, diseases of immune cells may also be investigated using methods of the invention. In principle, any disorder of the immune system that affects immune cells may be investigated in co-culture. Preferred immune diseases include immune diseases of the digestive and respiratory systems, especially the intestine and lungs. Exemplary immune diseases include irritable bowel disease (IBD), ulcerative colitis (UC), chronic obstructive pulmonary disease (COPD), and asthma.

When testing immune disorders using methods of the invention, organoids may be separately cultured with diseased immune cells and immune cells from a healthy control patient.

Biopsies and sample sourcing. Organoid and/or tumouroid samples may be obtained during surgery from normal mucosa and tumour tissue, for example taken from resected colon, rectum, small intestine and/or ileum of olorectal cancer patients and/or healthy control patients. Immune cells may be derived from peripheral blood taken during surgery.

Organoids, Tumouroids and Co-Cultures

Tumouroid co-culture preparation. In one aspect, the invention provides a method for preparing a tumouroid-immune cell co-culture. The method comprises the step of mixing a tumouroid as described herein with immune cells in an in vitro culture. Mixing may comprise sequential layering of T cells and organoids to the same well in a multi-well plate, or may comprise sequential pipetting of T cells and organoids into a gel. In a preferred embodiment, the tumouroid co-culture is maintained in a co-culture medium as described herein.

In some embodiments, the method for preparing the tumouroid-immune cell co-culture further comprises one or more of the following preparation steps:

preparing the at least one tumouroid by culturing tumour epithelial cells in a tumouroid culture medium; and/or
preparing the immune cells by culturing the immune cells in an immune cell expansion medium.

In a preferred embodiment, the tumouroid culture medium (optionally including any extracellular matrix) is removed from the at least one tumouroid before mixing the at least one tumouroid with the immune cells. Extracellular matrix may be disrupted using commercially available kits, such as Cell Recovery Solution™ (Corning). An alternative matrix, such as collagen, may be used in place of the removed matrix.

In some embodiments, the method further comprises the step of obtaining the immune cells from an impure immune sample. Methods for isolating immune cells from impure immune samples are known in the art. Exemplary methods for isolating lymphocytes from single-cell suspensions and T-cell expansion cultures are described in Example 5.

The invention provides a tumouroid-immune cell co-culture obtained by the above method. The invention also provides uses of said tumouroid-immune cell co-culture in drug screening, toxicology screening, research and drug development.

The tumouroid co-culture may be ex situ, ex vivo, and/or in vitro. It is preferably in vitro.

Organoid co-culture preparation. In one aspect, the invention provides a method for preparing an organoid-immune cell co-culture. The method comprises the step of mixing an organoid as described herein with immune cells in an in vitro culture. In a preferred embodiment, the organoid co-culture is maintained in a co-culture medium as described herein.

In some embodiments, the method for preparing the organoid-immune cell co-culture comprises one or more of the following steps:

preparing the at least one organoid by culturing normal epithelial cells in an organoid culture medium; and/or
culturing the immune cells in an immune cell expansion medium.

In a preferred embodiment, the organoid culture medium (optionally including any extracellular matrix, such as basement membrane matrix 'BME' or matrigel) is removed from the at least one organoid before mixing the at least one organoid with the immune cells. Extracellular matrix may be disrupted using commercially available kits, such as Cell Recovery Solution™ (Corning). An alternative matrix, such as collagen, may be used in place of the removed matrix.

In some embodiments, the method further comprises the step of obtaining the immune cells from an impure immune sample. Methods for isolating immune cells from impure immune samples are known in the art. Exemplary methods for isolating lymphocytes from single-cell suspensions and T-cell expansion cultures are described in Example 5.

The invention also provides an organoid-immune cell co-culture obtained by the above method. The invention also provides uses of said organoid-immune cell co-culture in drug screening, toxicology screening, research and drug development.

The organoid co-culture may be ex situ, ex vivo, and/or in vitro. It is preferably in vitro.

Primary analysis. In some embodiments the methods of the invention further comprise one or more steps of primary analysis. The primary analysis of the tumouroids and/or organoids may comprise whole-genome sequenceing, mRNA sequencing, peptidome profiling and/or microscopy. Primary analysis can be used to ensure that the tumouroids and/or organoids are uniform and/or meet expectation, in a form of information discovery and/or information verification. For example, primary analysis can be used to determine mRNA transcription differences between organoids and tumouroids, and whether these differences in mRNA transcription are mirrored in differences in protein expression. The presence of specific antigens on organoids/tumouroids may also be confirmed, and whether any new antigens develop on tumouroids only. The up-regulation of immuno-inhibitory factors in the tumour microenvironment by tumour cells may also be investigated.

The immune cells may be subjected to one or more steps of primary analysis. For example, the primary analysis of the immune cells may comprise immunophenotyping and/or T-cell receptor sequencing. Primary analysis can be used to check that CAR-T cells express the necessary receptor to recognize tumour cells. Up-regulation of specific receptors recognizing the tumour may also be investigated.

In a particular embodiment, the methods of the invention comprise a step of determining HLA-type of the cells, organoids or tumouroids.

The co-cultures may also be subjected to one or more steps primary analysis. The primary analysis of the tumouroid co-culture and/or organoid co-culture may comprise imaging analysis, flow cytometric analysis, and/or cytokine secretion analysis. Primary analysis can be used to ensure that the co-cultures are uniform and/or meet expectation.

Source of tumouroids and organoids. Tumouroids and/or organoids of the invention may comprise or consist of autologous cells, i.e. cells obtained from the same patient. For example, the tumouroid may be obtained by culturing a tumour cell (e.g. a colorectal cancer cell), whereas the organoid may be obtained by culturing a normal (non-tumour) cell from the same tissue in the same patient (e.g. a normal colon cell). This can be particularly useful in the context of a reference organoid.

The invention also provides tumouroids and/or organoids in a medium comprising an interleukin, such as IL-2, IL-7 or IL-15. In some embodiments, the at least one tumouroid or at least one organoid comprises or consists of mammalian cells, preferably human cells.

Separation of tumouroids and organoids. In some embodiments, tumouroids and/or organoids are separated into populations sharing one or more genotypes, phenotypes, and/or epigenetic markers, prior to mixing with immune cells. Preferably, the genotypes, phenotypes, and/or epigenetic markers contribute to the interaction between (i) the tumouroid and/or organoid and (ii) the immune cells.

The populations separated from the tumouroid or organoid may share the presence or absence of an HLA haplotype, for example an HLA haplotype like HLA-A2.

This separating step may allow relevant patient groups and subgroups to be determined.

Media

Immune cell culture media. Immune cell culture medium may be used to prepare immune cells for co-culturing, for example, by facilitating growth and division (expansion) and/or differentiation of immune cells to produce a population suitable for co-culture.

In a preferred embodiment, the immune cell culture medium comprises an interleukin. In some embodiments the interleukin is selected from IL-2, IL-7 and IL-15. In a preferred embodiment, the interleukin in the immune cell culture medium is IL-2.

In some embodiments the concentration of the interleukin 2000-6000 IU/mL. A preferred concentration of IL-2 in the immune cell culture medium is 50 µM.

The immune cell culture medium may further comprise an RPMI medium (e.g. RPMI 1640, Gibco), optionally supplemented with penicillin/streptomycin and/or hepes and/or glutaMAX™ and/or sodium pyruvate and/or serum (e.g. 5% human AB serum, Sigma-Aldrich). In principle, any mammalian basal cell culture medium may be used in place of RPMI medium, such as DMEM/12.

Organoid and tumouroid media. Tumouroid culture media and organoid culture media may be used to prepare organoids and tumouroids for co-culture, for example, by facilitating growth, division (expansion), structural organization, or other development to produce a tumouroid and/or organoid suitable for co-culture.

Suitable tumouroid culture media and organoid culture media for different tissues are known in the art (e.g. Clevers, Cell. 2016 Jun. 16; 165 (7): 1586-1597). Preferred organoid/tumouroid culture media comprise a Wnt agonist (e.g. any one of R-spondin 1-4), a mitogenic growth factor (e.g. selected from EGF, FGF, HGF and BDNF) and a BMP inhibitor (e.g. Noggin) (e.g. as described in WO2010/090513). In some embodiments, the organoid/tumouroid culture medium further comprises a TGF-beta inhibitor (e.g. A83-01, Tocris) (e.g. as described in WO2012/168930). The addition of a TGF-beta inhibitor is particularly suitable for the culture of human cells. The TGF-beta inhibitor preferably inhibits the ALK4/5/7 signalling pathway.

In some embodiments, certain culture medium components are optional for the tumouroid culture medium, because certain tumour cells contain mutations that constitutively activate or inactivate pathways (such as the Wnt pathway) and thus remove the need to exogenous factors designed to modulate those pathways. Thus, for example, in some embodiments, the tumouroid culture medium does not comprise a Wnt agonist.

A preferred organoid culture medium, which is particularly suitable for culture of colon organoids, comprises one or more (or preferably all) of a basal medium (such as Advanced DMEM/F12 medium, Gibco) a Wnt ligand (such as Wnt-3a), a Wnt agonist (such as any one of Rspondin 1-4), a BMP inhibitor (such as Noggin), EGF, and a TGF-β inhibitor (such as A83-01, Tocris), and optionally further comprises one or more (or all) of a p38 MAPK inhibitor, gastrin, nicotinamide, prostaglandine E, N-acetylcysteine, B27 and/or an antimicrobial (such as primocin).

A preferred tumouroid culture medium, which is particularly suitable for culture colon cancer tumouroids, comprises one or more (or preferably all) of a basal medium (such as Advanced DMEM/F12 medium, Gibco) a Wnt agonist (such as any one of Rspondin 1-4), a BMP inhibitor (such as Noggin), EGF, and a TGF-β inhibitor (such as A83-01, Tocris), and optionally further comprises one or more (or all) of a p38 MAPK inhibitor, gastrin, nicotinamide, prostaglandine E, N-acetylcysteine, B27 and/or an antimicrobial (such as primocin). The tumouroid culture medium may optionally comprise a Wnt ligand (such as Wnt-3a), which is especially useful for the most sensitive colorectal tumours to immune therapy (e.g. the MSI tumours that normally lack Wnt-pathway mutations).

In some embodiments, tumouroids or organoids are cultured in immune cell expansion medium or a mixture of immune cell expansion medium and a preferred tumouroid or organoid culture medium.

The skilled person is aware of culture media specific to other types of organoid and tumouroid, and can adapt the invention for use with other organoids and tumouroids accordingly.

Co-culture media. The invention provides media (e.g. as described in the examples) for the co-culture of tumouroids and immune cells. The invention also provides media (e.g. as described in the examples) for the co-culture of organoids and immune cells. Any of the immune cell culture media or the tumouroid/organoid culture media described above may be used to as a co-culture medium to culture the immune cell-organoid/tumouroid co-culture.

Co-culture media of the invention advantageously allow the co-culture of immune cells and organoids/tumouroids. In the case of tumouroids, such co-culture is difficult or even impossible without using the media adaptations employed in the co-culture media of the invention. The inventors have observed for the first time that media for co-culture between tumouroids and immune cells benefits from a reduced Wnt component (relative to the organoid culture medium), to preserve immune cell function. This can be achieved by performing co-culture in 100% immune cell culture medium, or in a mixture between immune cell culture medium and organoid/tumouroid culture medium. The same media can be used for co-culture of organoids and immune cells, although a reduced Wnt component is not as beneficial for organoid co-culture.

Accordingly, in some embodiments, the co-culture medium comprises part immune cell culture medium (e.g. at least 10%, at least 20%, at least 30%, at least 40%, at least 50%, at least 60%, at least 70%, at least 80%, or at least 90%) and part organoid/tumouroid cell culture medium (e.g. at least 10%, at least 20%, at least 30%, at least 40%, at least 50%, at least 60%, at least 70%, at least 80%, or at least 90%). For instance, in preferred embodiments, the co-culture medium comprises about 50% immune cell culture medium and about 50% tumouroid/organoid culture medium. In some embodiments, the tumouroid culture medium is depleted of Wnt component before use in the mixture between immune cell culture medium and the organoid/tumouroid culture medium.

In some embodiments, an immune cell culture medium (such as a T cell medium, e.g. RPMI 1640 (Gibco)) is used for the co-culture medium. This culture medium is particularly useful to support maintenance of the immune cells in the co-culture, particularly for human immune cells. In some embodiments, at least 10%, at least 20%, at least 30%, at least 40%, at least 50%, at least 60%, at least 70%, at least 80%, or at least 90% of the co-culture medium consists of an immune cell culture medium.

Extracellular matrix. Cells are preferably cultured in a microenvironment that mimics at least in part a cellular niche in which said cells naturally reside. A cellular niche is in part determined by the cells and by an extracellular matrix (ECM) that is secreted by the cells in said niche. A cellular niche may be mimicked by culturing said cells in the presence of biomaterials or synthetic materials that provide interaction with cellular membrane proteins, such as integrins. An extracellular matrix as described herein is therefore any biomaterial or synthetic material or combination thereof that mimics the in vivo cellular niche, e.g. by interacting with cellular membrane proteins, such as integrins. Any suitable extracellular matrix may be used.

In a preferred method of the invention, cells are cultured in contact with an ECM. "In contact" means a physical or mechanical or chemical contact, which means that for separating said resulting organoid or population of epithelial cells from said extracellular matrix a force needs to be used. In some embodiments, the ECM is a three-dimensional matrix. In some embodiment, the cells are embedded in the ECM. In some embodiments, the cells are attached to an ECM. A culture medium of the invention may be diffused into a three-dimensional ECM.

In another embodiments, the ECM is in suspension, i.e. the cells are in contact with the ECM in a suspension system. In some embodiments, the ECM is in the suspension at a concentration of at least 1%, at least 2% or at least 3%. In some embodiments, the ECM is in the suspension at a concentration of from 1% to about 10% or from 1% to about 5%. The suspension method may have advantages for upscale methods.

One type of ECM is secreted by epithelial cells, endothelial cells, parietal endoderm like cells (e.g. Englebreth Holm Swarm Parietal Endoderm Like cells described in Hayashi et al. (2004) Matrix Biology 23:47 62) and connective tissue cells. This ECM comprises of a variety of polysaccharides, water, elastin, and glycoproteins, wherein the glycoproteins comprise collagen, entactin (nidogen), fibronectin, and laminin. Therefore, in some embodiments, the ECM for use in the methods of the invention comprises one or more of the components selected from the list: polysaccharides, elastin, and glycoproteins, e.g, wherein the glycoproteins comprise collagen, entactin (nidogen), fibronectin, and/or laminin. For example, in some embodiments, collagen is used as the ECM. Different types of ECM are known, comprising different compositions including different types of glycoproteins and/or different combination of glycoproteins.

Examples of commercially available extracellular matrices include: extracellular matrix proteins (Invitrogen) and basement membrane preparations from Engelbreth-Holm-Swarm (EHS) mouse sarcoma cells (e.g. Cultrex® Basement Membrane Extract (Trevigen, Inc.) or Matrigel™ (BD Biosciences)).

In some embodiments the ECM is a laminin-containing ECM such as Matrigel™ (BD Biosciences). In some embodiments, the ECM is Matrigel™ (BD Biosciences), which comprises laminin, entactin, and collagen IV. In some embodiments, the ECM comprises laminin, entactin, collagen IV and heparin sulphate proteoglycan (e.g. Cultrex® Basement Membrane Extract Type 2 (Trevigen, Inc.)). In some embodiments, the ECM comprises at least one glycoprotein, such as collagen and/or laminin. Mixtures of naturally-produced or synthetic ECM materials may be used, if desired. In some embodiments, the ECM is BME ('basement membrane extract'), which is a soluble form of basement membrane purified from Engelbreth-Holm-Swarm (EHS) tumor (e.g. Cultrex® BME).

In another embodiment, the ECM may be a synthetic ECM. For instance, a synthetic ECM, such as ProNectin (Sigma Z378666) may be used. In a further example, the ECM may be a plastic, e.g. a polyester, or a hydrogel. In some embodiments, a synthetic matrix may be coated with biomaterials, e.g. one or more glycoprotein, such as collagen or laminin.

A three-dimensional ECM supports culturing of three-dimensional epithelial organoids. The extracellular matrix material will normally be a drop on the bottom of the dish in which cells are suspended. Typically, when the matrix solidifies at 37° C., the medium is added and diffuses into the ECM. The cells in the medium stick to the ECM by interaction with its surface structure, for example interaction with integrins.

The culture medium and/or cells may be placed on, embedded in or mixed with the ECM.

Preferred ECM's for culturing tumouroids/organoids include BME and Matrigel.

A preferred ECM for culturing co-cultures is collagen, such as rat tail collagen I. Rat tail collagen I has been shown to improve immune cell motility during co-culture-see Example 11. The collagen may constitute at least 5%, at least 6%, at least 7%, at least 8%, at least 9% or at least 10% (v/v) of the co-culture.

Interleukin. The co-culture media may comprise an interleukin (IL), optionally wherein the interleukin or one or more of IL-2 (at a concentration of 100-200 IU/mL), IL-7 (at 10-100 ng/ml) and IL-15 (at a concentration of 10-100 ng/mL). A preferred interleukin concentration used in co-culture media is 25 µM. These concentrations for co-culture contrast with IL concentrations used in expansion, which are greater (e.g. IL-2 is used at a concentration of 2000-6000 IU/mL for immune cell expansion).

IL-2 is the preferred interleukin for use with tumour-associated immune cells. For other immune cells or diseases, such as irritable bowel syndrome (IBD) or ulcerative colitis (UC), IL-7 and/or IL-15 is preferred (Rabinowitz et al., Gastroenterology. 2013 March; 144 (3): 601-612.e1).

In some embodiments, tumouroid co-culture medium and/or organoid co-culture medium comprises a mixture of (a) the immune cell expansion medium and (b) the tumouroid culture medium or organoid culture medium, optionally wherein the media are present at a 50:50 (v/v) ratio.

Motility and protein concentration. In some embodiments, the co-culture and/or co-culture medium advantageously confer improved motility on the immune cells. Such co-cultures and/or co-culture media may comprise an extracellular matrix (ECM), as described above.

The extracellular matrix may be Matrigel or BME. In a preferred embodiment the extracellular matrix is collagen or rat tail collagen I.

The inventors showed that the greatest improvements in motility are observed using collagen, particularly rat tail collagen I. In particular, immune cells (e.g. T cells) in BME-based media exhibit an average track length of 43.635 µm, while immune cells (e.g. T cells) in rat tail collagen I-based media exhibit an average track length of 135.08 µm. This is a 3-fold increase in motility. The co-culture medium may comprise a protein concentration of at least 0.15 mg/(ml Matrigel®) to 0.95 mg/(ml Matrigel®) for a medium comprising 2% to 10% Matrigel®.

Figure 3:
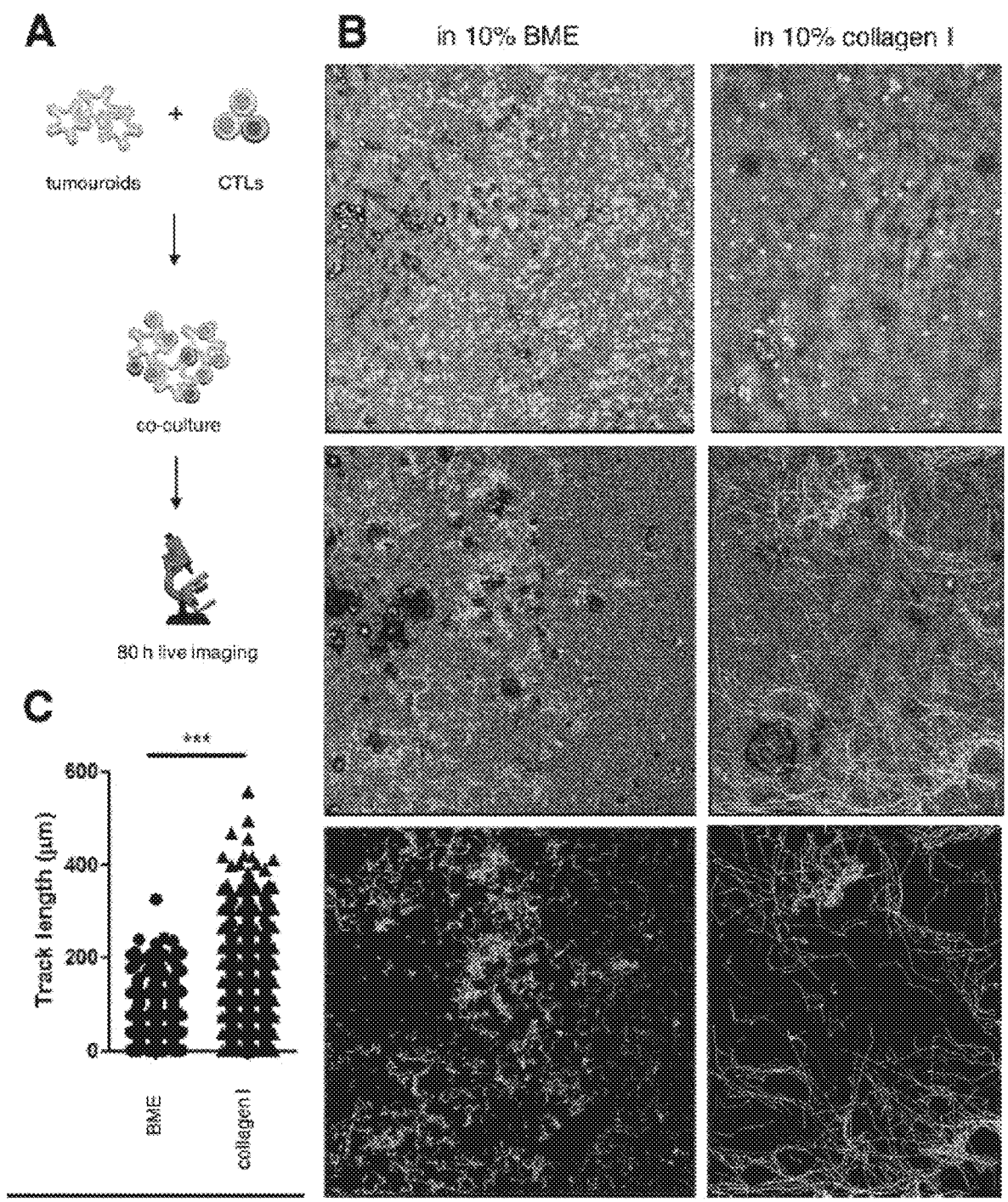
FIG. 3. Live imaging of tumouroid co-cultures to assess optimal motility of T cells.

In some embodiments, at least 20%, at least 30%, at least 40% or at least 50% of the immune cells in a co-culture are capable of moving a distance of at least 200 μM, at least 250 μM, at least 300 μM, at least 350 μM or at least 400 μM in 80 hours, as determined using the assay of FIG. 3 and Example 10.

Persistence and activity duration. In some embodiments, media of the invention allow immune cells to persist in the immune cell expansion medium for at least 4 hours, 8 hours, 24 hours, 48 hours, 72 hours, 96 hours, 120 hours, 144 hours, 168 hours, 192 hours, 216 hours or 240 hours.

In some embodiments, the media of the invention allow the immune cells to remain active for at least 4 hours, 8 hours, 12 hours, 24 hours, 48 hours or 72 hours after co-culture formation (i.e. after the point of mixing immune cells with organoid/tumouroid cells).

In some embodiments, media of the invention allow tumouroid co-cultures to persist in the tumouroid co-culture medium, or the reference organoid co-culture or reference tumouroid co-culture to persist in the organoid co-culture medium, for at least 4 hours, 8 hours, 24 hours, 48 hours, 72 hours, 96 hours, 120 hours, 144 hours, 168 hours, 192 hours, 216 hours or 240 hours. In some embodiments, the co-cultures can persist for 10 days or more, or for as many days as the co-culture can remain in culture without being passaged.

Activity of immune cells can be detected according to cellular morphology (e.g. the absence of round shape and presence of cellular projections indicates that the cells remain active).

Disclaimer. In some embodiments, IL-2 is not used in any medium of the claimed invention.

Additional Methods and Products of the Invention

Kits. The invention provides kits comprising any organoid, tumouroid, or co-culture of the invention.

In some embodiments, the kit comprises one or more of the following: syringe, alcohol swab, cotton ball, gauze pad, instructions for performing the methods of the invention.

EXAMPLES

Other features, objects, and advantages of the present invention are apparent in the examples that follow. It should be understood, however, that the examples, while indicating embodiments of the present invention, are given by way of illustration only, not limitation. Various changes and modifications within the scope of the invention will become apparent to those skilled in the art from the examples. The invention is exemplified using tumouroids as disease organoids, but it is expected that other disease organoids, particularly disease organoids relating to immune diseases, could be used in the same way. Therefore, where the disclosure refers to "tumouroids" it is intended that this could be replaced with "disease organoid", such as "immune disease organoid".

The following media are used in the Examples:

Human Colon Organoid Medium.

Completed Advanced DMEM/F12 medium (Gibco™) supplemented with 50% WNT3A conditioned medium (in-house), 20% R-spondin-1 conditioned medium (in-house), 10% Noggin conditioned medium (in-house), 1× B27 supplement (Gibco™), 1.25 mM N-acetylcysteine (Sigma-Aldrich), 10 mM nicotinamide (Sigma-Aldrich), 50 ng/ml human epidermal growth factor (EGF; Peprotech), 10 nM gastrin (Sigma-Aldrich), 500 nM TGF-β inhibitor A-83-01 (Tocris), 3 μM p38 MAPK inhibitor SB202190 (Sigma-Aldrich), 10 nM prostaglandine E2 (Tocris) and 100 mg/mL Primocin (InvivoGen).

Human Colorectal Cancer Tumouroid Medium.

Completed Advanced DMEM/F12 medium supplemented with 20% R-spondin-1 conditioned medium, 10% Noggin conditioned medium, 1× B27 supplement without vitamin A (Gibco™), 1.25 mM N-acetylcysteine, 10 mM nicotinamide, 50 ng/mL human EGF, 10 nM gastrin, 500 nM TGF-β inhibitor A-83-01, 3 μM p38 MAPK inhibitor SB202190, 10 nM prostaglandine E2 and 100 mg/mL Primocin.

Human T-Cell Medium.

RPMI1640 (Gibco™) supplemented with penicillin/streptomycin, 5% human AB serum (Sigma-Aldrich).

Ijssel's Medium.

IMDM supplemented penicillin/streptomycin, 1% human AB serum (Sigma-Aldrich), bovine serum albumin, insulin, oleic acid, linoleic acid, transferrin and ethanolamine (all Sigma-Aldrich).

In the following examples, the generation and characterisation of organoid co-cultures and tumouroid co-cultures are illustrated across Examples 1-9. Application of these methods and the co-cultures themselves is illustrated in Examples 10-15.

Example 1. Collection Normal Colon and Colorectal Cancer Biopsies from the Hospital This example shows the isolation of cell samples, which are used for preparation of organoid, tumouroid and immune cell samples in subsequent examples.

Biopsies of normal colon mucosa and tumour tissue are taken from resected colon and/or rectum of colorectal cancer patients. Peripheral blood is also taken during surgery.

Specifically, biopsies from human colorectal cancer tissue as well as normal (adult) human colon mucosa epithelium and were collected in 50 mL canonical tubes containing ice-cold 10-15 mL Advanced DMEM/F12 medium completed with Penicillin/Streptomycin (from 100× stock at 10,000 U/mL Penicillin and 10K μM/mL Streptomycin), HEPES (from 100× stock at 1M), GlutaMAX (from 100× stock; all Gibco™) and Rho kinase inhibitor Y-27632 (Sigma-Aldrich). Biopsies kept on ice and immediately processed or can be stored for up to 24 h at 4° C. until start of isolation.

The process is shown schematically in FIG. 1A.

Example 2. Isolation of Crypts from Normal Colon Tissue and Derivation of Normal Colon Organoids; Isolation of Intraepithelial T Cells from Normal Colon Tissue for T-Cell Culture This example shows the processing of normal colon samples, for the development of organoid cultures, as well as for the isolation of immune cells from normal colon samples. Normal colon mucosa is treated with EDTA to liberate the crypts for derivation of normal colon organoid, then further digested to make a single-cell suspension containing intra-epithelial lymphocytes (IELs) for T-cell cultures.

Isolation of Crypts from Normal Colon Tissue and Derivation of Normal Colon Organoids.

Muscle layer and fat using surgical scissors and forceps are removed under a dissection microscope. Cleaned tissue is cut into thin strips of approximately 1-2 mm. One strip is fixed in 4% formaldehyde (Sigma-Aldrich) for histological analysis and one strip is snap-frozen (in dry ice or liquid nitrogen) and stored at −80° C. for gene and/or protein analysis. Remaining strips were washed 3 times with fresh chelation solution (5.6 mM $Na_2HPO_4$, 8.0 mM $KH_2PO_4$, 96.2 mM NaCl, 1.6 mM KCl, 43.4 mM sucrose, and 54.9 mM D-sorbitol dissolved in sterile water; all Sigma-Aldrich). Washed strips were incubated in chelation solution completed with 2 mM ethylenediaminetetraacetic acid (EDTA; in-house) and 0.5 mM DL-dithiotreitol (DTT; Sigma-Aldrich) for 30 minutes at 4° C. in a rotating wheel (cold room). Tubes were vigorously shaken to liberate the colonic crypts out of the mesenchyme. If no crypts were visible, the incubation was repeated with fresh completed chelation solution. Tissue fragments were allowed to settle for 1-2 minutes and the supernatant containing the crypts was transferred to a new tube. 5-10 mL foetal calf serum (FCS; Sigma-Aldrich) was added and the crypts were centrifuged at 300×g for 5 minutes at 4° C. Remaining tissue fragments were kept on ice for the isolation of intraepithelial T cells. Crypts were washed 3 times in completed Advanced DMEM/F12. Crypts were resuspended in basement membrane extract (BME; Cultrex®) and plated at different densities and placed for 30 minutes into a humidified incubator at 37° C. and 5% $CO_2$. Upon BME solidification human colon organoid medium supplemented Rho kinase inhibitor Y-27632 with was added and replaced every 3-4 days. Organoids forming from the crypts were passaged every 7-10 days.

Subsequently, organoid cultures undergo primary analysis using whole-genome sequencing, mRNA sequencing and peptidome profiling.

Isolation of Intraepithelial T Cells from Normal Colon Tissue for T-Cell Culture.

Tissue fragments kept from the colon crypt isolation were placed into a Petri dish and cut into very fine pieces (<1 mm) using forceps, scissors and scalpels. Tissue fragments were transferred into a 50 mL canonical tube and washed 3 times in 20 mL RPMI 1640 medium (Gibco™) completed with 10% FCS and Penicillin/Streptomycin to remove any remaining EDTA and inhibits. Medium was removed with a pipette after the tissue pieces have sedimented to the bottom of the beaker. Tissue pieces were then incubated in 10 mL RPMI 1640 medium containing 1 mg/mL collagenase 1A, 10 U/mL DNase I (all Sigma-Aldrich) and Rho kinase inhibitor Y-27632 for 1 hour at 37° C. while shaking. 2 mL FCS were added to the cell suspension and the entire suspension was filtered through a 100-μm cell strainer. Single-cell suspension was centrifuged at 300×g for 5 minutes at 4° C. Supernatant was removed and the cell pellet was washed twice in complete RPMI 1640 medium. Single-cell suspension was either cryopreserved in liquid nitrogen in freezing medium (either Recovery™ Cell Culture Freezing Medium or 10% DMSO in a 1:1 mix of FCS and Advanced DMEM/F12, all Gibco™) or further processed for T-cell culture.

Example 3. Digestion of Colorectal Cancer Tissue for Tumour Organoid and T-Cell Cultures; Derivation of Colorectal Cancer Tumouroids This example shows the processing of cancerous colon samples, for the development of tumouroid cultures, as well as the isolation of immune cells from cancerous colon samples. Tumour tissue is digested to make a single-cell suspension containing epithelial tumour cells for the derivation of tumouroids as well as tumour-infiltrating lymphocytes (TILs) for T-cell cultures.

Digestion of Colorectal Cancer Tissue for Tumour and T-Cell Cultures.

Tumour biopsies were cut into thin strips of approximately 1-2 mm. One strip is fixed in 4% formaldehyde for histological analysis and each one strip is snap-frozen (in dry ice or liquid nitrogen) and stored at −80° C. for gene and/or protein analysis. Remaining strips were further cut using forceps until the tumour mass looked viscous. Tumour mass was incubated in 10 mL complete Advanced DMEM/F12 medium containing 1 mg/mL Collagenase II, 10 μg/mL hyaluronidase and Rho kinase inhibitor Y-27632 for 1 hour at 37° C. while shaking. After incubation, 2 mL FCS were added to the slurry tumour mass and the cell suspension was filtered through a 100-μm cell strainer and centrifuged at 300×g for 5 minutes at 4° C. Supernatant was removed and the cell pellet was washed twice in complete Advanced DMEM/F12 medium. Single-cell suspension was either cryopreserved in liquid nitrogen in freezing medium (either Gibco™ Recovery™ Cell Culture Freezing Medium or 10% DMSO in a 1:1 mix of FCS and Advanced DMEM/F12) or further processed for the derivation of colorectal cancer tumouroids and T-cell culture.

Derivation of Colorectal Cancer Tumouroids.

A fraction of the tumour single-cell suspension was resuspended in BME and plated at different dilutions. BME was led to solidify for 30 minutes in a humidified incubator at 37° C. and 5% $CO_2$. Cells embedded in BME were cultured in human colorectal cancer tumouroid medium supplemented with Rho kinase inhibitor Y-27632. Medium was refreshed every 3-4 days. Organoids forming from the single tumour cell were passaged every 7-10 days.

Example 4. Analysis of Organoids and Tumouroids

Brightfield light microscopy was performed for analysis, and confirmed successful single-cell suspension of the organiud and tumouroid samples. Representative brightfield images of normal colon organoids and tumouroids derived from patient samples are shown in FIG. 1B. As described above, colonic crypts were embedded into normal colon organoid medium (basement membrane extract (BME) and cultured with medium containing R-spondin-1, Noggin, Wnt3A conditioned media, B27 supplement without vitamin A, nicotinamide, N-acetylcysteine, EGF, TGF-β inhibitor A-83-01, gastrin, p38 MAPK inhibitor SB202190 and prostaglandine E2). Normal colon organoids developed within 1 week and were passaged weekly thereafter (top panel).

Single-cell suspensions from colorectal cancer samples were embedded into basement membrane extract (BME) and cultured with medium containing tumouroid medium (R-spondin-1, Noggin conditioned media, B27 supplement without vitamin A, nicotinamide, N-acetylcysteine, EGF, TGF-β inhibitor A-83-01, gastrin, p38 MAPK inhibitor SB202190 and prostaglandine E2). Tumouroids formed within 1 week and were passaged weekly thereafter (bottom panel).

As can be seen in each panel of FIG. 1B, single-cell suspension of well-resolved organoid, tumouroid and immune cells is achieved.

Example 5. Isolation of Lymphocytes from Single-Cell Suspensions and T-Cell Expansion Cultures This example shows the further processing of immune cells, followed by generation of immune cell expansion cultures.

5 mL of pure Ficoll-Paque PLUS (GE Healthcare) were added to 15 mL canonical tubes. Single-cell suspensions obtained from digestions of normal colon or colorectal cancer tissue were resuspended in 5 mL complete RPMI 1640 medium and carefully placed on top of the clear Ficoll-Paque PLUS layer. Samples were centrifuged at 800×g for 20 minutes at room temperature. Cells from the layer above the clear Ficoll-Paque PLUS layer containing T cells were collected, resuspended in 10 mL complete RPMI 1640 medium and centrifuged at 300×g for 5 minutes. Cell pellet was resuspended in complete RPMI 1640 medium and counted. Single-cell suspension was either cryopreserved in liquid nitrogen in freezing medium (either Gibco™ Recovery™ Cell Culture Freezing Medium or 10% DMSO in a 1:1 mix of FCS and Advanced DMEM/F12) or immediately used for expansion cultures. For T-cell expansion cultures, lymphocytes were cultured on anti-CD28 (Miltenyi)-coated cell culture plastic at a concentration of $1 \times 10^6$ total viable cells in 1 mL RPMI 1640 medium completed with Penicillin/Streptomycin, 5% human AB serum and 6000 IU recombinant human IL-2 (Miltenyi) in a humidified incubator at 37° C. and 5% $CO_2$. Medium was refreshed after 1 week.

In addition or alternatively, peripheral blood is processed to purify peripheral blood mononuclear cells enriched for peripheral blood lymphocytes (PBLs) and T cells.

Primary analysis is performed by T-cell receptor (TCR) sequencing and immunophenotyping of the T cells (cf. FIG. 1C and Example 6 below).

Example 6. Analysis of Isolated Immune Cells

FIG. 1C shows representative brightfield images of clonal outgrowth of intra-epithelial lymphocytes (IELs) and tumour-infiltrating lymphocytes (TILs) derived from patient samples (left panels).

Flow cytometry analysis shows robust expansion of $CD4^+$ T helper (Th) cells and $CD8^+$ cytotoxic T cells (CTLs). Single-cell suspensions from normal colon mucosa or colorectal cancer tissue were maintained in T-cell medium containing interleukin-2 (IL-2). Clonal outgrowth of T cells was noticeable within 1-2 weeks (left panels).

Accordingly, analysis of isolated immune cells reveals that the immune cells remain functional and biologically representative.

Example 7. Passaging of Epithelial Organoids and Tumouroids

This example demonstrates the maintenance of organoid and tumouroids cultures.

Organoid cultures were disrupted ('split') by pipetting BME drops up and down the growth medium using a 1 mL volume micropipette (i.e. P1000 Gilson). Disrupted organoids were centrifuged at 500×g for 5 minutes. Pelleted organoids were resuspended in TrypLE (Gibco™) and incubated for 5-15 minutes at 37° C. in a water bath. Organoids were dissociated into single cells using pre-wetted flame-polished glass Pasteur pipettes. Dissociated organoids were taken up in an excess of complete Advanced DMEM/F12 and centrifuged at 500×g for 5 minutes. Epithelial single cells were re-plated in BME at a desired density and placed in humidified incubator at 37° C. and 5% $CO_2$. Upon BME solidification, respective culture medium (either human colon organoid medium or human colorectal cancer tumouroid medium) supplemented with Rho kinase inhibitor Y-27632 was added. Medium was refreshed every 3-4 days. Organoids forming from the single tumour cell were passaged every 7-10 days.

Primary analysis is performed by single-cell messenger RNA (mRNA) sequencing of the cells present in the single-cell suspensions of normal colon epithelium and tumour epithelium.

Example 8. Generation of Organoid Co-Cultures and Tumouroid Co-Cultures

This example demonstrates the co-culture of organoids and tumouroids from Example 5 with immune cell cultures from Example 4.

Upon splitting, (as in Example 7 above), 5000 cells were plated in BME and cultured for 3-4 days in either human colon medium or human colorectal cancer tumouroid medium. Upon culture, medium was removed and BME/Matrigel® drops were disrupted using Cell Recovery Solution™ (Corning) following 25 minutes incubation on ice. Cells are subsequently centrifuged (5 minutes at 500×g) and re-suspended in T-cell medium supplemented with 100 IU/mL recombinant human IL-2 prior to mixing with T cells.

T cells were counted and brought to a concentration of 100000 cells/mL in complete T-cell medium supplemented with 100 IU/mL recombinant human IL-2. 100 μL epithelial cancer tumouroid suspension was mixed with 100 μL T cell suspension in a 96 well plate. 22 μL rat tail collagen (Gibco™) was dissolved in the mix to reach a concentration of 10% collagen in the suspension. The cells were rested at 37° C. and 5% $CO_2$ for 30 minutes to let the cells and collagen settle prior to analysis.

Figure 2:
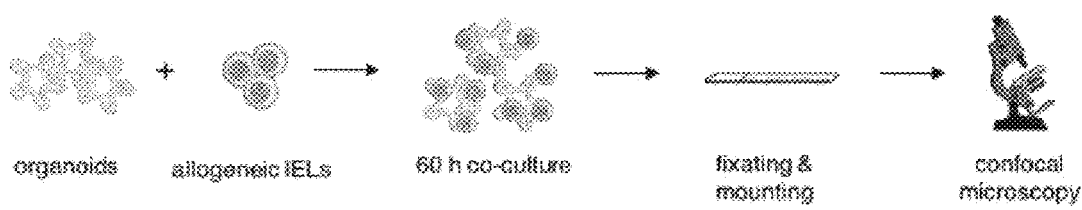
FIG. 2. Proof-of-principle co-culture of normal colon organoids and allogeneic CD3+ T cells in drops of basement membrane extract (BME).
Figure 2:
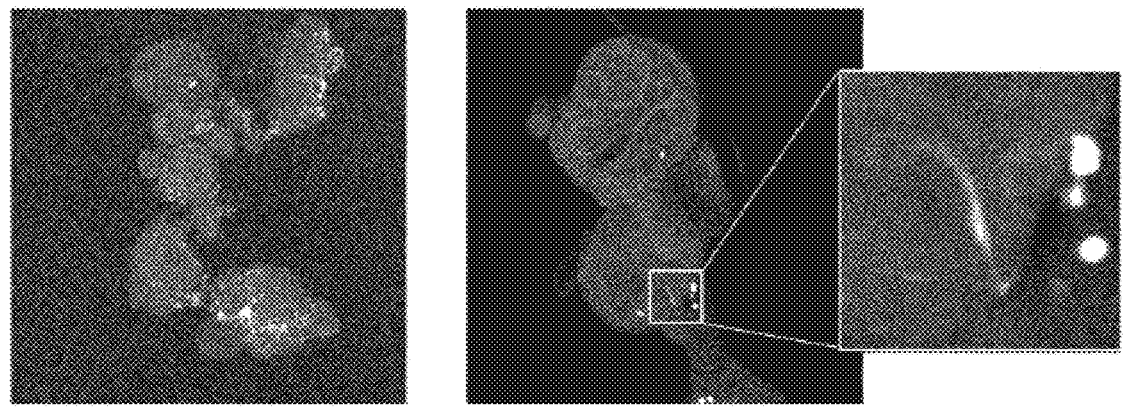
Figure 2:
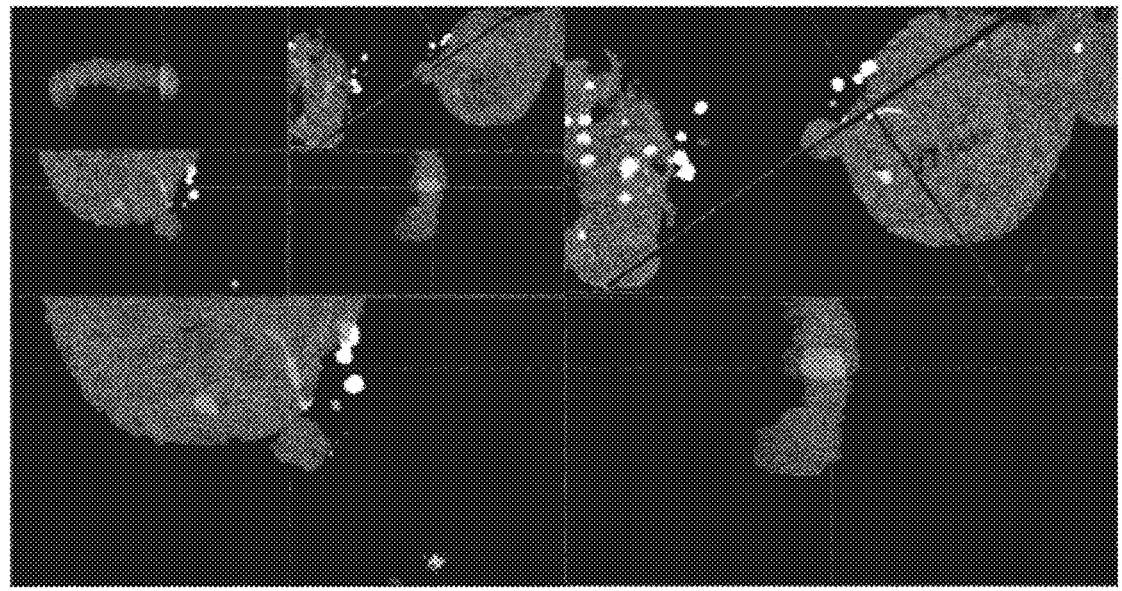

A proof-of-principle co-culture of normal colon organoids and allogeneic $CD3^+$ T cells in drops of basement membrane extract (BME) is shown in FIG. 2.

FIG. 2A shows a schematic of the procedure. As described above, normal colon organoids were liberated from the BME drop using Cell Recovery Solution and washed in completed Advanced DMEM/F12. Expanded $CD3^+$ T cells were harvested from the culture and labelled with green dye (Vybrant CFDA SE Cell Tracer). Colon organoids and labelled T cells were mixed in human colon organoid medium and embedded into BME drop. Co-cultures were maintained in human colon organoid medium containing IL-2 for 60 h. Co-cultures were liberated from BME using Cell Recovery Solution and fixed in 4% paraformaldehyde. Fixed whole-mounts were stained with Phalloidin to mark polymerised actin and DAPI to label nuclei. Whole-mounts were mounted onto slide in ProLong Gold anti-fade mounting medium and imaged on a Leica SP8X confocal microscope.

Maximum projection of z-stack images of colon organoid co-cultures is shown in FIG. 2B. F-actin in organoids is labelled in dark grey and T cells are labelled in light grey. Insert in the right panel shows a T cell infiltrating the colon epithelium.

A three-dimensional reconstruction of a normal colon organoid and T cells is shown in FIG. 2C.

As seen in the Figure, the organoid shows the expected level of structural organization, and interacts with immune cells with noticeable similarity to an in vivo system.

Example 9. Analysis of Co-Cultures by Imaging, Flow Cytometry, and Cytokine Secretion This example analyses organoid co-cultures and tumouroid co-cultures produced in Example 6, to investigate the mechanisms by which the co-culture components are interacting.

Imaging Analysis.

Imaging analysis is used to determine the percentage of dying cells in the co-cultures.

Prior to culture, T cells were labelled with cell-tracker dye (e.g. CFSE, Molecular Probes™). Organoids were labelled with directly conjugated mouse anti-human EPCAM (BD Bioscience) antibodies or cell-tracker dye (with different than the one for T-cell labelling). Cells were imaged overnight (12-18 hours) at 37° C. and 5% $CO_2$ using a confocal laser-scanning microscope (e.g. Leica SP8X; or any type of live cell imaging time lapse fluorescence microscope) in the presence of a dye for marking apoptotic cells (e.g. NucRed Dead™, Molecular Probes). Subsequently, time-lapse images were analysed using Imaris software (Bitplane) and percentage of dying organoids was calculated by assessing the percentage of voxels were co-localization of the EPCAM and dead cell marker can be visualized.

Flow Cytometric Analysis

Flow cytometric analysis is used to assess the surface markers present on immune cells present in the co-cultures.

Upon splitting (as in Example 7 above), 5000 cells were plated in BME and cultured for 3, 4 days in either human colon medium or human colorectal cancer tumouroid medium. Upon culture, medium was removed and BME/Matrigel® drops were disrupted using Cell Recovery Solution™ (Corning) following 25 minutes incubation on ice. Cells are subsequently centrifuged (5 minutes at 500×g) and re-suspended in T-cell medium supplemented with 100 IU/mL recombinant human IL-2 prior to mixing with T cells.

T cells were counted and brought to a concentration of 500000/mL in complete T-cell medium supplemented with 100 IU/mL recombinant human IL-2. 100 µL epithelial cancer tumouroid suspension was mixed with 100 µL T cell suspension in a 96 well plate. Cells were co-cultured overnight harvested, and single cell suspensions were made using TripLE (Gibco™). Single-cell suspensions were fixed with 4% paraformaldehyde (Sigma-Aldrich) and permeabilised using a buffer containing 0.5% saponin (BD Bioscience). Alternatively, commercially available kits (e.g. BD Cytofix/Cytoperm Plus Fixation/Permeabilization Kit, BD Bioscience) were used. Cells were subsequently incubated with flow cytometry antibodies against CD3, EPCAM, interferon (IFN)γ and/or tumour-necrosis factor (TNF) a, along with an antibody recognizing active Caspase-3 (all BD Bioscience) followed by flow cytometric analysis.

Cytokine Secretion Analysis.

Organoids were split, plated, cultured and prepared for co-culture as described above. T cells were counted and brought to a concentration of 500000/mL in complete T-cell medium supplemented with 100 IU/mL recombinant human IL-2. 100 µL epithelial cancer tumouroid suspension was mixed with 100 µL T cell suspension in a 96 well plate. 72 h after start of culture supernatant was harvested for assessment of T-cell cytokine production (e.g. IFNγ, TNFα) by ELISA. Culture supernatant was stored at -20° C. until analysis.

Example 10. Live Imaging of Tumouroid Co-Culture Shows Increased Motility of T Cells when Co-Cultures are Made with Rat Tail Collagen I This example tests the effect of different structural components used in developing co-cultures, on the motility of immune cells that result.

A schematic of the procedure is shown in FIG. 3A. As described above, tumouroids were liberated from the BME drop using Cell Recovery Solution and washed in complete Advanced DMEM/F12. Allogeneic $CD8^+$ T cells isolated from peripheral blood samples were labelled with green dye (Vybrant CFDA SE Cell Tracer).

Tumouroids and T cells were mixed with human colon organoid medium containing IL-2 and either 10% BME or rat tail collagen I and live imaged for 80 h on a Leica SP8X confocal microscope equipped with a live imaging chamber at 37° C. and 5% $CO_2$ atmosphere. FIG. 3B shows representative composite images of the tumouroid co-cultures. Brightfield channel and green fluorescence channel were merged to generated composite images. T cell travel path were tracked using Imaris software.

Quantification of the track length of T cells in both conditions, as graphed in FIG. 3C, shows significantly longer track path of T cells co-cultured in 10% collagen compared to 10% BME. The results suggest that a more in vivo-like system can be developed by using rat tail collagen I in co-culture, which produces longer tracks and so preserves immune cell motility.

Example 11: Generation of Clonal Tumouroid Co-Cultures

This example illustrates generation of clonal tumouroids positive and negative for human leukocyte antigen (HLA) A2 type.

Figure 4:
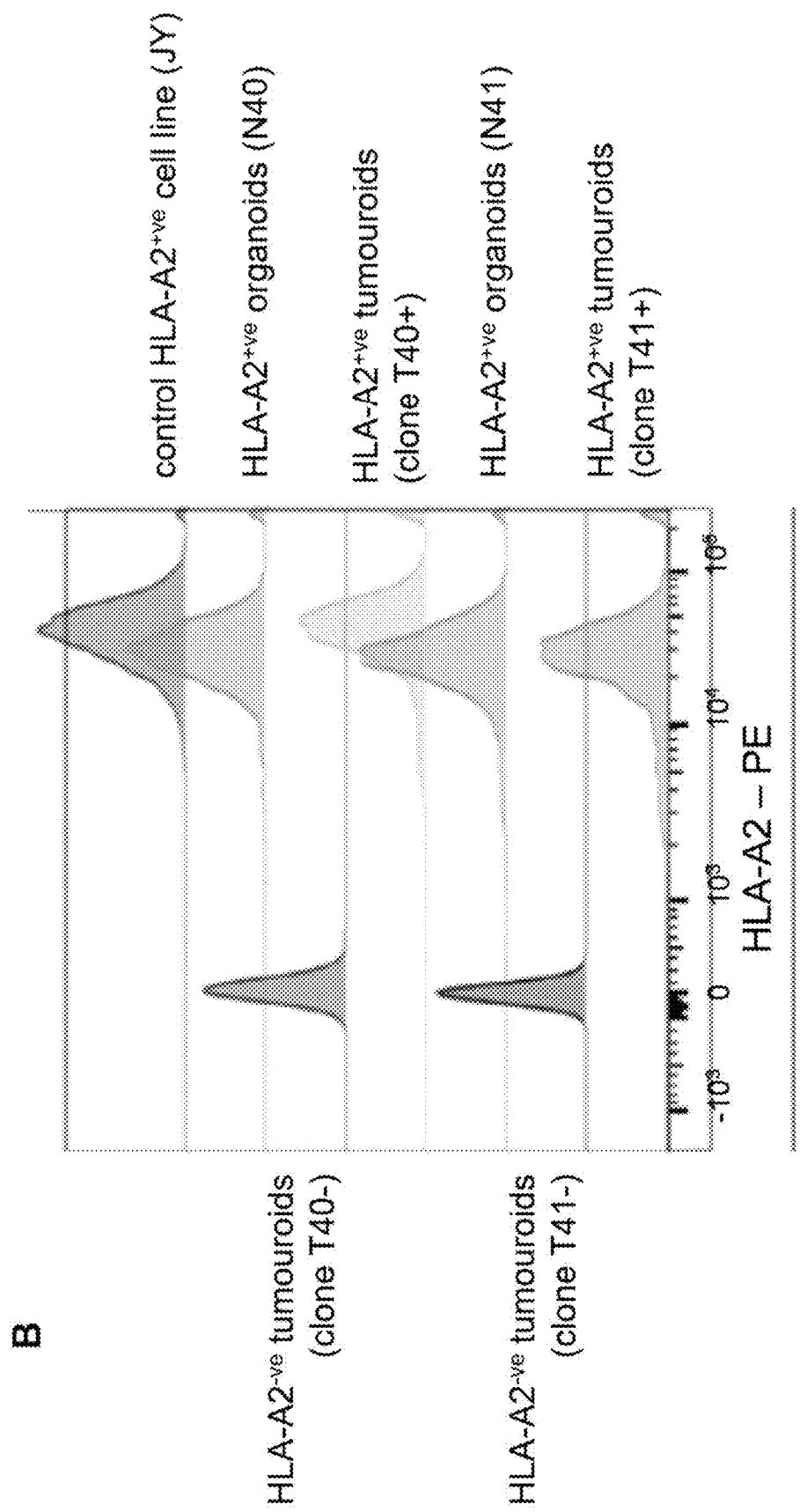
FIG. 4. Generation of clonal tumouroids positive and negative for human leukocyte antigen (HLA) A2 type.

A schematic of the procedure is shown in FIG. 4A. Tumouroids were dissociated into single cells using TrypLE enzymatic digestion. Single cells were stained with anti-HLA-A2 antibody and purified based on anti-HLA-A2 immunoreactivity. HLA-A2$^+$ve and HLA-A2$^-$ ve tumour cells were embedded and maintained to generate tumouroids.

Flow cytometric analysis in FIG. 4B showed establishment of pure HLA-A2$^+$ve or HLA-A2-ve tumouroids lines. Controls are the HLA-A2$^+$ve JY cell line as well as the normal colon organoid lines derived from the same patient samples as the HLA-A2$^+$ve or HLA-A2$^-$ ve tumouroid lines.

Example 12. Assay for Cytotoxic T-Cell Mediated Antigen-Specific Killing of Epithelial Cancer Tumouroids This example involves performing a 'cell killing assay' on a tumouroid co-culture. This is an example of the method of the invention applied to neoantigen-experienced αβ T cells for treating cancer.

Colorectal cancer tumouroids or normal tissue organoids were split and kept as single cells as described above. 10000-50000 T cells (TILs or PBMC derived) were co-cultured with 50000 tumouroid/organoid derived single cells in the presence of stimulating αCD28 antibodies for 2 weeks in human T-cell medium and 200 IU/mL recombinant human IL-2. Medium was refreshed every 2-3 days. Expanded cells were subsequently clonally expanded in the presence of irradiated feeder cells ($1×10^6$/mL, mix of PBMCs from 3 different donors and $1×10^5$/mL JY and/or LAZ509 cells) in complete Ijssel's medium supplemented with 200 IU/mL recombinant human IL-2. Alternatively, T cells were FACS sorted directly from the TIL or IEL single cell prep into plates containing ($1×10^6$/mL, mix of PBMCs from 3 different donors and $1×10^5$/mL JY and/or LAZ509 cells) in complete Ijssel's medium. Expanded clones were then subsequently co-cultured with neoantigen-pulsed tumour organoids as described above.

Identified putative tumour neoantigens were loaded onto epithelial cancer organoids as follows. BME/Matrigel® drops in which organoids were cultured were disrupted by re-suspending the medium in the plates. Relevant peptides were added to the organoids and organoids were cultured for 2 h at 37° C. and 5% $CO_2$. Clonally expanded T cells were then co-cultured with autologous organoids for imaging, flow cytometric analysis and/or cytokine secretion analysis as described above.

Figure 5:
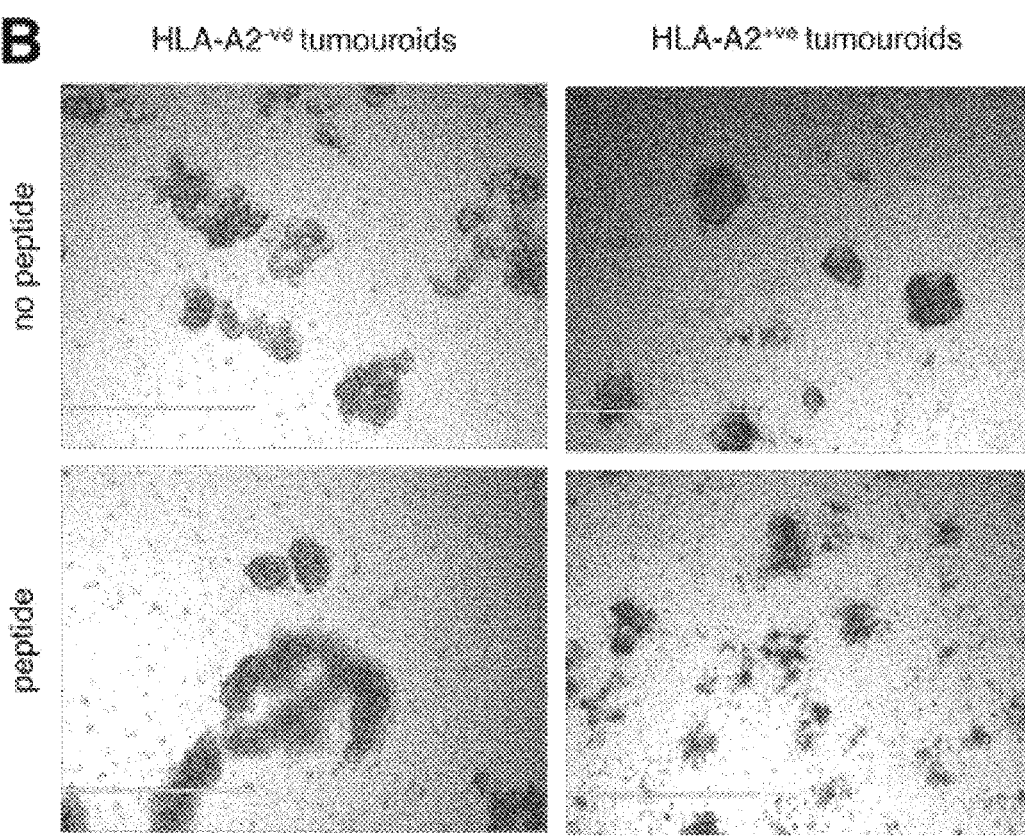
FIG. 5. Killing assay for anti-tumouroid reactivity of antigen-experienced T cells.

A killing assay for anti-tumouroid reactivity of antigen-experienced T cells is shown in FIG. 5, and a schematic of the procedure is shown in FIG. 5A. HLA-A2$^+$ve or HLA-A2$^-$ve tumouroids were pulsed for 2 h with the HLA-A2 restricted Wilms tumour (WT) 1 peptide. TCR transgenic CD8$^+$ T cells harbouring a WT1 peptide-specific TCR were then co-cultured for 48 h with HLA-A2$^+$ve or HLA-A2$^-$ve tumouroids pulsed with WT1 peptide.

Representative brightfield images of co-cultures after 48 h are shown in FIG. 5B.

Significant death is observed for HLA-A2$^+$ve tumouroids pulsed with WT1 peptides only. All other conditions, i.e. HLA-A2$^+$ve or HLA-A2$^-$ve tumouroids not pulsed with WT1 peptides and HLA-A2$^-$ve tumouroids pulsed with WT1 peptide, show normal growth. The results suggest that the neoantigen WT1 peptide is effective in killing tumouroids (and possibly in treating cancers) with a HLA-A2$^+$ve pheontypes, but not for other phenotypes.

Figure 6:
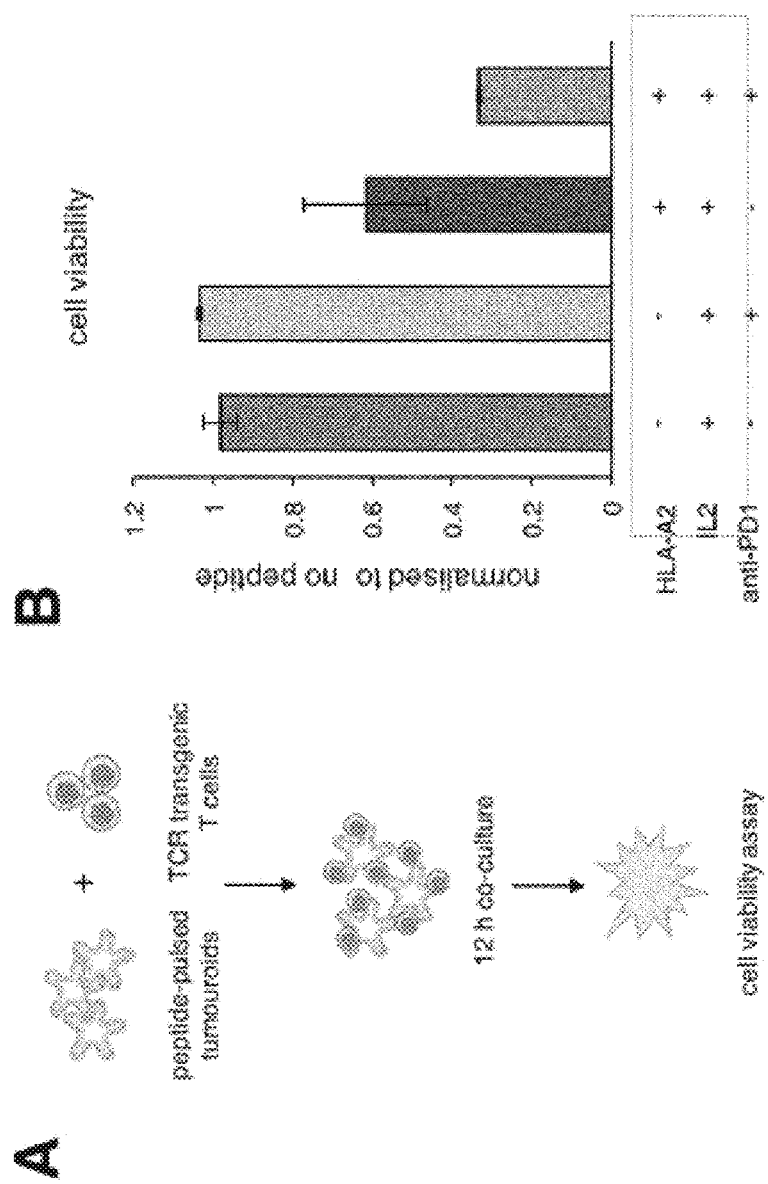
FIG. 6. Cell viability assay for anti-tumouroid reactivity of antigen-experienced T cells with and without checkpoint inhibition.

Example 13. Cell Viability Assay for Anti-Tumouroid Reactivity of Antigen-Experienced T Cells with and without Checkpoint Inhibition A cell viability assay for anti-tumouroid reactivity of antigen-experienced αβ T cells with and without checkpoint inhibition is shown in FIG. 6. This is an example of the method of the invention applied to a chemical agent for treating cancer.

A Schematic of the procedure is shown in FIG. 6A. Co-culture was performed as described in FIG. 5A but only for 12 h and incubated with and without anti-PD1 checkpoint inhibitor. Cell viability assay was performed using the CellTiter Glo Luminescent Cell Viability Assay kit (Promega) according to the manufacturer's instructions.

FIG. 5B shows the cell viability of tumouroids normalised to no peptide controls. The co-cultures were therefore successfully used to show that cell viability of tumouroids was lowest when a combination of HLA-A2, IL-2 and anti-PD1 checkpoint inhibitor were present, i.e. that anti-PD1 checkpoint inhibitor treatment may be most potent when applied to patient sub-populations exhibiting IL-2 and HLA-A2 cancer types.

Example 14. Assay to Determine Differential Effect on Activation of T Cells by Organoid/Tumouroid Co-Cultures This example illustrates that the presence of γδ T cells activates tumouroids in co-culture in an antigen-non-specific manner, where it does not activate organoids in co-culture beyond a baseline of no T cells. IFN-γ was used to determine activation.

Figure 7:
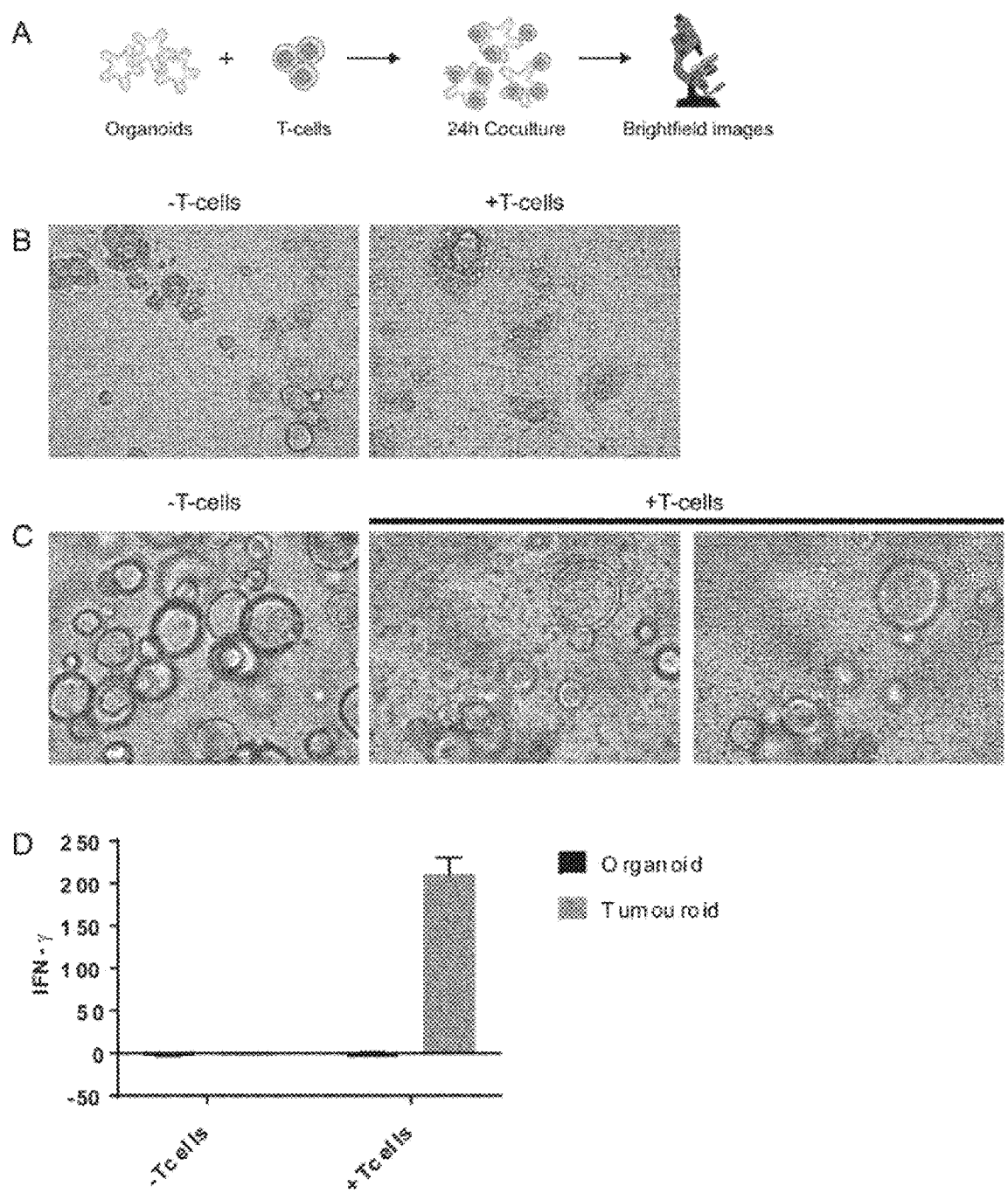
FIG. 7. Assay to determine differential effect on activation of T-cells by organoid/tumouroid co-cultures.

A schematic of the procedure is shown in FIG. 7A. Tumouroids were liberated from the Matrigel® drop using Dispase and passed over 70 μm and 20 μm filters subsequently. Organoids were recovered from the 20 μm filter, counted and plated. Tumouroids and T-cells were mixed with human colon organoid medium containing RPMI, IL-2 and 5% Matrigel® and incubated at 37° C. and 5% $CO_2$ atmosphere. After 24 h incubation organoids were imaged using a brightfield inverted microscope.

Representative brightfield images of the tumouroid co-cultures and organoid co-cultures are shown in FIGS. 7B and 7C (respectively).

Quantification IFN-γ levels of the co-cultures is shown in FIG. 7D.

Example 15. Live Imaging of Tumouroid Co-Cultures to Assess Association and Cell Killing Ability T cells were investigated for their cell killing ability, and its variation with different T cell subtypes and for different T-cell/tumour antigen combinations.

Figure 8:
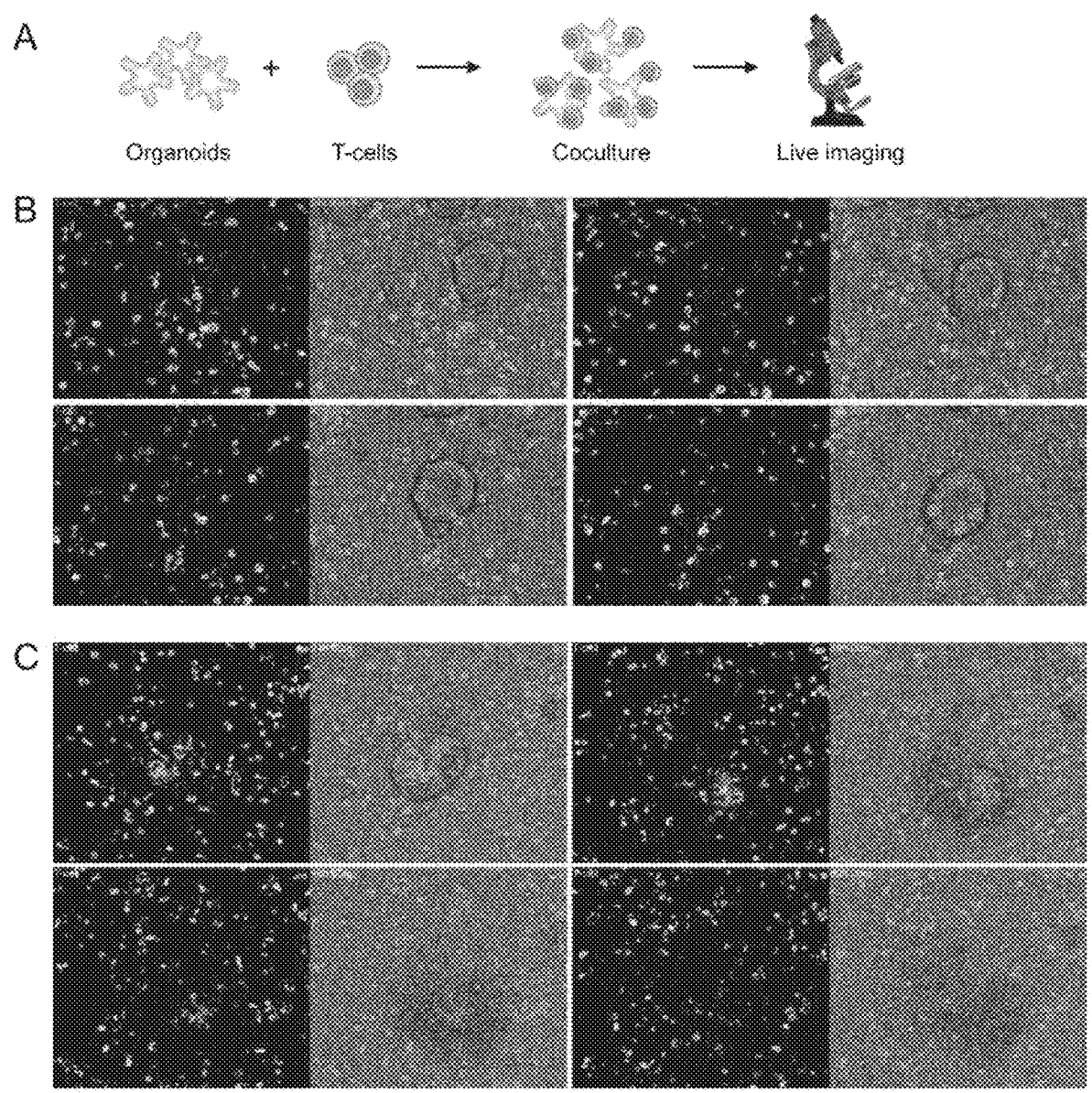
FIG. 8. Live imaging of tumouroid co-cultures to assess association and cell-killing ability.

A schematic of the procedure is shown in FIG. 8A. Tumouroids were liberated from the Matrigel® drop using Dispase and passed over 70 μm and 20 μm filters subsequently. Organoids were recovered from the 20 μm filter, counted and plated. Cultured T-cells labelled with far-red dye (CellVue Claret). Tumouroids and T-cells were mixed with human colon organoid medium containing RPMI, IL-2 and 5% Matrigel® and live imaged for 68 h on a Leica SP8X confocal microscope equipped with a live imaging chamber at 37° C. and 5% $CO_2$ atmosphere.

Representative composite images of the tumouroid co-cultures containing non-targeting T cells are shown in FIG. 8B. Brightfield channel and far-red fluorescence channel were merged to generated composite images.

Representative composite images of the tumouroids co-cultures containing targeting T cells are are shown in FIG. 8C. Brightfield channel and far-red fluorescence channel were merged to generated composite images.

Example 16. Modelling Cancer Immunomodulation Using Epithelial Organoid Cultures Here we utilize organoid technology to study immune-cancer interactions and assess immunomodulation by colorectal cancer (CRC). Transcriptional profiling and flow cytometry revealed that organoids maintain differential expression of immunomodulatory molecules present in primary tumours. Finally, we established a method to model antigen-specific epithelial cell killing and cancer immunomodulation in vitro using CRC organoids co-cultured with cytotoxic T cells (CTLs).

CRC is among the most common cancers worldwide. While early CRC stages are highly treatable by surgical removal, later stages are usually incurable. CRC arises through a multi-step process from small lesions of the epithelium of the large intestine. These lesions grow into adenomas with low grade dysplasia that progress into high grade dysplasia, eventually giving rise to infiltrating carcinomas. Genetic mutations in signalling pathways such as the canonical Wnt signalling pathway are the molecular basis of CRC4. However, the interaction of the tumour with its microenvironment is another critical hallmark. Cancer cells remodel their microenvironment (e.g. fibroblasts, the vasculature and immune cells) to support tumour growth. Infiltrating immune cells (ICs) such as CTLs or macrophages play a crucial role by generating different immune responses such as anti-tumour cytotoxicity (the former) or tumour-promoting chronic inflammation (the latter). As such, escape from the surveilling immune system has been recognised as one of the hallmarks of cancer. Cancer cells undergo a process called immunoediting and silence antitumour responses, for example, by preventing T-cell activation through stimulation of inhibitory cell surface receptors such as CTL-associated antigen (CTLA)-4 or programmed death (PD) 1. Overcoming this active immunomodulation by tumour cells has become a major therapeutic target. However, tumour heterogeneity, such as differential CTL infiltration or differential expression of immune inhibiting factors, could influence therapeutic efficiency of anti-tumour drugs by mediating drug resistance. Developing ex vivo model systems to characterise the communication of the tumour with its environment is therefore of great importance. Organoid cultures grown from different epithelial tissues serve as an excellent tool to study tissue homeostasis and disease. Furthermore, organoid biobanks of multiple epithelial organ systems have been established and tumour-derived organoids have successfully been used as platforms for screenings of different drugs to predict patient response. Here we describe the establishment of a method to model antigen-specific epithelial-cell killing and cancer immunomodulation in vitro using tumouroids co-cultured with immune cells (specifically, CRC organoids co-cultured with CTLs).

Figure 9:
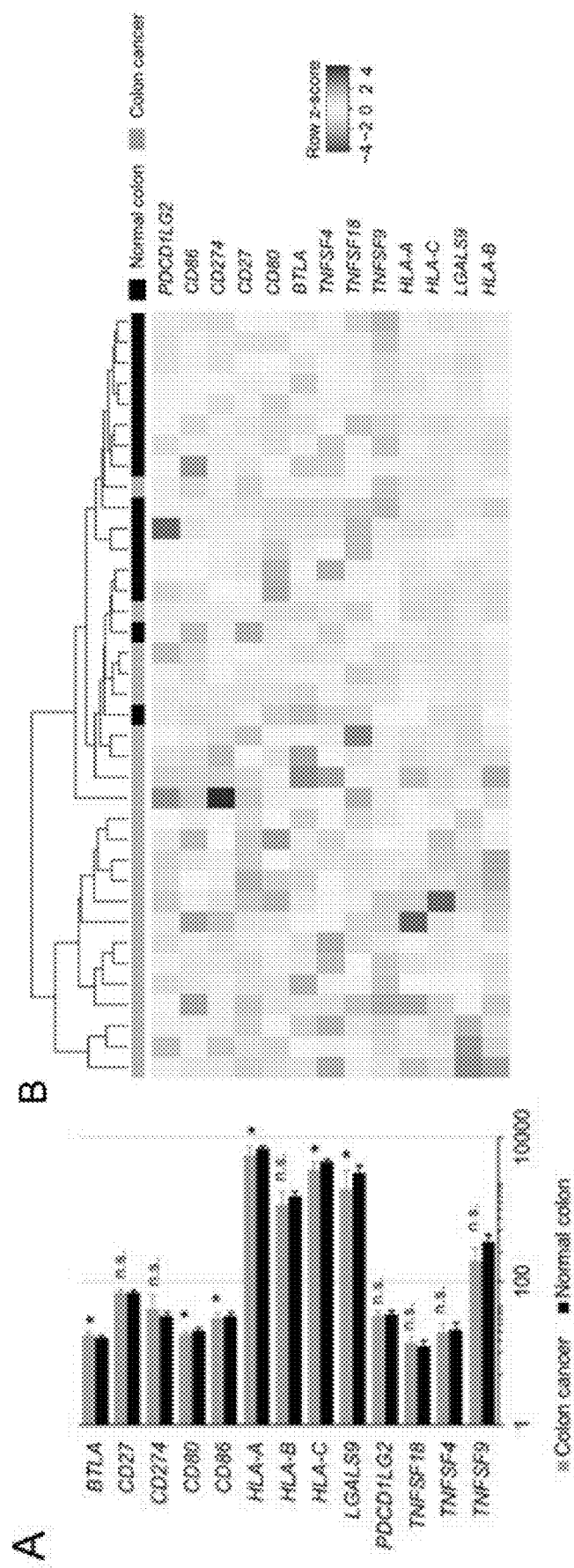
FIG. 9. CRC organoids express immunomodulatory molecules Normal colon and CRC organoid lines were generated in a patient-specific manner and RNA was extracted and analysed using Affymetrix single transcript microarrays.
Figure 9:
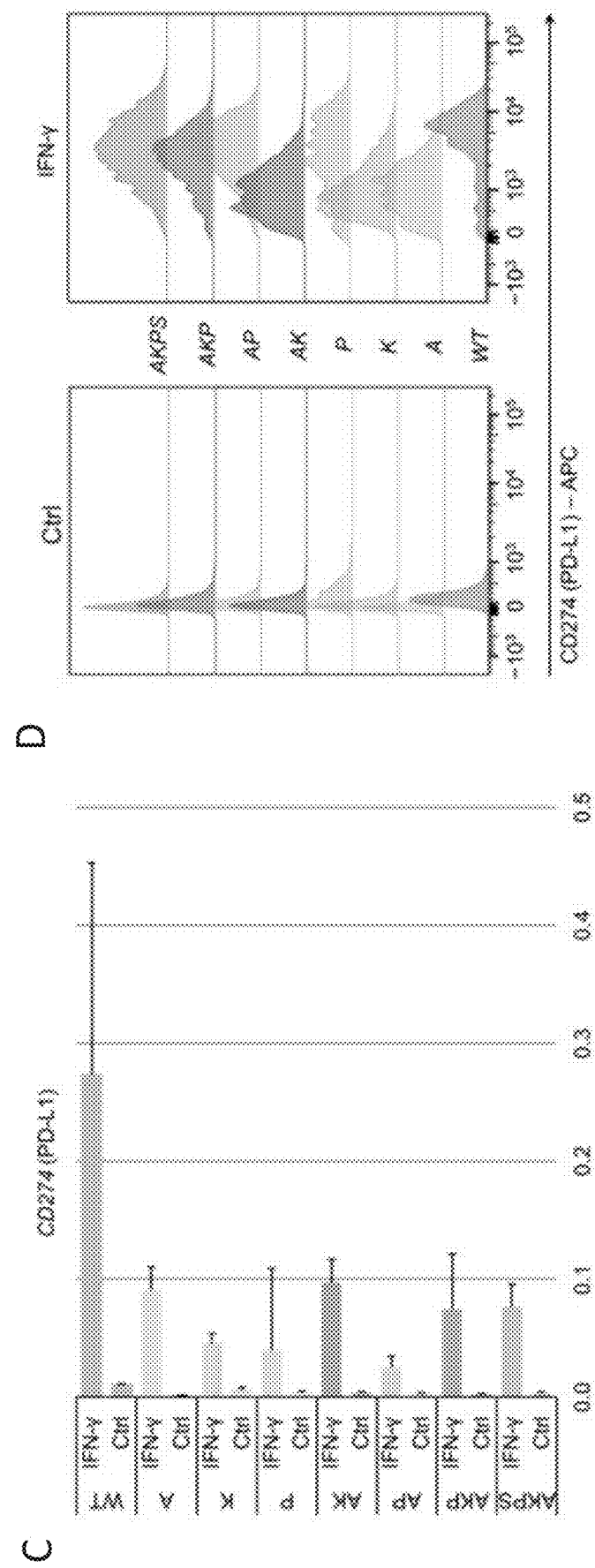

We first assessed whether CRC organoids expressed immunomodulatory molecules in established long-term expanded cultures. To this end, we compared gene expression of T-cell-specific immunomodulators in CRC organoids to the expression levels found in normal colon organoids using a transcriptome dataset generated using our 'living organoid biobank' of CRC patients (van de Wetering, M. et al. Prospective derivation of a living organoid biobank of colorectal cancer patients. Cell 161, 933-945, doi: 10.1016/j.cell.2015.03.053 (2015)). On average, transcription of genes associated with T-cell stimulation such as TNFSF4 or TNFSF9 was not altered in CRC organoids compared to normal colon organoids) FIG. 9A. However, expression of human leukocyte antigen (HLA) genes HLA-A and HLA-C, encoding major histocompatibility complex class (MHC)-I molecules that present antigens to T cells, were significantly downregulated in CRC organoids FIG. 9A, a well-described phenomenon found in cancers. Expression of genes associated with inhibition of T-cell function was either significantly upregulated such as BTLA, significantly downregulated such as CD80, CD86 or LGALS9 or not altered at all such as CD274 (encoding PD-L1), PDCD1LG2 (encoding PD-L2) FIG. 9A When assessing expression levels of immunomodulatory molecules on individual organoids, CRC organoids largely clustered together showing heterogeneous down regulation of HLA-A, HLA-C and LGALS9 compared to healthy colon organoids FIG. 9B. However, expression of immunoinhibitory genes CD274 and PDCD1LG2, for instance, was highly upregulated in some CRC organoids in comparison to the matched normal colon organoid cultures, reflecting previously reported preservation of tumour heterogeneity in organoids FIG. 9B. These molecular signatures provide a basis for further investigation of tumour immunogenicity and its association with other characteristics of the tumour.

Four of the most commonly mutated genes in CRC are APC, P53, KRAS and SMAD4, reflecting the stepwise progression of the normal intestinal epithelium into a metastatic carcinoma. Introduction of these cancer mutations into human intestinal organoid cultures using clustered regularly interspaced short palindromic repeats (CRISPR)/Cas9 demonstrated that this process can be mimicked in vitro and upon xenotransplantation into mice. Using colon organoids carrying one or more of these cancer mutations, we investigated whether up-regulation of PD-L1 was associated with a certain mutational status. Additionally, we exposed mutant organoids and their wild-type control organoid line to interferon (IFN)-γ, which is secreted by T cells and can trigger increased expression of immunomodulatory molecules such as PD-L1. Subsequently, we assessed PD-L1 expression by quantitative polymerase chain reaction (qPCR) and flow cytometry FIG. 9C-D. In the absence of IFN-γ, organoids carrying triple (APC$^{KO/KO}$, P53$^{KO/KO}$, KRAS$^{G12D/+}$) and quadruple mutations (APC$^{KO/KO}$, P53$^{KO/KO}$, KRAS$^{G12D/+}$ and SMAD4$^{KO/KO}$) showed lower CD274 gene expression in comparison to control wild-type organoids FIG. 9C. Overall, PD-L1 expression was low in untreated organoid lines FIG. 9C-D. However, PD-L1 expression was dramatically upregulated in IFN-γ-treated organoids both on transcript and protein level FIG. 9C-D. These data demonstrate that CRC organoids express immunomodulators and that this expression is regulated in a similar way as previously shown for tissue in vivo.

Figure 10:
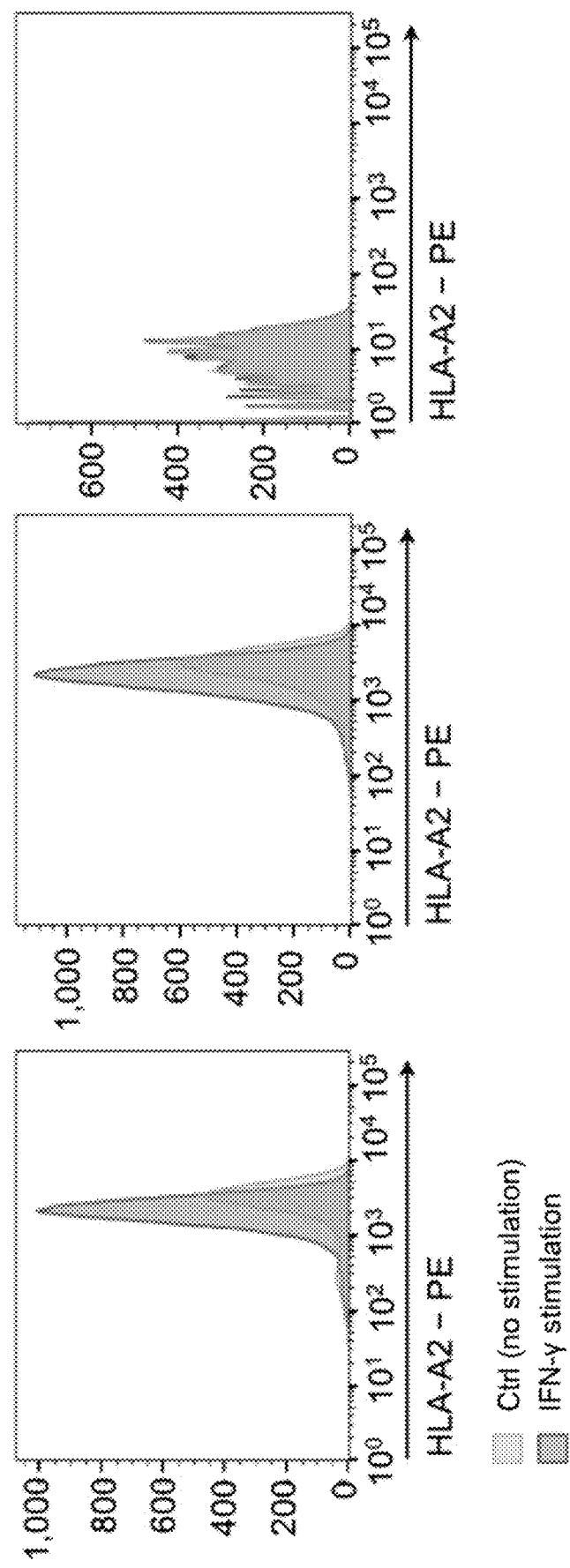
FIG. 10. HLA-A2 expression on clonally expanded HLA-A2$^+$ and HLA-A2$^-$ CRC organoid lines. The Figure shows a representative plot of multiple repeated experiments. Flow cytometry analysis of HLA-A2 expression on normal (left panel), HLA-A2$^+$ CRC (middle panel) and HLA-A2$^-$ CRC (right panel) lines with and without stimulation with 20 ng/ml recombinant human IFN-γ.
Figure 11:
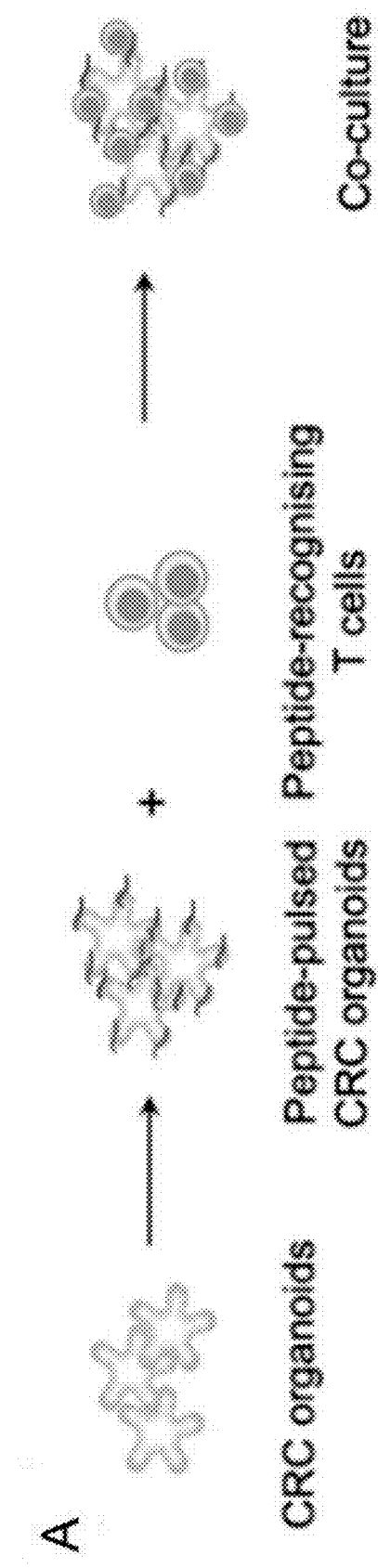
FIG. 11. CRC organoids as tools for assessment of antigen specific killing by CD8$^+$ T cells FIG. 11A. Experimental scheme.
Figure 11:
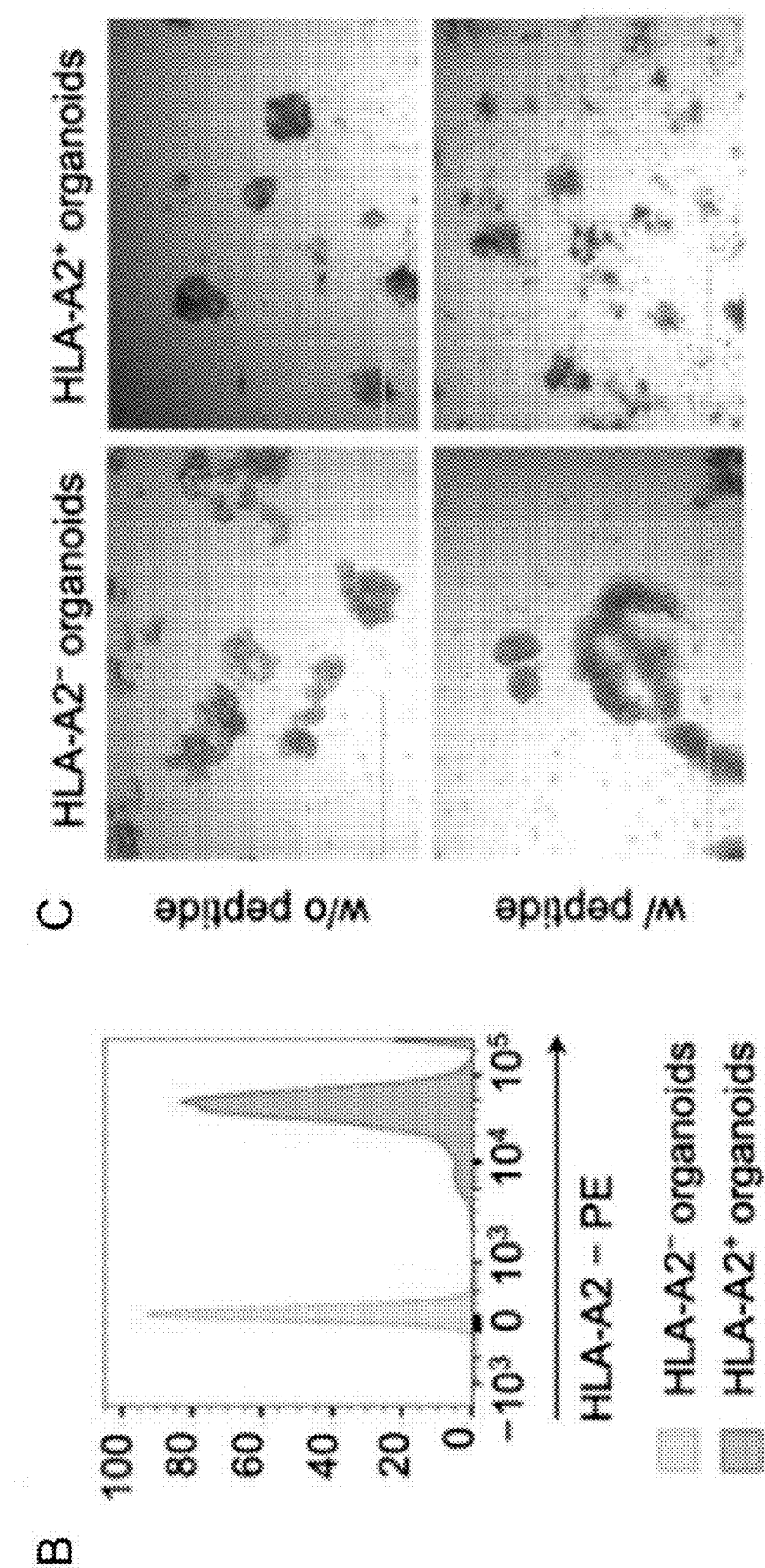
Figure 11:
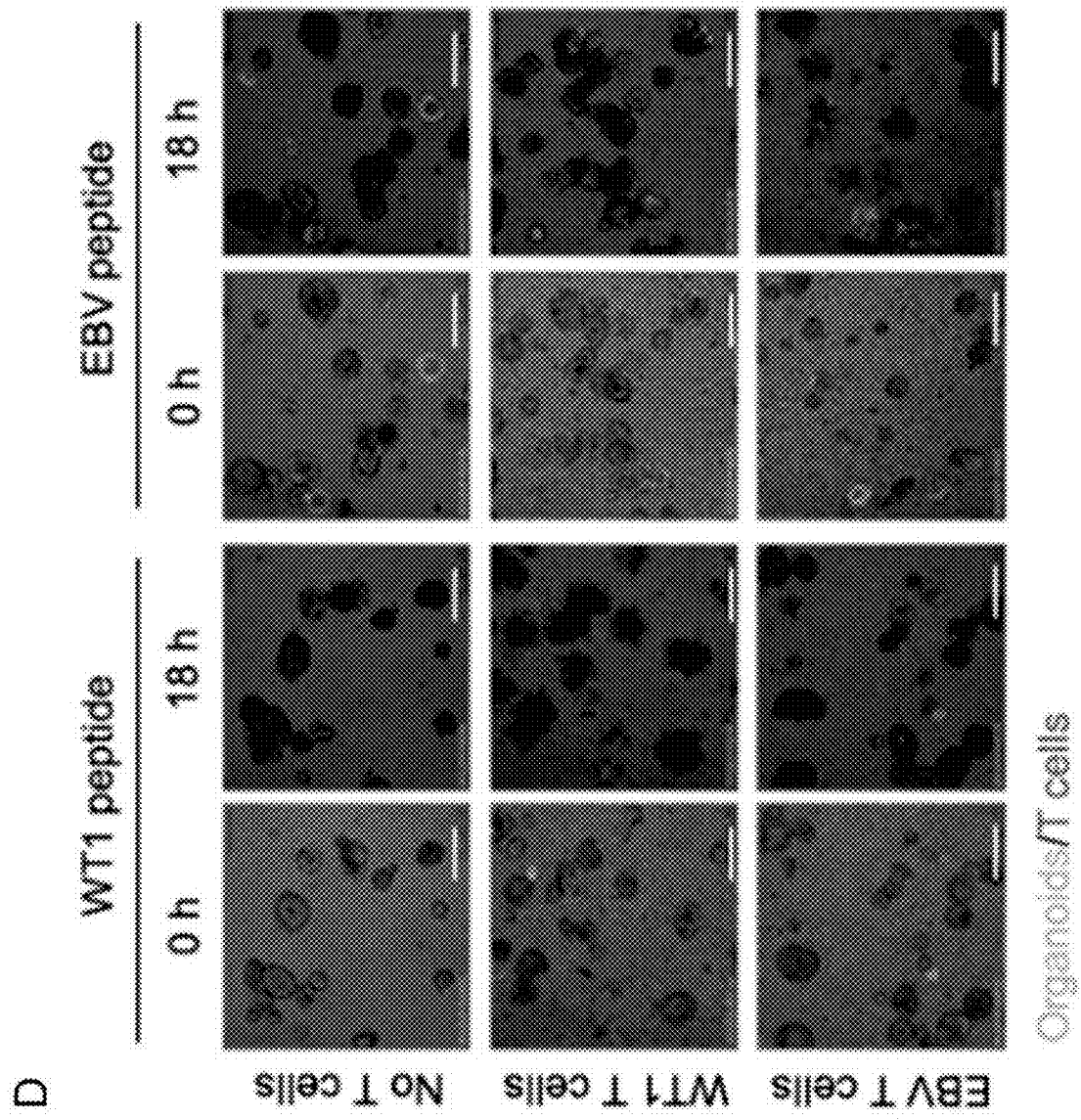
Figure 11:
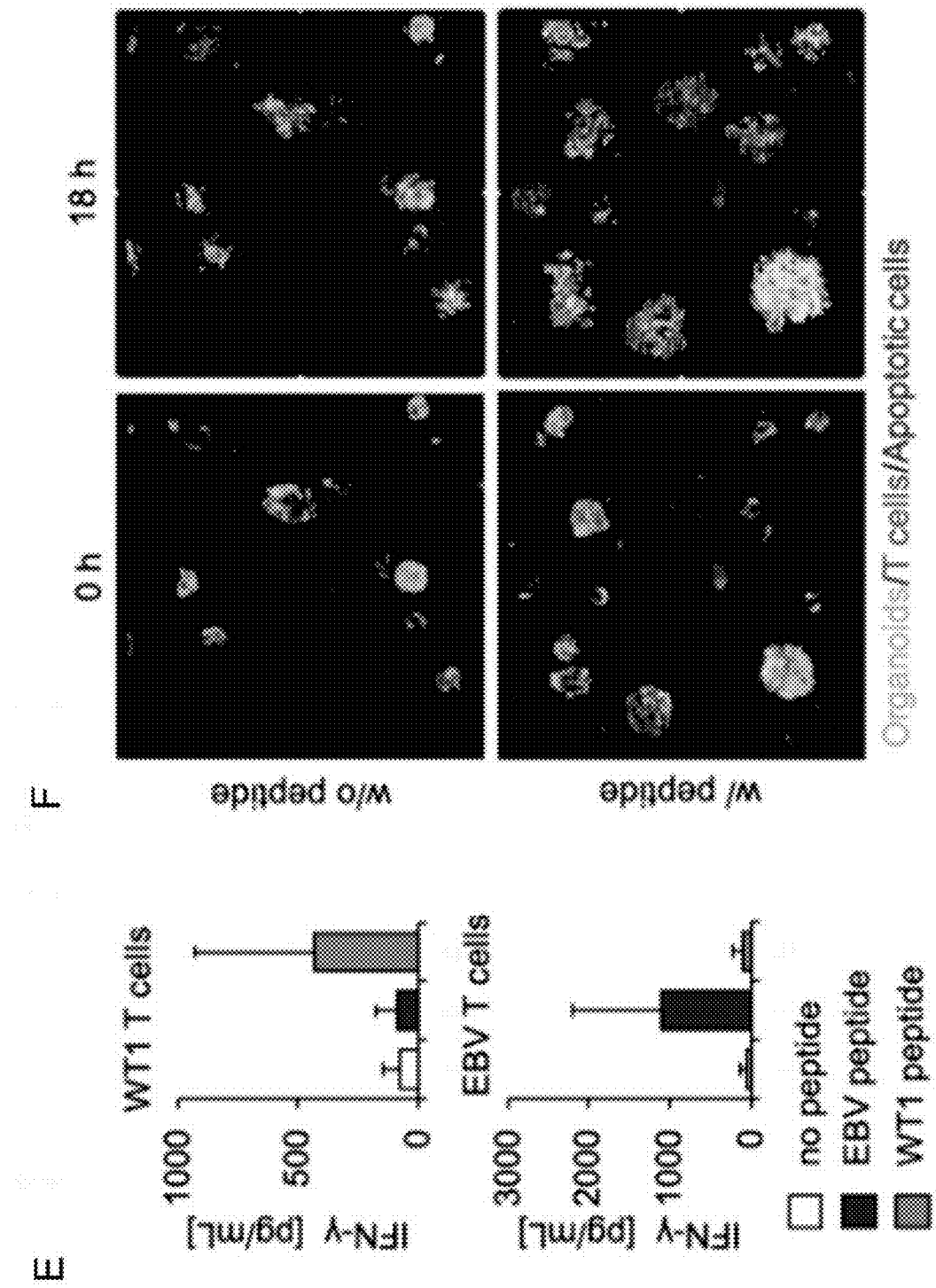
Figure 11:
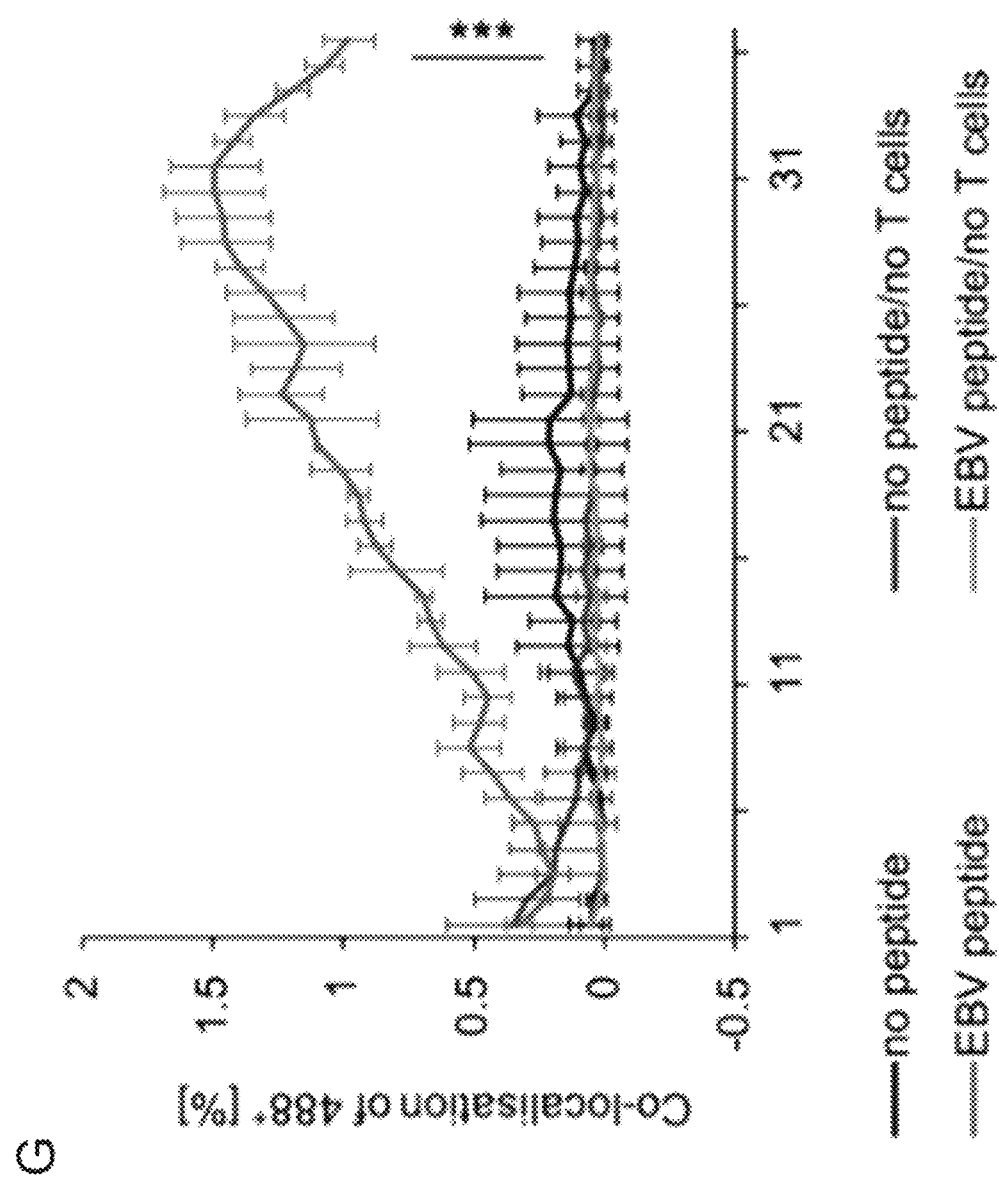
Figure 11:
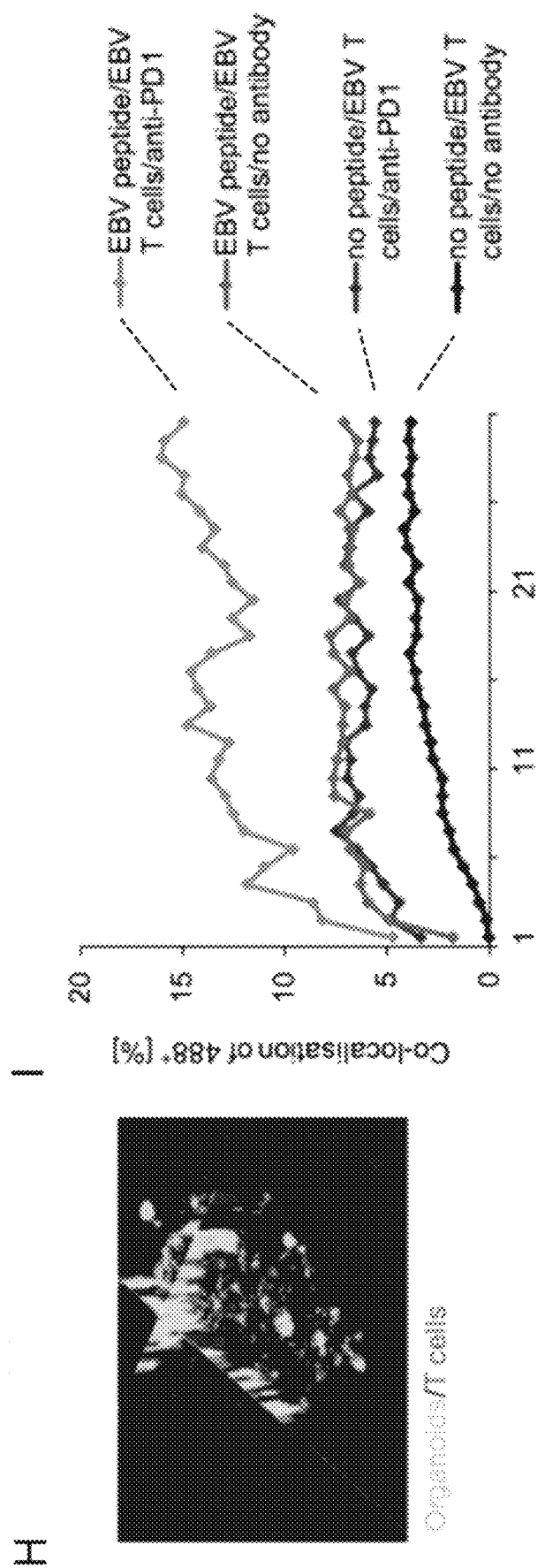
Figure 11:
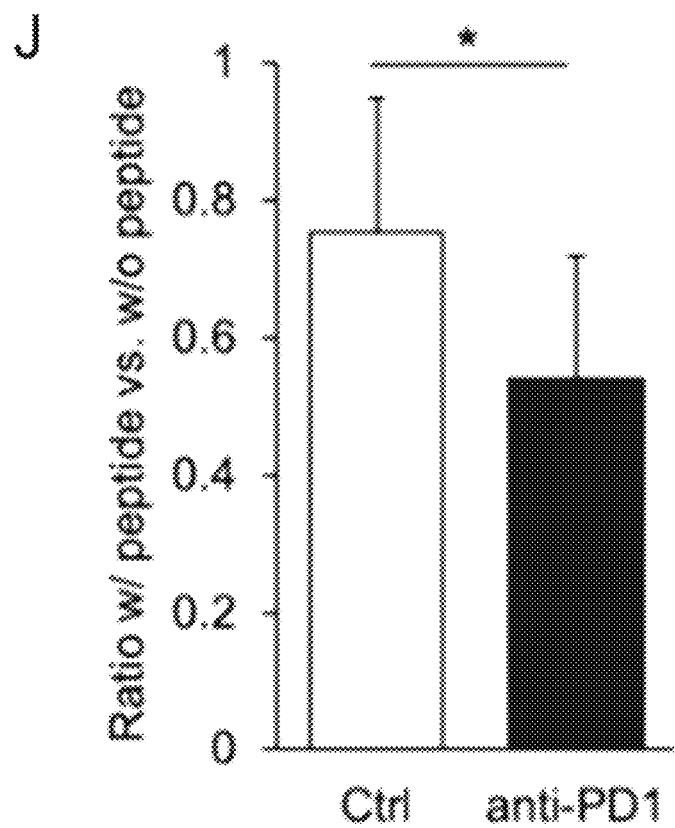

We next aimed at establishing a co-culture system for CRC organoids and CTLs to model antigen-specific killing of tumour cells in vitro. For this, we used αβ T cells carrying a transgenic T-cell receptor (TCR) recognizing an HLA-A2$^-$ restricted Wilms tumour (WT) 1-derived peptide. We first screened CRC organoids from the 'living biobank' as well as newly generated CRC organoids for HLA-A2 expression using flow cytometry. We found three CRC organoid lines that showed partial downregulation of HLA-A2 FIG. 4B. We were able to purify HLA-A2$^+$ and HLA-A2 CRC organoids and successfully established cultures from both populations FIG. 11B We confirmed stable MHC-I downregulation in HLA-A2 CRC organoids, as IFN-γ stimulation did not trigger HLA-A2 re-expression FIG. 10B Next, we pulsed these CRC organoid lines with WT1 peptide and, subsequently, co-cultured them for 48 hours with peptide-specific T cells. Following co-culture, we found that HLA-A2 CRC organoids did survive irrespective of whether pulsed with the peptide or not FIG. 11C. However, only the HLA-A2$^+$ CRC organoids without prior peptide incubation survived co-culture FIG. 11C. Peptide-pulsed HLA-A2$^+$ CRC organoids were effectively killed by the peptide-specific T cells providing a proof-of-principle that organoids can be utilised to study anti-tumour response by cytotoxic T cells in vitro. To further confirm antigen-specificity in our 'killing' assay system, we improved our co-culture method by transfecting HLA-A2$^+$ CRC organoids with a construct expressing mNeonGreen-tagged histone H2B and staining T cells with CellTracker violet to allow for long-term tracking of both cell types (Methods, below). We then pulsed HLA-A2$^+$ CRC organoids with either the WT1 peptide or with an EBV-derived peptide (Methods) and co-cultured the organoids with T cells carrying either a WT1- or an EBV-specific TCR. Here, only organoids pulsed with the cognate peptide were efficiently killed by the T cells FIG. 11D. Testing for IFN-γ production by the T cells in the co-culture using enzyme-linked immunosorbent assay (ELISA) confirmed antigen-specific organoid killing by the T cells FIG. 11E. In order to better follow the kinetics of the organoid killing, we applied a fluorescent dye (NucRed Dead 647; Methods), which specifically stains apoptotic cells, and performed live confocal imaging on the co-culture FIG. 11F). We then quantified organoid killing by assessing co-localisation of NucRed Dead dye with H2B-mNeonGreen (Methods). Significant co-localisation of both labels and, hence, organoid killing, was only observed when peptide-pulsed HLA-A2$^+$ CRC organoids were co-cultured with the respective peptide-specific T cells FIG. 11G Furthermore, T cells infiltrating into the epithelium of the organoids could be readily detected in this co-culture condition FIG. 11H. Finally, we investigated whether using this co-culture system modulation of the immune response to immunosuppressive tumours can be modelled. Indeed, addition of a blocking antibody against PD-1 (αPD-1) enhanced tumour killing and IFN-γ production in PD-L1 expressing IFN-γ stimulated organoids FIG. 11I-J. This was not observed when organoids were not IFN-γ stimulated and, hence, did not express PD-1. In conclusion, T cells efficiently killed co-cultured CRC organoids in an antigen-specific manner. In addition, T-cell inhibition and subsequent relief of this inhibition using αPD-1 could be modelled. Here we have demonstrated that epithelial organoids can be used to faithfully recapitulate the interaction between tumour tissue and the immune system. Also, using our co-culture assay, we set a first step in rebuilding the tumour microenvironment in vitro. Further addition of other components of this microenvironment (such as fibroblasts, natural killer cells, myeloid-derived suppressor cells, B cells) may shed light on the complex interactions between the different cell types leading to immune evasion of the tumour. Lastly, this co-culture system can be used as a tool for drug-screens that test applicability of certain immunotherapies, for instance, chimeric antigen receptor (CAR)- or TCR transgenic T cells, antibody-dependent cell-mediated cytotoxicity (ADCC) or antibody-dependent cellular phagocytosis (ADCP) inducing antibodies directed at the tumour, to different tumours and different patients.

Methods

Human Material and Informed Consent

Colonic tissues (both normal colon and tumour tissue) were obtained from the Departments of Surgery and Pathology of the Diakonessenhuis hospital, Utrecht, the Netherlands. All patients included in this study were diagnosed with CRC. Informed consent was signed by all included patients. Collection of tissue was approved by the medical ethical committee (METC) of the Diakonessenhuis hospital, in agreement with the declaration of Helsinki and according to Dutch and European Union legislation.

Organoid Generation and Cultures

Epithelial organoid lines were derived from healthy colon or tumor tissue (van de Wetering, M. et al. Prospective derivation of a living organoid biobank of colorectal cancer patients. Cell 161, 933-945, doi: 10.1016/j.cell.2015.03.053 (2015)). In brief, healthy colonic crypts were isolated by digestion of the colonic mucosa in chelation solution (5.6 mM $Na_2HPO_4$, 8.0 mM $KH_2PO_4$, 96.2 mM NaCl, 1.6 mM KCl, 43.4 mM Sucrose, and 54.9 mM D-Sorbitol, Sigma) supplemented with dithiotreitol (0.5 mM, Sigma) and EDTA (2 mM, in-house), for 30 minutes at 4° C. Colon crypts were subsequently plated in basement membrane extract (BME; Cultrex PC BME RGF type 2, Amsbio) and organoids were grown in human intestinal stem cell medium (HISC), which is composed of Advanced Dulbecco's modified Eagle medium/F12 supplemented with penicillin/streptomycin, 10 mM HEPES and Glutamax (all Gibco, Thermo Fisher Scientific) with 50% Wnt3a conditioned medium (in-house), 20% R-Spondin1 conditioned medium (in-house), 10% Noggin conditioned medium (in-house), 1× B27, 1.25 mM n-acetyl cysteine, 10 mM nicotinamide, 50 ng/mL human EGF, 10 nM Gastrin, 500 nM A83-01, 3 µM SB202190, 10 n M prostaglandine E2 and 100 µg/mL Primocin (Invivogen). Tumor specimens were digested to single cells in collagenase II (1 mg/mL, Gibco, Thermo Scientific), supplemented with hyaluronidase (10 µg/mL) and LY27632 (10 µM) for 30 minutes at 37° C. while shaking. Single tumor cells were plated in BME and organoids were cultured in HICS minus Wnt conditioned medium and supplemented with 10 µM LY27632 at 37° C. Where we refer to "in-house" components of the media, commercial alternatives are readily available to the person skilled in the art (e.g. Wnt agonist (ATCC CRL 2647™), R-spondin (R&D, #3500-RS/CF), Noggin (Peprotech, #120-10C), EDTA (Thermo fisher, #AM9260G)) and the skilled person would understand that these would achieve the same or an equivalent effect.

Tumouroid Transfection

Tumouroids (specifically, CRC organoids) were dissociated into small clumps using TrypLE and then transduced with H2B-mNeonGreen (pLV-H2B-mNeonGreen-ires-Puro).

T Cells

Generation of αβ T cells carrying a transgenic TCR recognizing an HLA-A2⁻ restricted WT1-derived peptide were described in Kuball, J. et al. Facilitating matched pairing and expression of TCR chains introduced into human T cells. Blood 109, 2331-2338, doi: 10.1182/blood-2006-05-023069 (2007). Briefly, TCRα and β chains were cloned from raised tetramer positive T cell clones. Subsequently, $CD8^+\alpha\beta$ TCR T cells were transduced using retroviral supernatant from Phoenix-Ampho packaging cells that were transfected with gag-pol, env, and pBullet retroviral constructs containing the cloned TCR genes.

Tumouroid-T Cell Co-Culture and Live-Cell Imaging

Tumouroids stably transfected with H2B-mNeonGreen were split and digested a 5 to 7 days prior to co-culture and seeded at a density of 5000 cells per 10 µL of BME (25,000 cells per well in a 12-well cell culture plate). Two days prior to co-culture, T cells were starved from IL-2. One day prior to co-culture, tumouroids were stimulated with IFN-γ at indicated concentrations.

Prior to co-culturing, T cells were stained with Cell Proliferation Dye eFluor 450 (eBioscience) according to the manufacturer's instructions. Tumouroids were pulsed with TCR-specific peptide (ProImmune) for 2 hours at 37° C. prior to co-culture. Tumouroids and T cells were harvested and taken up in T cell medium, supplemented with 10% BME, 100 IU/mL IL-2 and NucRed Dead 647 (Thermo Fischer). Where indicated, anti-PD1 blocking antibodies (2 µg/mL) were added to the co-culture. Cells were plated in glass-bottom 96-well plates and co-cultures were imaged using an SP8X confocal microscope (Leica).

Flow Cytometry

APC-labelled pentamers to the EBV-derived, HLA-2:02 restricted peptide FLYALALLL (ProImmune) where used to sort pentamer+$CD8^+$ $CD3^+$ T cells from PBMCs isolated from buffycoats from healthy individuals. Cells were sorted as single cells into 96-well plates using a BD FACS Aria (BD Biosciences) cytometer. For flow cytometry, the following antibodies were used (all anti-human): CD8-PE (clone RPA-T8), CD45-PerCP-Cy5.5 (2D1), CD274 (PD-L1)-APC (MIH1) (all BD Biosciences), CD279 (PD-1)-PE (EH12.2H7, Biolegend), HLA-A2⁻ PE (BB7.2, Santa Cruz).

Quantitative Polymerase Chain Reaction (qPCR)

For qPCR analysis, RNA was isolated from organoids/tumouroids using the RNAeasy kit (QIAGEN) according to the manufacturer's protocol. PCR analysis was performed using the SYBR Green Reagent (Biorad). PCR reactions were performed in duplicate with a standard curve for every primer. Primers were designed using the NCBI primer design tool. Primers used in this study: GAPDH forward (GTC GGA GTC AAC GGA TT (SEQ ID NO: 1)), GAPDH reverse (AAG CTT CCC GTT CTC AG (SEQ ID NO: 2)), HPRT forward (GGC GTC GTG ATT AGT GAT (SEQ ID NO: 3)), HPRT reverse (AGG GCT ACA ATG TGA TGG (SEQ ID NO: 4)), CD274 forward (TGC AGG GCA TTC CAG AAA GAT (SEQ ID NO: 5)), CD274 reverse (CCG TGA CAG TAA ATG CGT TCAG (SEQ ID NO: 6)).

Transcriptional Profiling

Microarray analysis of biobank organoids was performed as described in van de Wetering, M. et al. Prospective derivation of a living organoid biobank of colorectal cancer patients. Cell 161, 933-945, doi: 10.1016/j.cell.2015.03.053 (2015).

Enzyme Linked Immunosorbent Assays (ELISA)

Culture supernatants were kept at −20° C. and ELISA was performed for indicated cytokines using ELISA MA Standard (Biolegend) according to manufacturer's protocol.

Cell Viability Assay

Cell viability after co-cultures was assessed using CellTiter-Glo Luminescent cell viability assay (Promega), according to manufacturer's protocol.

Image Analysis

Image analysis was done using Imaris software package (Bitplane). In brief, threshold for positive staining was set on negative controls. A co-localization channel was made for H2B-neon and NucRed Dead 647 signals. Cell death was quantified as percentage of H2B-mNeonGreen+voxels co-localising with NucRed Dead signal.

Bioinformatics Analysis

Bioinformatics analysis of normalised gene-expression data from microarray experiments (van de Wetering, M. et al. Prospective derivation of a living organoid biobank of colorectal cancer patients. Cell 161, 933-945, doi: 10.1016/j.cell.2015.03.053 (2015)) was performed using standard packages (i.e. gplots) in R version 3.4.0 (R Foundation, r-project.org) and RStudio version 1.0.143 (rstudio.com).

Statistical Analysis

All experiments were repeated at least three times unless otherwise indicated. All data were shown as mean±SEM. Statistical significance was analysed by either ANOVA or two-tailed Student's t-test using either Graphpad Prism 6 or Microsoft Excel 2010.

The invention claimed is:

1. A method for identifying an agent suitable for treating a cancer, wherein the method comprises:
contacting a tumouroid co-culture with one or more agents, wherein the tumouroid co-culture comprises immune cells and at least one tumouroid,
detecting the presence or absence of one or more change in the tumouroid co-culture that is indicative of agent suitability for treating the cancer, and
identifying the agent suitable for treating the cancer if the presence or absence of one or more of said changes in the tumouroid co-culture is detected,
wherein the method is preceded by:
preparing the at least one tumouroid by culturing tumour epithelial cells in a tumouroid culture medium;
preparing the immune cells by culturing the immune cells in an immune cell expansion medium, wherein the tumouroid culture medium comprises IL-2 and/or the immune cell expansion medium comprises IL-2; and
preparing the tumouroid co-culture by mixing the at least one tumouroid with the immune cells in an in vitro culture.

2. The method of claim 1, wherein the method is preceded by one or more of the following steps:
preparing the immune cells by separating immune cells from an immune sample from a subject; and/or
preparing the tumouroid co-culture by removing the tumouroid culture medium from the at least one tumouroid, and mixing the at least one tumouroid with the immune cells in a tumouroid co-culture medium.

3. The method of claim 2, wherein the tumour epithelial cells are obtained from a sample from a cancer patient.

4. The method of claim 1, wherein the agent suitable for treating the cancer is identified if the presence or absence of one or more said changes is detected in the tumouroid co-culture but not in a reference organoid co-culture or a reference tumouroid co-culture; and/or
wherein the method is preceded by one or more of the following steps:
preparing at least one organoid by culturing normal epithelial cells in an organoid culture medium; and/or
preparing the immune cells by separating immune cells from an immune sample from a subject, and culturing the immune cells in an immune cell expansion medium; and/or
preparing the reference tumouroid co-culture or the reference organoid co-culture, optionally by removing the tumouroid culture medium or the organoid culture medium from the at least one tumouroid or the at least one organoid, and subsequently mixing the at least one reference organoid or the at least one reference tumouroid with the immune cells in an organoid co-culture medium or a tumouroid co-culture medium,
optionally wherein the immune sample is a tumour sample, normal colon tissue and/or peripheral blood.

5. The method of claim 4, wherein the normal epithelial cells are autologous with the tumour epithelial cells.

6. The method of claim 4, wherein (i) the tumouroid co-culture medium and/or (ii) the reference organoid co-culture medium or the reference tumouroid co-culture medium, comprises extracellular matrix, optionally selected from collagen, or any animal-derived or synthetic basement membrane matrix, optionally wherein the collagen is rat tail collagen I.

7. The method of claim 4, wherein:
(a) the immune cells of the tumouroid co-culture have a motility of at least 40 μm/day; and/or
(b) at least 20% of the immune cells in the tumouroid co-culture moves a distance of at least 200 μm in 80 hours; and/or
(c) the immune cells remain active for at least 4 h; and/or (d) the one or more agents are of known suitability for treating cancer and the method further comprises identifying the one or more agents as suitable agents for treating cancer in a particular patient.

8. The method of claim 7, wherein both the tumouroid co-culture and the reference organoid co-culture or the reference tumouroid co-culture are derived from the particular patient.

9. The method of claim 4, wherein the immune cells:
(a) are allogeneic with the tumouroid and/or organoid, optionally wherein the immune cells and tumouroid and/or organoid are derived from either peripheral blood or tissue biopsy of a different patient or healthy control; and/or
(b) are HLA matched with the at least one tumouroid and/or the at least one organoid.

10. The method of claim 4, wherein the at least one tumouroid and/or at least one organoid:
(a) comprises or consists of autologous cells; and/or
(b) are separated into populations sharing one or more genotypes.

11. The method of claim 4, wherein:
(a) the at least one tumouroid or at least one organoid comprises or consists of mammalian cells or human cells; and/or
(b) the tumouroid co-culture is cultured in (i) immune cell expansion medium or (ii) a 50:50 (v/v) mixture of immune cell expansion medium and tumouroid culture medium; and/or
(c) the organoid co-culture is cultured in (i) immune cell expansion medium or (ii) a 50:50 (v/v) mixture of immune cell expansion medium and organoid culture medium; and/or
(d) the reference organoid co-culture or reference tumouroid co-culture is cultured for at least 4 h.

12. The method of claim 4, wherein the tumour epithelial cells or the normal epithelial cells are obtained from a cancer patient; or the tumour epithelial cells and the normal epithelial cells are obtained from different cancer patients; or the tumour epithelial cells and the normal epithelial cells are obtained from a single cancer patient, optionally from the same sample.

13. The method of claim 1, wherein the immune cells:
(a) comprise one or more cell types selected from the group consisting of intra-epithelial lymphocytes (IELs), tumour-infiltrating lymphocytes (TILs), peripheral blood mononuclear cells (PBMCs), peripheral blood lymphocytes (PBLs), T cells, and cytotoxic T lymphocytes (CTLs), $\alpha\beta$ T cells, $\gamma\delta$ T cells, B cells, NK cells, and mononuclear phagocytes; and/or
(b) are obtained from a sample from a cancer patient; and/or
(c) are obtained from a peripheral blood sample and/or a tissue biopsy; and/or
(d) are obtained from the same patient as the tumour epithelial cells; and/or
(e) are allogeneic with the at least one tumouroid, optionally wherein the immune cells and the at least one tumouroid are derived from either peripheral blood or tissue biopsy of a different patient or healthy control; and/or
(f) are HLA matched with the at least one tumouroid; and/or
(g) are cultured in the immune cell expansion medium for at least 4 h.

14. The method of claim 1, wherein the at least one tumouroid:
(a) comprises or consists of autologous cells; and/or
(b) are separated into populations sharing one or more genotypes, phenotypes, and/or epigenetic markers, prior to the mixing with immune cells.

15. The method of claim 1, wherein:
(a) the at least one tumouroid comprises or consists of mammalian cells or human cells; and/or
(b) the at least one tumouroid co-culture is cultured in immune cell expansion medium or in a 50:50 (v/v) mixture of immune cell expansion medium and tumouroid culture medium; and/or
(c) the tumouroid co-culture is cultured for at least 4 h.

16. The method of claim 1, wherein: (a) the tumouroid culture medium comprises IL-2 and the immune cell expansion medium comprises IL 2; and/or (b) the tumouroid co-culture comprises IL-2.

17. The method of claim 1, wherein the immune cells are antigenically compatible with a patient from whom the at least one tumouroid is derived.

18. A method of testing a CAR-T immunotherapy, TCR transgenic T cells, neoantigen, or checkpoint inhibitor, for efficacy and/or safety when used for treating epithelial cancer, the method comprising:
expanding tumour epithelial cells in tumouroid culture medium to form a tumouroid, and mixing the tumouroid with immune cells in a tumouroid co-culture medium comprising an interleukin to form a tumouroid co-culture,
expanding normal epithelial cells in organoid culture medium to form an organoid, and mixing the organoid with immune cells in an organoid co-culture medium comprising the interleukin to form a reference organoid co-culture,
contacting the tumouroid co-culture and reference organoid co-culture with the CAR-T immunotherapy, TCR transgenic T cells, neoantigen, or checkpoint inhibitor,
detecting the presence or absence of one or more change in the tumouroid co-culture and reference organoid co-culture, wherein the presence or absence of one or more change is indicative of efficacy and/or safety of the CAR-T immunotherapy, TCR transgenic T cells, neoantigen, or checkpoint inhibitor, and
comparing the tumouroid co-culture and reference organoid co-culture,
wherein the method is preceded by:
preparing the immune cells by culturing the immune cells in an immune cell expansion medium,
wherein (i) the tumouroid culture medium and/or organoid culture medium comprises IL-2, and/or (ii) the immune cell expansion medium comprises IL-2,
wherein the interleukin is IL-2, IL-7 and/or IL-15.

19. A method of testing a candidate compound for efficacy and/or safety when used for treating epithelial cancer, the method comprising:
expanding tumour epithelial cells in tumouroid culture medium to form a tumouroid, and mixing the tumouroid with immune cells in a tumouroid co-culture medium comprising an interleukin to form a tumouroid co-culture,
expanding normal epithelial cells in organoid culture medium to form an organoid, and mixing the organoid with immune cells in an organoid co-culture medium comprising the interleukin to form a reference organoid co-culture,
contacting the tumouroid co-culture and reference organoid co-culture with the candidate compound, detecting the presence or absence of one or more change in the tumouroid co-culture and reference organoid co-culture, wherein the presence or absence of one or more change is indicative of efficacy and/or safety of the candidate compound, and comparing the tumouroid co-culture and reference organoid co-culture, wherein the method is preceded by:

preparing the immune cells by culturing the immune cells in an immune cell expansion medium, wherein (i) the tumouroid culture medium and/or organoid culture medium comprises IL-2, and/or (ii) the immune cell expansion medium comprises IL-2, wherein the interleukin is IL-2, IL-7 and/or IL-15.

20. The method of claim 19, wherein the tumour epithelial cells, the normal epithelial cells, and the immune cells are obtained from a single patient.

21. A method for testing a therapeutic agent, wherein the method comprises:

contacting an organoid co-culture with one or more agents, wherein the organoid co-culture comprises immune cells and at least one organoid, detecting the presence or absence of one or more change in the organoid co-culture that is indicative of therapeutic efficacy, and identifying an agent as a therapeutic agent if the presence or absence of one or more of said changes in the organoid co-culture is detected, wherein the immune cells and/or the at least one organoid is cultured in the presence of IL-2 prior to formation of the organoid co-culture.

\* \* \* \* \*